United States Patent
Tahir

(10) Patent No.: US 12,390,799 B1
(45) Date of Patent: Aug. 19, 2025

(54) METHOD OF SYNTHESIZING VANADIUM CARBIDE AND LAYERED DOUBLE HYDROXIDE-BASED COMPOSITES FOR SOLAR HYDROGEN PRODUCTION

(71) Applicant: United Arab Emirates University, Al Ain (AE)

(72) Inventor: Muhammad Tahir, Al Ain (AE)

(73) Assignee: UNITED ARAB EMIRATES UNIVERSITY, Al-Ain (AE)

(*) Notice: Subject to any disclaimer, the term of this patent is extended or adjusted under 35 U.S.C. 154(b) by 0 days.

(21) Appl. No.: 18/624,338

(22) Filed: Apr. 2, 2024

(51) Int. Cl.
*B01J 27/00* (2006.01)
*B01J 27/22* (2006.01)
*B01J 27/236* (2006.01)
*B01J 27/24* (2006.01)
*B01J 35/33* (2024.01)
(Continued)

(52) U.S. Cl.
CPC ............ *B01J 27/22* (2013.01); *B01J 27/236* (2013.01); *B01J 27/24* (2013.01); *B01J 35/33* (2024.01); *B01J 35/39* (2024.01); *B01J 35/45* (2024.01); *B01J 35/54* (2024.01); *B01J 37/035* (2013.01); *B01J 37/04* (2013.01); *B01J 37/06* (2013.01); *B01J 37/084* (2013.01); *B01J 37/10* (2013.01); *B01J 37/343* (2013.01); *C01B 3/042* (2013.01)

(58) Field of Classification Search
None
See application file for complete search history.

(56) References Cited

FOREIGN PATENT DOCUMENTS

| CN | 110118814 A | * | 8/2019 | |
| CN | 113054187 A | * | 6/2021 | ........ H01M 10/0525 |

OTHER PUBLICATIONS

CN-110118814-A-English translation (Year: 2019).*
(Continued)

*Primary Examiner* — Stefanie J Cohen
(74) *Attorney, Agent, or Firm* — MH2 Technology Law Group, LLP

(57) ABSTRACT

There is disclosed a method of constructing a layered double hydroxide (LDH) material comprising selected metal ions, and employing metallic vanadium carbide ($V_2C$) for promoting conductive properties of the LDH material, wherein the layered LDH material is a trimetallic LDH material. The trimetallic LDH material comprises selected $Ni^{2+}$, $Co^{2+}$, and $A^{3+}$ metal ions with its cationic configuration for improving photocatalytic properties of the LDH material, wherein trimetallic nickel-cobalt-aluminium layered double hydroxide ($Ni_xCo_yAl_z$ LDH) and vanadium carbide MXene ($V_2C$)-based composite is coupled with a graphitic carbon nitride ($g-C_3N_4$) nanosheet, to form a hybrid-junction photocatalyst. Also disclosed is a layered structure of vanadium carbide ($V_2C$) MXenes, comprising trimetallic nickel-cobalt-aluminium layered double hydroxide ($Ni_xCo_yAl_z$ LDH) and vanadium carbide MXene ($V_2C$) coupled with graphitic carbon nitride ($g-C_3N_4$), forming a $Ni_xCo_yAl_z$ LDH/$g-C_3N_4$ hybrid-junction photocatalyst.

11 Claims, 24 Drawing Sheets

(51) Int. Cl.
*B01J 35/39* (2024.01)
*B01J 35/45* (2024.01)
*B01J 35/54* (2024.01)
*B01J 37/03* (2006.01)
*B01J 37/04* (2006.01)
*B01J 37/06* (2006.01)
*B01J 37/08* (2006.01)
*B01J 37/10* (2006.01)
*B01J 37/34* (2006.01)
*C01B 3/04* (2006.01)

(56) References Cited

OTHER PUBLICATIONS

CN-113054187-A, English translation (Year: 2021).*
Li et al., In situ fabrication of 2D/3D g-C3N4/Ti3C2 (MXene) heterojunction for efficient visible-light photocatalytic hydrogen evolution, applied surface science, 515, pp. 1-9 (Year: 2020).*

\* cited by examiner

METHOD OF SYNTHESIZING VANADIUM CARBIDE AND LAYERED DOUBLE HYDROXIDE-BASED COMPOSITES FOR SOLAR HYDROGEN PRODUCTION

FIELD OF THE INVENTION

The present invention relates to the synthesis of a novel composite for converting water into solar hydrogen, and more particularly to self-assembled 2D vanadium carbide (2D $V_2C$) MXenes cocatalysts synthesized through a simple approach and coupled with nickel-cobalt-aluminium layered double hydroxide and graphitic carbon nitride to create a hybrid composite photocatalyst for enhanced solar hydrogen production.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Utilizing the water-splitting process, hydrogen energy generation has been recognized as a sustainable method and a crucial means to generate carbon-free energy. Progress in this process has been driven by advancements in solar-active semiconductor photocatalysts. For instance, $TiO_2$ semiconductors gained prominence in research networks following pioneering studies by Fujishima and Honda in 1972. However, drawbacks such as low quantum efficiency and limited utilization of a small portion of the solar spectrum hinder its effectiveness as a single photocatalyst. ZnO, owing to its abundance, nontoxicity, and commercial availability, is highly favored, but similar to $TiO_2$, large band gap energy and its inactivation under visible irradiation impede its function as a solar-active photocatalyst in hydrogen conversion. On the other hand, extensively studied CdS photocatalysts have suffered severely from photocorrosion, which significantly reduces their efficiency in photocatalysis. Although the presence of the sulfur element in CdS could improve hydrogen conversion, sulfide oxidation could lower the overall photocatalytic activity. Consequently, precise selection of semiconductor material as primary photocatalysts is essential.

In regards to the thermodynamics standard of photocatalytic hydrogen production, two-dimensional (2D) graphitic carbon nitride (g-$C_3N_4$) has been demonstrated to be highly compatible and possess a well-fitted electronic band structure. The narrower band gap (2.7 eV) enables visible-light harvesting compared to most well-established photocatalysts, such as $TiO_2$, ZnO, $SnO_2$, and ZnS. Additionally, their 2D geometry morphology provides a larger reaction surface area and dispenses an effective supporting platform for hybridizing other semiconductor photocatalysts with a wide range of morphology. However, semi-crystalline or amorphous g-$C_3N_4$ exhibits lower photocatalytic efficiency due to the presence of hydrogen bonds and terminal amino groups, acting as recombination centers. The intraplanar π-conjugated structure of g-$C_3N_4$ promotes natural electron transmission along the conjugated pathway (carbon to nitrogen), which opposes the movement of photoinduced electrons, leading to increased excitonic recombination. This higher charge recombination in g-$C_3N_4$ limits their effectiveness as a standalone photocatalyst in sustaining prolonged photocatalytic activity. On this basis, hybridizing g-$C_3N_4$ with other semiconducting materials to form heterojunction photocatalysts is appealing strategy to enhance the transfer of photogenerated electrons and maximize visible light absorption.

Layered double hydroxide (LDH) is a group of anionic clay materials with a general formula of $[M_{1-x}^{2+}M_x^{3+}(OH)_2]^{x+}(A_{x/n}^{n-})\cdot yH_2O$ and exists in a 2D morphology with layered characteristics. LDH consists of the combination of divalent ($M^{2+}$) and trivalent ($M^{3+}$) metal cations bonded with the —OH groups, making up the positively-charged layer and serving as the backbone of the LDH. On the other hand, the interlayer region constructing the negatively-charged layer of LDH consisted of water molecules and charge-balancing anions ($A^{n-}$), which are stable in a basic condition and responsible for balancing charge neutrality. The similarity in characteristics to hydrotalcite has led to scrutinizing their photophysical properties. In this regarda suitable metal selection and effective ionic configuration significantly affect the photocatalytic properties of LDH framework and are essential to ensure higher photocatalytic activity. Also, some major limitations of LDH photocatalysts are their poor crystalline structure which restricts efficient charge mobility, and layer aggregation leading to structural clustering and low absorption spectrum, hampering maximal solar utilization.

The construction of trimetallic layered double hydroxides (LDHs), incorporating three types of metal cations in their brucite layer, has been observed to offer several advantages over their bimetallic counterparts in terms of photophysical properties, recyclability, and surface morphology. Recent investigations into incorporating zinc (Zn) as a third metal element into cobalt-aluminum CoAl LDH have demonstrated significant improvement in photocatalytic hydrogen performance while maintaining outstanding photorecyclability. The tunability of band gap through transition-metal-bearing LDH significantly influences photocatalytic performance. LDHs containing Ni have been shown to enhance optical properties and are well-suited for constructing visible-active LDH materials, while cobalt (Co)-containing LDHs exhibit high activity for photocatalytic hydrogen production. Meanwhile, the incorporation of Al ions over other trivalent metal ions (Ce, Fe, Cr) into the LDH framework is observed to enhance the crystallinity structure and promote structural stabilization. Thus, it would be promising to explore improved trimetallic LDH coupling with more efficient metals for solar energy assisted hydrogen production.

The discovery of MXene materials that possess similar functionality as those of noble metals has shed light on the nanomaterial field as they are more cost-effective. MXene is one of the subfamilies of the MAX phase, which recently caught research attention due to its unique two-dimensional (2D) multilayer structure, excellent electrical properties, tuneable surface terminations, and higher work function comparable to those of noble metals. MXene is composed of the formula $M_nX_{n+1}T_x$ by which the M in MXene stands for transitional metal elements such as Ti, V, Sr, Zr, Nb, Mo, and Sc while X makes up of carbon or nitrogen element, and $T_x$ is the surface termination groups. The effectiveness of MXene as an electron transport media and their distinct 2D multilayered structure as a supportive platform for the hybrid catalysts raise their potential in driving photocatalytic hydrogen production. Among the MXene family, vanadium-based MXene ($V_2C$) received vast interest as it possesses multiple oxidation states and has been proven highly effective in promoting the electrocatalytic oxygen reaction. However, the predominant focus on titanium-based MXene in water-splitting research has marginalized the potential of other MXene sub-families, which overlooks the broader possibilities within this field.

Based on the above explained, there exists a need synergistic combination of selective metals (Ni—Co—Al) into the LDH framework, specifically trimetallic LDH framework, and hybridizing with g-$C_3N_4$, with a suitable MXene as a solid-state mediator (as a noble metal replacement) could imbue LDH with outstanding photophysical properties and expedite photocatalytic activity, which overcomes the drawbacks of the traditionally employed systems.

SUMMARY OF THE INVENTION

Therefore it is an object of the present invention to propose the synthesis of 2D layered Vanadium carbide ($V_2C$) MXene cocatalysts coupled with trimetallic layered double hydroxide (LDH) to construct trimetallic LDH/g-$C_3N_4$ hybrid for improved solar hydrogen production.

There is disclosed a method of constructing a layered double hydroxide (LDH) material comprising selected metal ions, and employing metallic vanadium carbide ($V_2C$) for promoting conductive properties of the LDH material.

In another embodiment of the present invention, the layered LDH material is a trimetallic LDH material.

In another embodiment of the present invention, the layered LDH material exhibits a hexagonal nanoplates structure.

In another embodiment of the present invention, the trimetallic LDH material comprises selected $Ni^{2+}$, $Co^{2+}$, and $Al^{3+}$ metal ions with its cationic configuration for improving photocatalytic properties of the LDH material.

In another embodiment of the present invention, trimetallic nickel-cobalt-aluminium layered double hydroxide ($Ni_xCo_yAl_z$ LDH) and vanadium carbide MXene ($V_2C$)-based composite is coupled with a graphitic carbon nitride (g-$C_3N_4$) nanosheet, to form a hybrid-junction photocatalyst.

In another embodiment of the present invention, the formed hybrid-junction photocatalyst is a $Ni_xCo_yAl_z$ LDH/g-$C_3N_4$ hybrid-junction photocatalyst.

In another embodiment of the present invention, the g-$C_3N_4$ nanosheet is synthesized via thermal polymerization of melamine.

In another embodiment of the present invention, the $V_2C$-based composite is synthesized through selective etching with hydrogen fluoride acid.

In another embodiment of the present invention, trimetallic carbonate-intercalated trimetallic LDH is prepared through co-precipitation-assisted hydrothermal treatment, incorporating highly active transition metals.

In another embodiment of the present invention, the highly active transition metals being Ni, Co, and Al, with the regulation of the cationic composition at a controlled layer charge density.

In another embodiment of the present invention, construction of trimetallic LDH in S-scheme heterojunction is further done, leading to a hybrid junction comprising a combination of S-scheme heterojunction and a Schottky-junction system.

In another embodiment of the present invention, enhanced photocatalytic hydrogen production is conducted through the construction of the S-scheme heterojunction system for electron transfer.

In another embodiment of the present invention, the $V_2C$-based composite is used for converting water into solar hydrogen.

As another aspect of the present invention, a layered structure of vanadium carbide ($V_2C$) MXenes is proposed comprising: trimetallic nickel-cobalt-aluminium layered double hydroxide ($Ni_xCo_yAl_z$ LDH) and vanadium carbide MXene ($V_2C$) coupled with graphitic carbon nitride (g-$C_3N_4$), forming a $Ni_xCo_yAl_z$ LDH/g-$C_3N_4$ hybrid-junction photocatalyst.

In another embodiment of the present invention, the $V_2C$ MXenes comprises a 2D layered structure of (2D $V_2C$) MXenes with a hollow porous structure.

In another embodiment of the present invention, construction of trimetallic LDH in S-scheme heterojunction is further done, leading to a hybrid junction comprising a combination of S-scheme heterojunction and a Schottky-junction.

In another embodiment of the present invention, an S-scheme heterojunction of 2D/2D 2NiCoAlCN is designed by adjusting the cationic composition of $M^{2+}/M^{3+}$ in $Ni_xCo_yAl_z$ LDH relative to its layer charge density.

In another embodiment of the present invention, the Schottky-junction along with architectural structure of the layered $V_2C$ supported on g-$C_3N_4$ offers photocatalytic enhancement to 4.23-fold higher than single g-$C_3N_4$, with 360 µmol $g^{-1}$ $h^{-1}$ maximal $H_2$ production.

In another embodiment of the present invention, $Ni_xCo_yAl_z$-LDH/g-$C_3N_4$ composite (xNiCoAlCN) with different mass ratios is prepared using a physical mixing method.

In another embodiment of the present invention, preparation of $V_2C/Ni_1Co_1Al_1$ LDH/g-$C_3N_4$ composite is conducted using a physical mixing method followed by a sonication technique.

There is disclosed the construction of a self-assembled $V_2C$-based binary and ternary composite, in particular, trimetallic nickel-cobalt-aluminium layered double hydroxide ($Ni_xCo_yAl_z$ LDH) and vanadium carbide MXene ($V_2C$) coupled with graphitic carbon nitride (g-$C_3N_4$) to form a $Ni_xCo_yAl_z$ LDH/g-$C_3N_4$ S-scheme hybrid-junction photocatalyst.

In an embodiment of the present invention, trimetallic LDH consisting of selected $Ni^{2+}$, $Co^{2+}$, and $Al^{3+}$ metal ions with its cationic configuration, improves the photocatalytic properties of the single LDH material while the employment of metallic $V_2C$ to promote the conductive properties.

In another embodiment of the present invention, Vanadium carbide ($V_2C$) MXene, a transition metal, is synthesized through selective etching with hydrogen fluoride acid, and is effectively used as an innovative cocatalyst to enhance photocatalytic efficiency. $V_2C$ MXene achieves efficient charge carrier separation owing to its higher conductivity, abundant active sites, and higher light absorbance properties.

According to an embodiment of the invention, trimetallic NiCoAl-LDH is prepared through co-precipitation-assisted hydrothermal treatment with regulated cationic composition.

Comparative analysis on the effects of the etching time of vanadium aluminium carbide ($V_2AlC$) precursor on the structural development of $V_2C$ reveals that HF etching of $V_2C$ for 24 h results in a well-defined layered structure with promoted photocatalytic efficiency.

A comparative study on the atomic ratio of carbonate intercalated trimetallic LDHs ($Ni_xCo_yAl_z$) suggests that the cationic regulation into $Ni_1Co_1Al_1$ LDH significantly enhances the optical properties and physical attributes of the LDH material, resulting in the highest $H_2$ yield.

According to the invention, the S-scheme charge transfer in binary $Ni_1Co_1Al_1$ LDH/g-$C_3N_4$ augments the photocatalytic activity up to 254 µmol $g^{-1}$ $h^{-1}$ with 5.08- and 2.98- times improvement than single $Ni_1Co_1Al_1$ LDH and $g-C_3N_4$, respectively whereas, the construction of ternary $g-C_3N_4/V_2C/Ni_1Co_1Al_1$ LDH offers the best $H_2$ yield of up to 474 µmol g$^{-1}$ h$^{-1}$, almost twice the enhancement of its binary counterparts. The improvement in the photocatalytic activity of the ternary $V_2C/NiCoAl$ LDH/g-$C_3N_4$ is ascertained by several factors, such as efficient charge transfer owing to the synergy of S-scheme and Schottky barrier, morphological compatibility, and excellent photophysical properties. The invention delves into the construction of trimetallic LDH in S-scheme heterojunction and explores the intercorrelation between the cationic, which can serve as a valuable insight for further research in this field.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1:
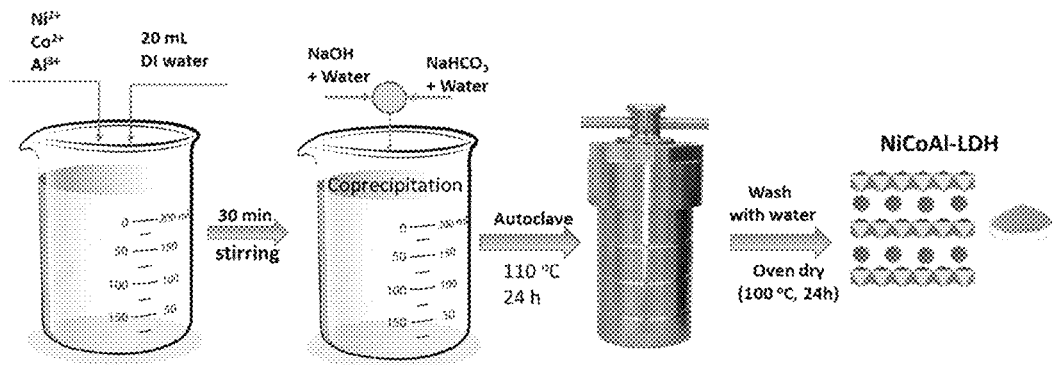
FIG. 1 shows the preparation of NiCoAl LDH through co-precipitation assisted hydrothermal method, in accordance with the present invention.

The aspects of the proposed portable and direct solar thermal desalination system —according to the present invention will be described in conjunction with FIGS. 1-26. In the Detailed Description, reference is made to the accompanying figures, which form a part hereof, and which is shown by way of illustration specific embodiments by which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The present invention proposes the synthesis of a self-assembled $V_2C$-based binary and ternary composite, in particular, trimetallic nickel-cobalt-aluminium layered double hydroxide ($Ni_xCo_yAl_z$ LDH) and vanadium carbide MXene ($V_2C$) coupled with graphitic carbon nitride ($g-C_3N_4$) to form a $Ni_xCo_yAl_z$ LDH/g-$C_3N_4$ hybrid-junction photocatalyst. In an embodiment of the present invention, a 2D layered structure of vanadium carbide (2D $V_2C$) MXenes with a hollow porous structure is synthesized through a simple approach and coupled with a novel trimetallic aluminium nickel cobalt and layered hydroxide (Al-NiCo-LDH). The invention aims at an enhanced photocatalytic hydrogen production conducted through the construction of an S-scheme heterojunction system for electron transfer.

In an embodiment of the invention, the construction of trimetallic LDH consists of selected $Ni^{2+}$, $Co^{2+}$, and $Al^{3+}$ metal ions with its cationic configuration improves the photocatalytic properties of the single LDH material while the employment of metallic $V_2C$ to promote the conductive properties. The g-$C_3N_4$ nanosheet is synthesized via the thermal polymerization of melamine, while $V_2C$ is synthesized through selective etching with hydrogen fluoride acid. Trimetallic carbonate-intercalated trimetallic LDH is prepared through co-precipitation-assisted hydrothermal treatment, incorporating highly active transition metals (Ni, Co, and Al) with the regulation of the cationic composition at a controlled layer charge density.

Vanadium carbide ($V_2C$) MXene, a transition metal, exhibits significant potential as an innovative cocatalyst to enhance photocatalytic efficiency. It can achieve efficient charge carrier separation owing to higher conductivity, abundant active sites, and higher light absorbance properties. $V_2C$ MXene is thinner than other MXene families, offering them a large specific surface area for photonic absorption, favoring the photocatalytic process. Positive enhancement in the photocatalytic activity through the employment of LDH-based catalysts, composed of a trimetallic combination of Ni, Co, and Al metal cations, have been attributed to their excellent conductive metal species and highly active transitional metal elements. The compositional flexibility of divalent and trivalent metal cations in the brucite layer enhances its functionality in the photocatalysis process. The optimization of their electronic structure is attained by tuning the chemical composition of the cations and anionic identity in the interlayer gallery of LDH. Integrating photoactive metal cations into the brucite layer of LDH generates a visible-active photocatalyst and Ni/Co metals ratios enhances the structure and morphology for a higher photocatalytic efficiency.

In an embodiment of the invention, the investigation of photocatalytic hydrogen production is conducted through the construction of an S-scheme heterojunction electron transfer system. The interfacial Schottky junction with the distinct architectural structure of binary multilayered $V_2C$ supported on g-$C_3N_4$ offers photocatalytic enhancement to 4.23-fold higher than single g-$C_3N_4$, with 360 µmol $g^{-1}$ $h^{-1}$ maximal $H_2$ production. Comparative analysis on the effects of the etching time of vanadium aluminium carbide ($V_2AlC$) precursor on the structural development of $V_2C$ reveals that HF etching of $V_2C$ for 24 h results in a well-defined layered structure with promoted photocatalytic efficiency. A comparative study on the atomic ratio of carbonate intercalated trimetallic LDHs ($Ni_xCo_yAl_z$) suggests that cationic regulation into $Ni_1Co_1Al_1$ LDH significantly enhances the optical properties and physical attributes of the LDH material, resulting in the highest $H_2$ yield. The S-scheme charge transfer in binary $Ni_1Co_1Al_1$ LDH/g-$C_3N_4$ augments the photocatalytic activity up to 254 mol $g^{-1}$ $h^{-1}$ with 5.08- and 2.98-times improvement than single $Ni_1Co_1Al_1$ LDH and g-$C_3N_4$, respectively. The construction of ternary g-$C_3N_4$/$V_2C$/$Ni_1Co_1Al_1$ LDH proffers the best $H_2$ yield of up to 474 mol $g^{-1}$ $h^{-1}$, almost twice the enhancement of its binary counterparts. The improvement in the photocatalytic activity of the ternary $V_2C$/NiCoAl LDH/g-$C_3N_4$ is influenced by several factors, such as efficient charge transfer owing to the synergy of S-scheme and Schottky barrier, morphological compatibility, and excellent photophysical properties.

According to the invention, it proposes the construction of trimetallic LDH in S-scheme heterojunction and explores the intercorrelation between the cationic. In an embodiment of the invention, the co-effect of tuning the cationic ratio between divalent (Ni+Co) and trivalent (Al) metal relative to the layer charge density on the photophysical properties of the LDH is analysed. The significance of the di- and trivalent cations on the reaction activity ascertains the intercorrelation of the cationic effects on the LDH properties. An optimal ratio of 2% NiCoAl-LDH with gCN is found to be highly active under visible irradiation with befitting band gap energies for maximal photon absorption. Besides, a well formation of $Ni_1Co_1Al_1$ LDH nanoplatelet structures with good dispersion onto the planar structure of gCN offers maximal exposure of active sites for efficient solar to hydrogen conversion. In another embodiment of the invention, the photocatalytic stability is examined to investigate the structural and chemical stability of 2D/2D NiCoAl/gCN under continual reaction activity.

In an embodiment of the invention, S-scheme heterojunction of 2D/2D 2NiCoAlCN is designed by finely adjusting the cationic composition of $M^{2+}/M^{3+}$ in $Ni_xCo_yAl_z$ LDH relative to its layer charge density. The cationic ratio of $Ni_xCo_yAl_z$ LDH is varied at different layer charge densities (x: 0.25, 0.33, 0.5) and its photocatalytic effects is analysed. The optimal cationic ratio of $Ni_1Co_1Al_1$ LDH in 10-2NiCoAlCN nanohybrid, with a layer charge density (x) of 0.33, exhibits the highest hydrogen production rate of 254 µmol $g^{-1}$ $h^{-1}$ which is two- and four-times enhancement than pure gCN and $Ni_1Co_1Al_1$ LDH. S-scheme electron transfer mechanism plays a pivotal role in facilitating an efficient electron-hole transport within the 2NiCoAlCN, which promote the oxidizability and reducibility in the nanohybrids for enhancing the overall redox activity. In an embodiment of the invention, the cationic effects suggest an enhanced interaction between the metal hydroxides layer and adsorbed molecules in 2NiCoAlCN, which augment its photocatalytic activity. The adjustment of the cationic ratio and charge density has a notable influence on the electronic properties of the LDH, as evidenced by variations in the band gap value. In an embodiment, $Ni_1Co_1Al_1$ LDH ($E_{BG}$: 2.21 eV) and $Ni_{1.5}Co_{1.5}Al_1$ LDH (EBG: 2.84 eV) exhibit narrower band gaps, enabling them to be active under visible irradiation. In contrast, $Ni_{0.5}Co_{0.5}Al_1$ LDH displays a larger band gap value of 3.04 eV. The narrower band gaps of $Ni_1Co_1Al_1$ LDH and $Ni_{1.5}Co_{1.5}Al_1$ LDH contribute to their enhanced performance, allowing for better utilization of visible light for photocatalytic processes. In the morphological perspective, $Ni_1Co_1Al_1$ LDH sample exhibited a prominent nanoplate structure with well-defined edges, indicating the formation of a stable hydrotalcite structure with higher crystallinity. In another embodiment of the invention, larger crystallite size obtained in $Ni_1Co_1Al_1$ LDH (9.07 nm) with enhanced $S_{BET}$ of 115.75 $m^2/g$ increase the surface-active sites and improve its photonic absorption. In contrast, the $Ni_{0.5}Co_{0.5}Al_1$ LDH sample with a lower cationic ratio displayed aggregated, coalesced, and smaller nanoplates attributing to a lower specific surface area ($S_{BET}$) of 95 $m^2/g$ for $Ni_{0.5}Co_{0.5}Al_1$ LDH. A higher layer charge density of $Ni_{0.5}Co_{0.5}Al_1$ LDH (x: 0.5) may lead to the formation of non-pure LDH phases, as evidenced by its poor crystallinity and visible inactivation.

The present invention also proposes a method to construct 2D $V_2C$ MXene with 3D/2D binary AlNiCo-LDH/g-CN/$V_2C$ composite with higher efficiency and stability for converting water into solar hydrogen/green hydrogen production. The 2D $V_2CTx$ helps to optimize solar energy usage, allowing for an increased semiconductor sensitivity and helping to optimize solar hydrogen generation. This new sensitizer may be used in conjunction with a variety of semiconductors, layered structure LDHs and graphitic carbon nitrides, to maximize the use of solar energy and increase hydrogen generation.

In an embodiment of the present invention, an experimental setup is developed for the synthesis of $Ni_xCo_yAl_z$ LDH. $Ni_xCo_yAl_z$ LDH is synthesized through co-precipitation-assisted hydrothermal treatment, as illustrated in FIG. 1. In the typical preparation method, two solutions containing metal cations and an alkaline solution are prepared. The solution containing the metal cations is labeled A, and the alkaline solution is labeled B. In solution A, 1 mmol of nickel (II) nitrate hexahydrate, 1 mmol of cobalt (II) nitrate hexahydrate, and 1 mmol of Aluminium (III) nitrate nonahydrate are mixed in 20 mL of deionized water and stirred for 30 minutes at room temperature under air atmosphere. In parallel, under the same environmental condition, solution B, containing 6 mmol of sodium hydroxide and 0.5 mmol of sodium carbonate, is homogeneously stirred in 10 mL of deionized water for 30 minutes. Solution A containing the metal cations is added drop wisely to solution B, and the resulting suspension is transferred to a 50 mL Teflon-lined hydrothermal autoclave and placed inside the muffle furnace at 100° C. for 24 h. The sample is then cooled at room temperature to undergo a washing process until the pH is maintained at 7.0. The sample is dried in the oven overnight at 100° C., and the crystal formed is termed $Ni_xCo_yAl_z$ LDH. Similar processes are performed to synthesize $Ni_xCo_yAl_z$ LDH at different cationic ratios ($M^{2+}/M^{3+}$: 1, 2, 3), which are labeled as $Ni_{0.5}Co_{0.5}Al_1$ LDH, $Ni_1Co_1Al_1$ LDH, and $Ni_{1.5}Co_{1.5}Al_1$ LDH, respectively.

Figure 2:
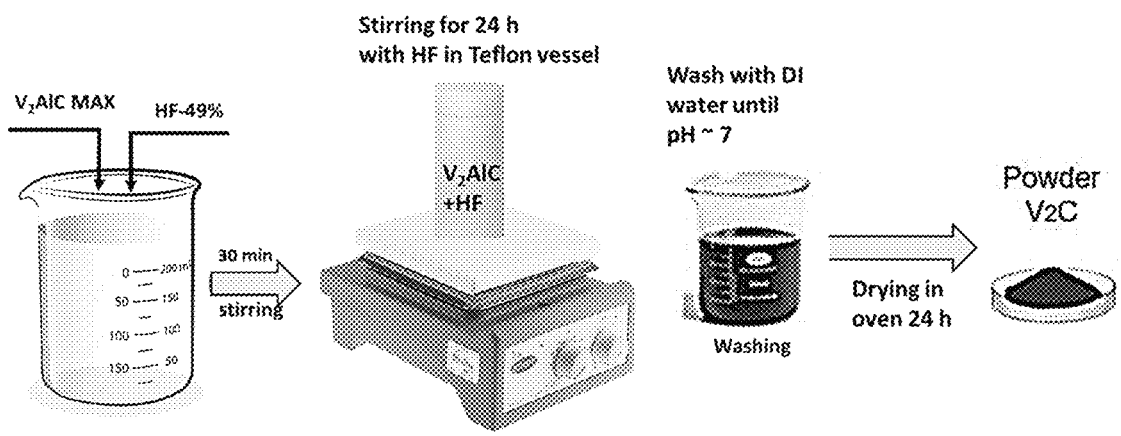
FIG. 2 shows the synthesis of $V_2C$ through wet-chemical etching, in accordance with the present invention.

In an embodiment of the present invention, an experimental setup is developed for the synthesis of $V_2CTx$ MXene. Vanadium aluminium carbide ($V_2AlC>98\%$) undergoes wet chemical etching to yield 2D structured vanadium carbide ($V_2CTx$) MXenes, as shown in FIG. 2. In a Teflon-lined reactor, 1 g of $V_2AlC$ MAX is combined with 40 mL of 49% hydrogen fluoride (HF). The mixture is stirred for 24 hours at room temperature. Subsequently, the suspension undergoes multiple rinses with deionized water until reaching a pH above 6.5. The particulates are separated from the liquid using a centrifuge. The resulting product, $V_2C$ MXene, is then dried in an oven overnight at 100° C.

Figure 3:
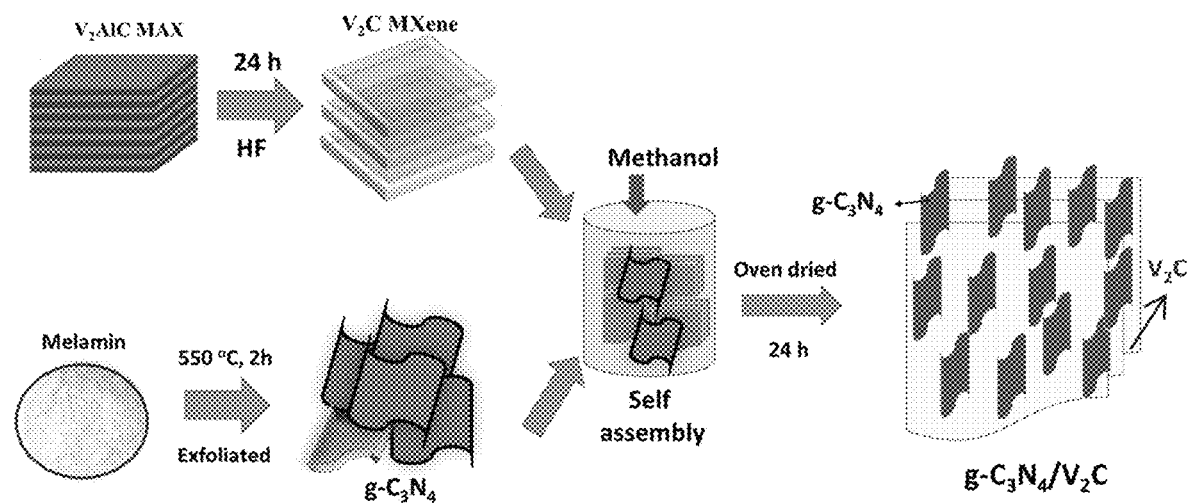
FIG. 3 shows a schematic illustration for the synthesis of $g-C_3N_4/V_2C$, in accordance with the present invention.

In an embodiment of the present invention, the composite of $V_2C/g-C_3N_4$ is prepared via a physical mixing method, as demonstrated in FIG. 3. Specifically, 0.5 g of $g-C_3N_4$ powder and 5 wt. % of prepared $V_2C$ (0.025 g) are dispersed in methanol and stirred for 2 h in parallel. Then, both samples are mixed and stirred for another 2 h, carried out under atmospheric conditions at room temperature. After stirring, the mixture is placed in the oven for drying overnight, and the obtained sample is labeled as $V_2C/g-C_3N_4$. A similar preparation procedure is repeated for the composite with different $V_2C$ loading (wt.%: 5, 10, 15, 20) is labeled as $5-V_2C/g-C_3N_4$, $10-V_2C/g-C_3N_4$, $15-V_2C/g-C_3N_4$, $20-V_2C/g-C_3N_4$.

Figure 4:
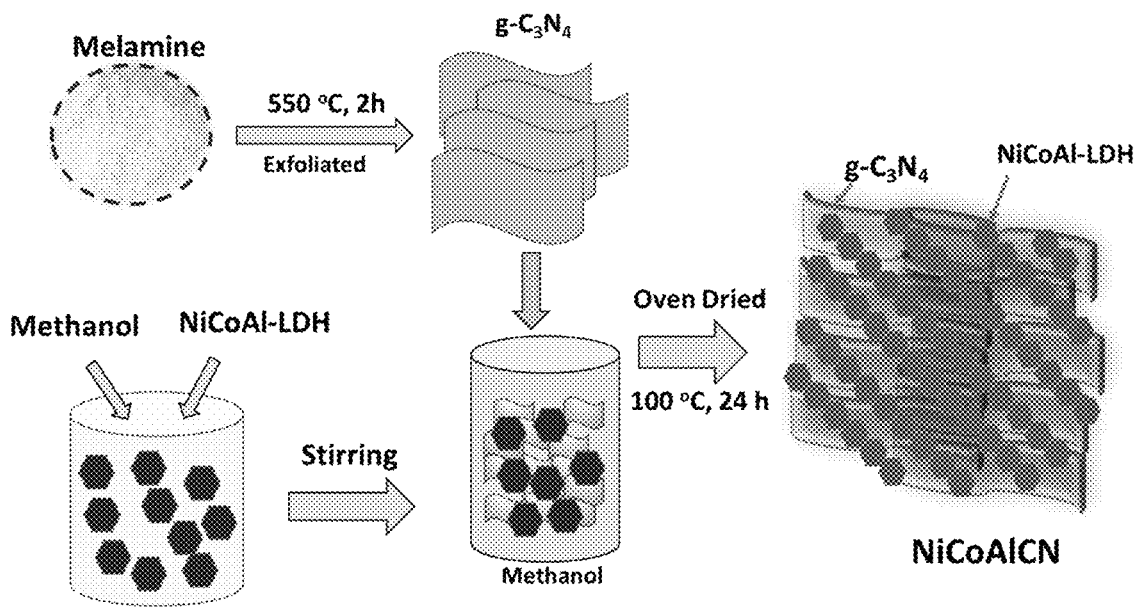
FIG. 4 shows a schematic illustration for the synthesis of gCN, $Ni_1Co_1Al_1$ LDH at different cationic compositions, and their composites, in accordance with the present invention.

In an embodiment of the present invention, $Ni_xCo_yAl_z$-LDH/$g-C_3N_4$ composite (xNiCoAlCN) with different mass ratios is prepared using the physical mixing method, The schematic illustration for the composite preparation is demonstrated in FIG. 4. In a typical procedure, 0.5 g of the synthesized gCN is stirred in 20 mL of methanol at room temperature under atmospheric conditions. The stirring process continued for 2 h to ensure the proper dispersion of the gCN particles. Subsequently, $Ni_xCo_yAl_z$ LDH at different cationic compositions are added to the resulting solution and further stirred for an additional 2 h under the same environmental conditions. The sample is then placed in the oven at 100° C. and is dried for 24 h. The resulting composites are named 1NiCoAlCN ($Ni_{0.5}Co_{0.5}Al_1$ LDH), 2NiCoAlCN ($Ni_1Co_1Al_1$ LDH), and 3NiCoAlCN ($Ni_{1.5}Co_{1.5}Al_1$ LDH). Further optimization of $Ni_xCo_yAl_z$ LDH loading in the xNiCoAlCN is conducted by adding different loading of $Ni_1Co_1Al_1$ LDH (5, 10, 15, and 20 wt. %) to the gCN suspension and named as 5-2NiCoAlCN, 10-2NiCoAlCN, 15-2NiCoAlCN, and 20-2NiCoAlCN.

Figure 5:
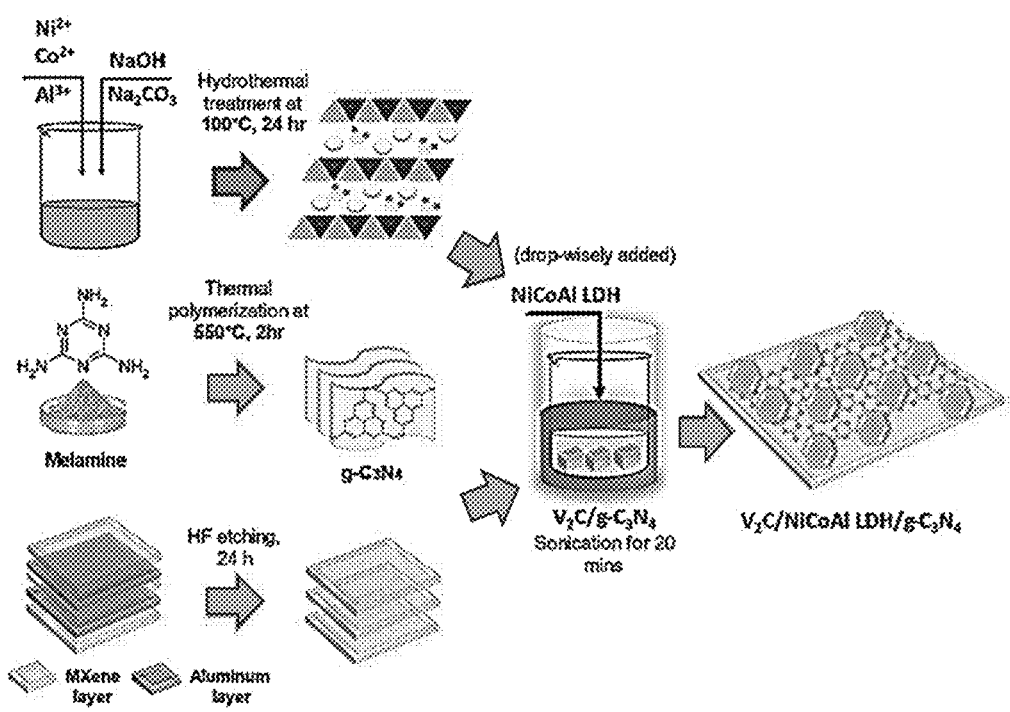
FIG. 5 shows a schematic illustration of preparation of ternary $V_2C/Ni_1Co_1Al_1$ LDH/g-$C_3N_4$ through physical mixing assisted sonication technique.

In an embodiment of the present invention, the preparation of $V_2C/Ni_1Co_1Al_1$ LDH/$g-C_3N_4$ composite is conducted using the physical mixing method followed by the sonication technique. FIG. 5 illustrates the schematic preparation of ternary $V_2C/Ni_1Co_1Al_1$ LDH/$g-C_3N_4$. In detail, 0.5 g of $g-C_3N_4$ and 10 wt. % of $Ni_1Co_1Al_1$ LDH are separately dispersed in 20 mL of methanol and stirred for 1 hour under environmental conditions at room temperature. After 1 h of stirring, 3 wt. % of $V_2C$ is added to the solution containing $g-C_3N_4$ in methanol and stirred thoroughly for 2 h. The resulting mixture of $V_2C$ and $g-C_3N_4$ is then subjected to sonication for 20 minutes, during which a solution of $Ni_1Co_1Al_1$ LDH is added drop-wise to ensure better dispersion of $Ni_1Co_1Al_1$ LDH into the composite. The resulting solution is then left dried in the oven for 24 h. The light-yellowish powder is named $V_2C/Ni_1Co_1Al_1$ LDH/$g-C_3N_4$. A similar procedure is followed to prepare $V_2C/Ni_1Co_1Al_1$ LDH/$g-C_3N_4$ at different $V_2C$ weight ratios (wt. %: 1, 3, 5).

In an embodiment of the invention, the photocatalytic hydrogen production experiments are carried out in a liquid slurry photoreactor system equipped with a 35 W HID Xe Lamp (k=420 nm) and an intensity of 20 mW cm$^{-2}$ as a visible source. In particular, 0.1 g of the photocatalyst is dispersed into the mixture solution of 95 mL distilled water with 5 mL (5%) vol of methanol as a sacrificial agent under continuous stirring. Nitrogen ($N_2$) serves as a carrier gas and is supplied to the reactor system for cleaning out the system before the reaction starts to remove any impurities. The sampling bag is purged with $N_2$ to ensure no residual $H_2$ gas from previous experiments. The reaction starts when the lamp is turned on, and $N_2$ gas is let flow continuously at a flow rate of 15 mL min$^{-1}$. The reaction is carried out for a duration of 4 h, and the concentration of $H_2$ (ppm) collected in the sampling bag is measured every 1 h of the reaction using a gas analyzer (for eg; Brotie Model 100). Pure catalysts such as $g-C_3N_4$, $V_2AlC$, $V_2C$, NiCoAl LDH, the binary composite of $V_2C/g-C_3N_4$, NiCoAl LDH/$g-C_3N_4$, and the ternary composite of $V_2C$/NiCoAl LDH/$g-C_3N_4$ are characterized by XRD, Raman, FTIR, FESEM, EDX, TEM, UV-Vis, PL, M-S, and XPS to investigate their structural crystallinity, chemical composition and structure, optoelectronic properties, and surface morphology.

Figure 6:
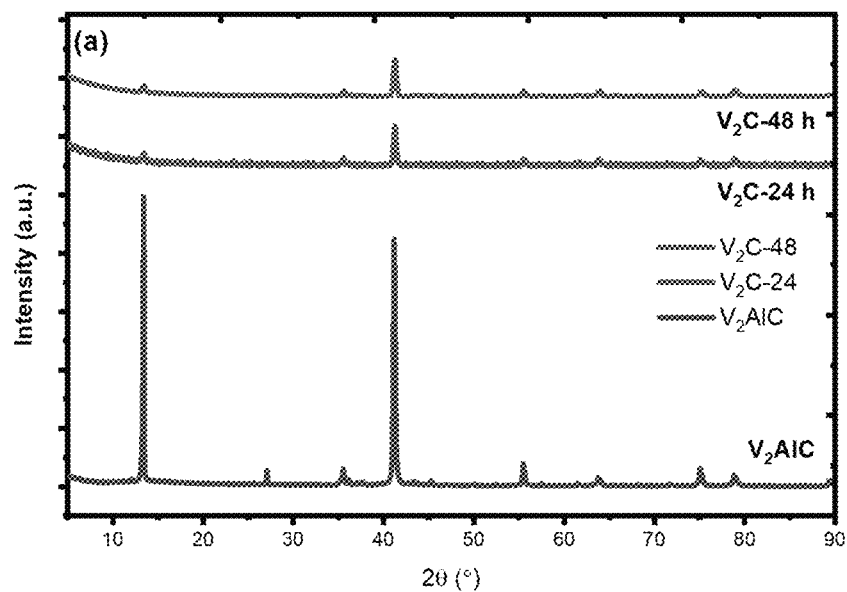
FIG. 6 shows XRD analysis of $V_2AlC$, and $V_2C$ (etching time: 24, 48), in accordance with the present invention.
Figure 7:
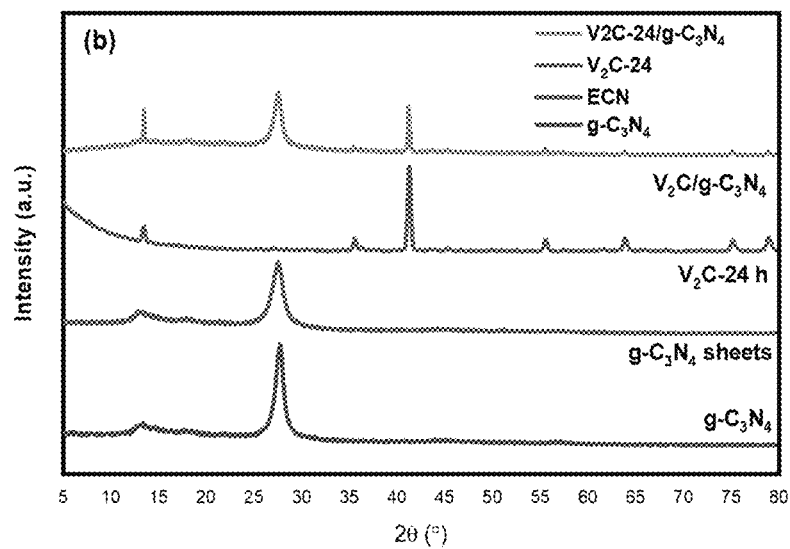
FIG. 7 shows XRD peaks of $V_2C-24/g-C_3N_4$, $V_2C-24$, exfoliated $g-C_3N_4$ sheets (ECN) and $g-C_3N_4$.

XRD analysis is performed to authenticate the crystal structure and mineralogy of the prepared samples. The XRD patterns of, $V_2AlC$, and $V_2C$ at different etching times, are shown in FIG. 6. Pure $g-C_3N_4$ obtained through the thermal polymerization of melamine typically shows two main diffraction peaks. The intense peak at 27.450 signifies the stacking of the aromatic structure of $g-C_3N_4$, attributed to the (002) crystal plane. Meanwhile, a weaker peak is observed at 12.81°, indicating the structural packing of the tri-s-triazine unit of g-$C_3N_4$ corresponding to the (100) plane and is consistent with JCPDS No. 87-1526. Meanwhile, the sharp peak at 13.50° and 41.3° presence in $V_2AlC$ corresponds to the (002) and (103) crystal planes of MAX phases. The reduction in the peaks of the basal planes (002) and (103), observed in $V_2C$, indicates the removal of Al atoms from the MAX phase and the formation of multilayer $V_2C$. For the $V_2C$ MXene prepared through different etching times, it can be ascertained that the etching time does not affect the formation of $V_2C$, as the significant peak of $V_2C$ is present in $V_2C$ samples etched for, 24 h, and 48 h. Furthermore, increasing the reaction time with HF does not contribute to the formation of new particles as those observed in $Ti_3C_2$ MXene. FIG. 7 shows the XRD peaks of $V_2C$-24/g-$C_3N_4$, $V_2C$-24, exfoliated g-$C_3N_4$ sheets (ECN) and g-$C_3N_4$. For the binary $V_2C$/g-$C_3N_4$ composite, all characteristic peaks of both $V_2C$ and g-$C_3N_4$ are present in the nanocomposite, indicating a successful fabrication of the $V_2C$/g-$C_3N_4$ through physical contact. Besides, no new XRD peak is observed in the nanocomposite, indicating no alteration in the structure of the intrinsic components. A small shifting of the basal plane (106) towards the lower angle in $V_2C$/g-$C_3N_4$ observed from FIG. 7 signifies the interlayer disruption and reduced structural compactness due to the insertion of g-$C_3N_4$.

Figure 8:
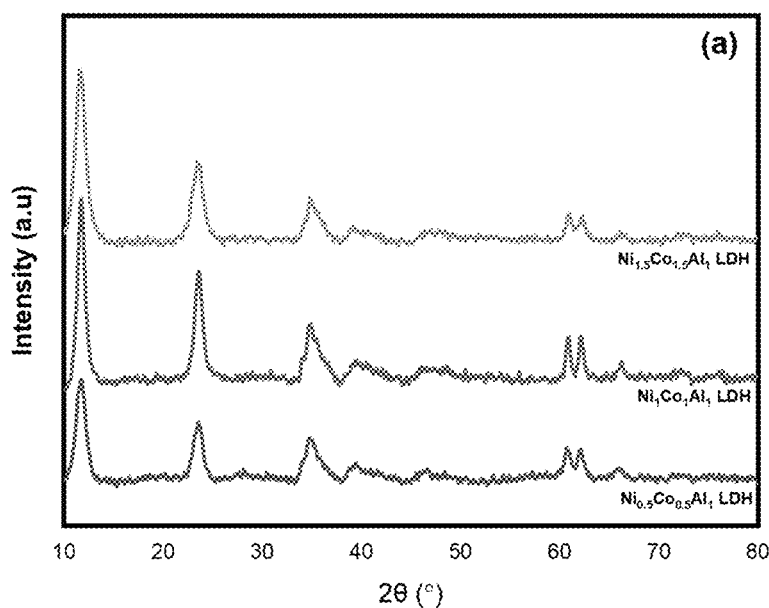
FIG. 8 shows XRD analysis of NiCoAl LDH at different cationic ratios, in accordance with the present invention.

In XRD analysis of NiCoAl LDH/g-$C_3N_4$, apparent peaks observed in FIG. 8 at 11.71°, 23.65°, 35.03°, and 60.93° reflect the (003), (006), (012), and (110) crystal planes of NiCoAl LDH attributing to their 2D hydrotalcite-like characteristics. Specifically, the (003) diffraction peak is accredited to the layered structure of the materials. The presence of peaks at (006), (012), and (110) is attributed to the hexagonal lattice of the LDH. The lattice parameter c is calculated from the diffraction plane of (003), as $c=3d_{003}$, which is three times the distance of $d_{003}$ with respect to the nature of the intergallery anion, average charge of metal cations, and the water content, depicting the total thickness of the cationic layer plus the interlayer distance. The parameter a is calculated from the (110) plane as $a=2d_{110}$, ascribing the average metal-metal distance in the LDH framework corresponding to the 3R packing of octahedral-structured brucite sheets.

Conversely, smaller basal spacing is observed (c=22.63 Å) at the optimum cationic ratio of $Ni_1Co_1Al_1$ LDH with a layer charge density of x=0.33. A higher charge density promotes a stronger electrostatic interaction between the metal hydroxides layer and adsorbed molecules, which could also affect the structural stability and significantly impact the photocatalytic performances. Notably, fine-tuning the cationic ratio relative to charge density can also adjust the band gap energy of the LDH material, which can be reflected from the tauc plot. However, excessive charge density could limit the water adsorption and restrict the interlayer space through the sandwiching effect of the carbonate anions. A slight decrease in the cell parameter 'a' with a progressive increase of the divalent metal ions can be attributed to the variation in the ionic radius of divalent, Co (0.7 Å), Ni (0.7 Å) and trivalent Al (0.53 Å), in the octahedral framework of NiCoAl LDH, also attributing to the repulsion of $Al^{3+}$ corroborating the amorphous substitution.

Figure 9:
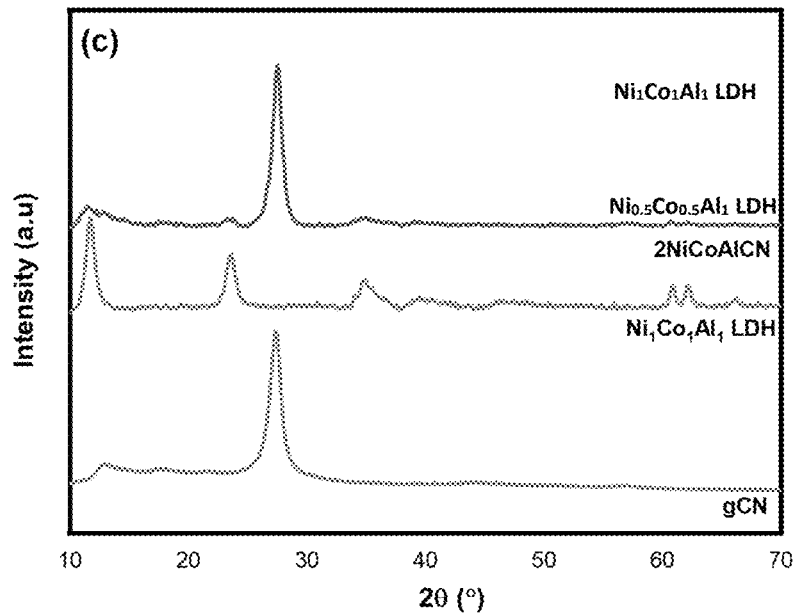
FIG. 9 presents XRD of gCN, $Ni_1Co_1Al_1$ LDH, and 2NiCoAlCN, in accordance with the present invention.

The crystallite sizes of the NiCoAl LDH at different cationic ratio is calculated based on Scherrer calculation with regards to the full-width-at-half-maximum (FWHM) of (003) reflections, following the trend of $Ni_1Co_1Al_1$ LDH (9.07 nm)>$Ni_{0.5}Co_{0.5}Al_1$ LDH (6.82 nm), $Ni_{1.5}Co_{1.5}Al_1$ LDH (6.39 nm). A larger crystallite size is obtained at an optimum ratio of $Ni_1Co_1Al_1$ LDH, influencing the changes in the electronic structure and bonding, resulting in a larger surface area exposure and an increase in the surface active sites corresponding to an enhanced solar absorption response. Smaller crystallite sizes are noticed when altering the cationic ratio to $Ni_{0.5}Co_{0.5}Al_1$ LDH can be due to the impurity formation affecting the crystal growth. The gradual increase in the $Al^{3+}$ substitution to that of $Ni^{2+}$, $Co^{2+}$, which increases with the charge density, may potentially cause structural distortions and the formation of unstable LDH. Relevantly, tuning the cationic composition to optimal charges density (0.2<x<0.33) is crucial to avoid the formation of unwanted phases and ensure high purity of LDH material. Previous works highlighted the significant changes in the structural stability, crystallinity, and phase purity upon cationic tuning with ideal $M^{2+}/M^{3+}$ to be 2-4. The possible formation of other phases is not evident in the XRD data due to the small quantity of the formed products. However, a gradual decrease in the intensity peak from the XRD data with respect to a significant decrease in the divalent cationic ratio ($Ni^{2+}$ and $Co^{2+}$), elucidating poor crystallinity of the material and can be due to the formation of additional phases which impede their catalytic activity. The intense peak is noticed in $Ni_1Co_1Al_1$ LDH and $Ni_{1.5}Co_{1.5}Al_1$ LDH, signifying that both exhibit good crystallinity in favor of highly active $Ni^{2+}$ and $Co^2$. Additionally, as depicted in FIG. 9, all the major diffraction peaks of gCN and $Ni_1Co_1Al_1$ LDH can be observed in the composite of 2NiCoAlCN, indicating a successful fabrication.

Figure 10:
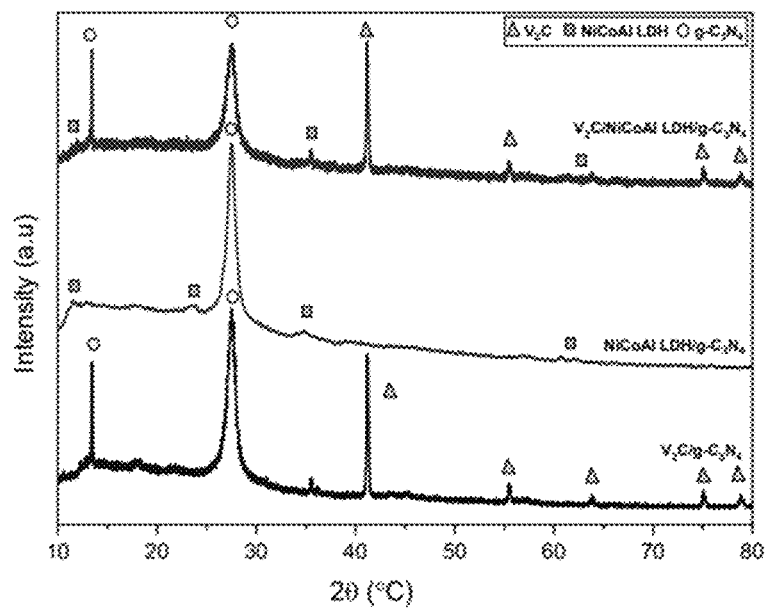
FIG. 10 represents XRD analysis of binary $V_2C/g-C_3N_4$, NiCoAl LDH/g-$C_3N_4$, and ternary $V_2C/NiCoAl$ LDH/g-$C_3N_4$ nanocomposite.

The successful construction of a ternary $V_2C$/NiCoAl LDH/g-$C_3N_4$ composite is confirmed through phase identification of each constituent material. FIG. 10 illustrates the XRD diffraction patterns of g-$C_3N_4$, $V_2C$, and NiCoAl LDH in the ternary composite. A peak comparison is also performed between the binary $V_2C$/g-$C_3N_4$ composite and the NiCoAl LDH/g-$C_3N_4$ composite. Significantly, the presence of g-$C_3N_4$ material in the composite is affirmed by the pronounced peaks observed at 12.81° and 27.45°, which correspond to the (100) and (002) crystal planes. Meanwhile, diffraction peaks observed at 41.3°, 55.53°, 75.14°, and 78.80° provide strong evidence for the incorporation of $V_2C$ in the ternary $V_2C$/NiCoAl LDH/g-$C_3N_4$ composite. The successful integration of NiCoAl LDH is confirmed by the presence of prominent peaks allocated at 11.71°, 23.65°, 35.03°, and 60.93°, which correspond to the (003), (006), (012), and (110) crystal planes, respectively, attributed to its hydrotalcite-like structure. No additional peaks are observed, indicating the absence of any other phase impurities in the ternary $V_2C$/NiCoAl LDH/g-$C_3N_4$ composite. However, the lower peak intensity for NiCoAl LDH and $V_2C$ can be attributed to their relatively small proportion in the composite compared to g-$C_3N_4$.

Figure 11:
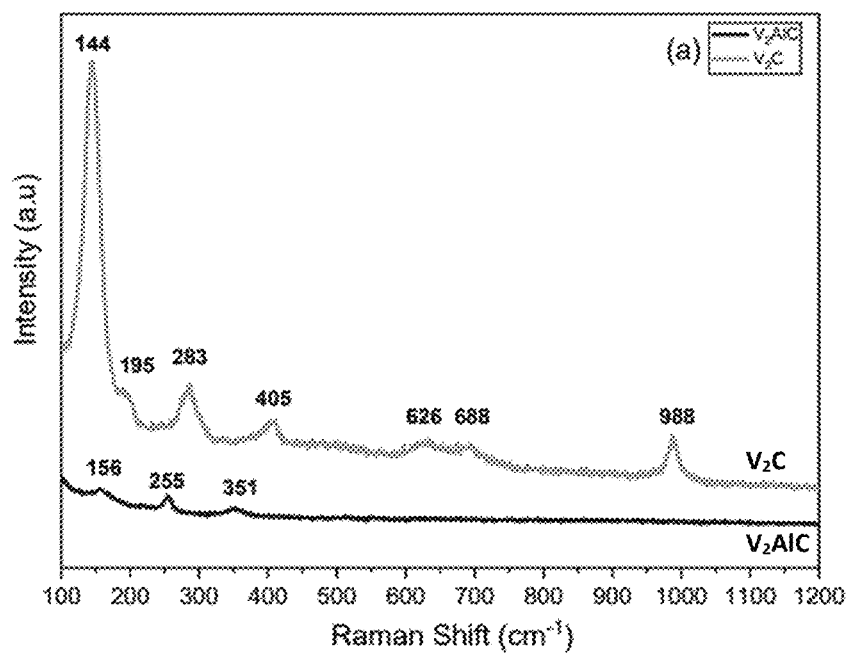
FIG. 11 shows Raman spectra of $V_2AlC$ and $V_2C$, in accordance with the present invention.

Raman analysis is performed to analyze the vibrational states of the materials through the observation of wavenumber shifts in the Raman spectra. The Raman shift for the $V_2C$, and $V_2AlC$ are depicted in FIG. 11. Prominent characteristic peaks can be observed for g-$C_3N_4$ at 476, 707, and 1229 $cm^{-1}$ confirming the polymeric structure of g-$C_3N_4$. Particularly, the shifting in the Raman peaks between 500-1330 $cm^{-1}$ demonstrates the typical heptazine unit exhibited by g-$C_3N_4$. The peak at 707 $cm^{-1}$ indicates the in-plane bending vibrations of the heptazine linkages and corresponds to the s-triazine ring of g-$C_3N_4$. On the other hand, the peaks that appeared in $V_2AlC$ at 156, 255, and 351 $cm^{-1}$ are due to the vibration of Al in the MAX phase.

The peaks are observed to disappear after the HF treatment, indicating the removal of the Al element. Whereas the appearance of the new peaks at 144, 195, 283, 405, 626, 688, and 988 cm$^{-1}$ explicates the successful formation of V$_2$C. The peak observed at 283 cm$^{-1}$ is attributed to the formation of the space interval of V$_2$C ascertains the difference in the structure from bulk V$_2$AlC. The formation of termination groups is affirmed through the appearance of several new peaks. The peak observed at 144 cm$^{-1}$ confirms the creation of O-terminated V$_2$C, while the peaks at 283 and 405 cm$^{-1}$ are ascribed to —F and —OH terminations. The approximate peak at 626 cm$^{-1}$ indicatively corresponds to mixed heterogeneous termination groups (—F, —O, —OH) based on the conducted study. For the composite of V$_2$C/g-C$_3$N$_4$, all the characteristic peaks of both g-C$_3$N$_4$ and V$_2$C are present, indicating a successful fabrication of the nanocomposite.

Figure 12A:
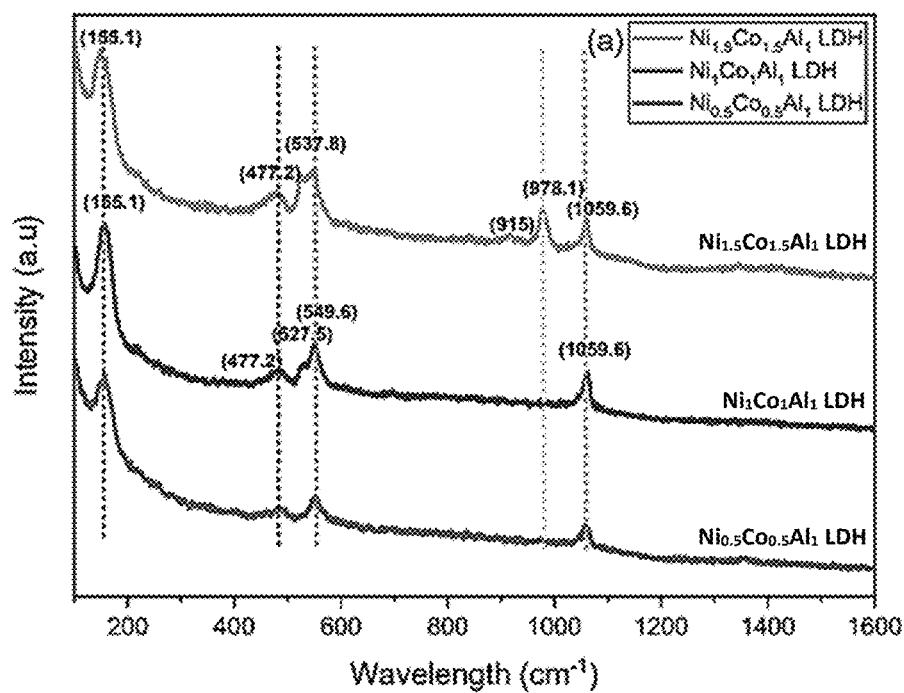
FIG. 12A shows Raman spectra for NiCoAl LDH at different cationic ratios.
Figure 12B:
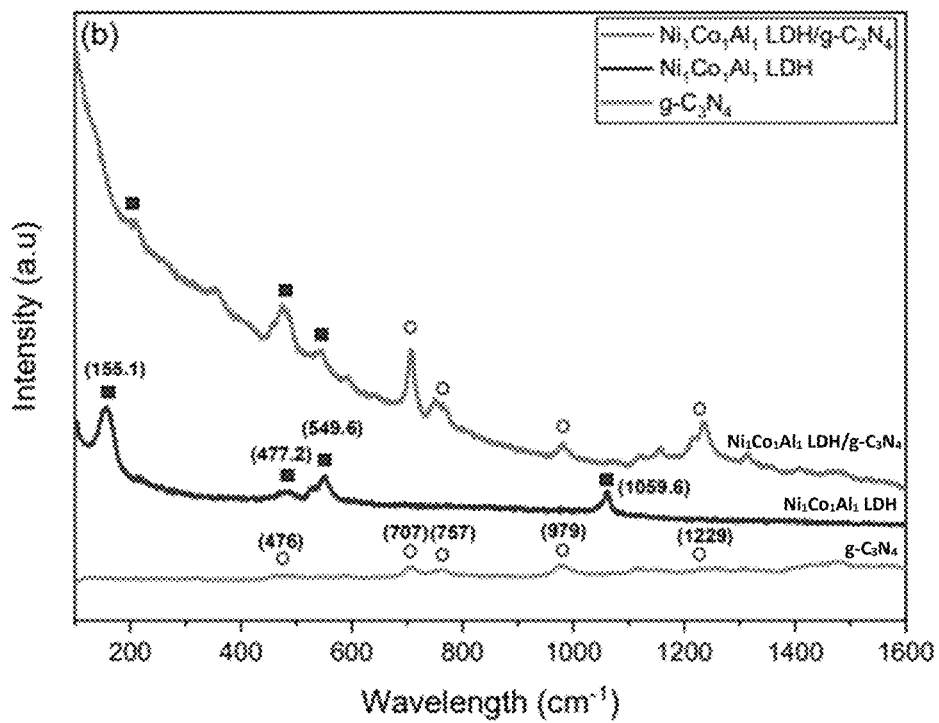
FIG. 12B shows Raman spectra for $g-C_3N_4$, $Ni_1Co_1Al_1$ LDH, and $Ni_1Co_1Al_1$ LDH/g-$C_3N_4$, in accordance with the present invention.

The Raman spectra of NiCoAl LDH at different cationic compositions, g-C$_3$N$_4$, and composite Ni$_1$Co$_1$Al$_1$ LDH/g-C$_3$N$_4$, are presented in FIG. 12A and FIG. 12B. For pure NiCoAl LDH, Raman shift at 155.1 cm$^{-1}$ is attributed to the O-M-O bending modes of the LDH. The bands at approximately 477.2 and 527.5 cm$^{-1}$ correspond to the symmetric stretching of Ni$^{2+}$(Co$^{2+}$)— Ni$^{2+}$(Co$^{2+}$)—O—Al$^{3+}$ (MII-O-MIII) and Al$^{3+}$—OAl$^{3+}$ (MIII-O-MIII) in the hydrotalcite structure of LDH. The stretching of OH—O band between the nitrate ion and interlayer water molecules can be observed with the shifting in the Raman peak at 549.6 cm$^{-1}$. Meanwhile, the peak at 1059.6 cm$^{-1}$ is due to the stretching of the CO3$^{2-}$ anion at the interlayer of LDH. The reduction of intensity peak observed at 400-500 cm$^{-1}$ in a different compositional ratio of NiCoAl LDH stemmed from the reduction in the M$^{2+}$/M3 ratio with respect to the layer-charged density. A weaker peak intensity can be observed in Ni$_1$Co$_1$Al$_1$ LDH, indicating lower material crystallinity. This observation is consistent with the XRD data and suggests the possible presence of impurity phases. Nevertheless, the emergence of supplementary peaks, distinguished at 915 cm$^{-1}$ and 978.1 cm$^{-1}$ in higher cationic ratio LDH, may be attributed to the formation of bicarbonate ions (HCO$_3$—) due to partial substitution of OH in the interlayer region. Meanwhile, in Ni$_1$Co$_1$Al$_1$ LDH/g-C$_3$N$_4$ nanohybrids depicted in FIG. 12B, the prominent peaks corresponding to g-C$_3$N$_4$ are observed at wavenumbers of 476, 707, 757, and 1229 cm$^{-1}$ attributed to their polymeric structure and bending mode of the graphitic domain. The characteristic peaks of heptazine linkages can be observed at 707 and 757 cm$^{-1}$, while the shifting at 979 cm$^{-1}$ is due to the tri-triazine unit's symmetrical N-vibration mode. The red-shifted of 979 cm$^{-1}$ peak to 981 cm$^{-1}$ in the nanohybrids is due to the strains compression at the interface of g-C$_3$N$_4$ and Ni$_1$Co$_1$Al$_1$ LDH, signifying the presence of heterojunction between two materials.

Figure 13:
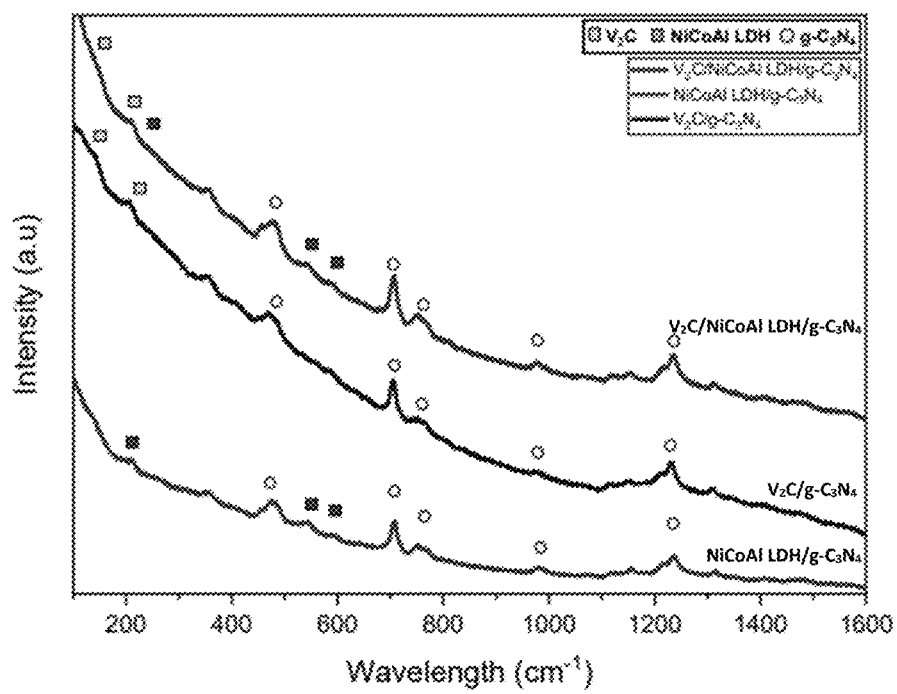
FIG. 13 shows Raman analysis of binary $V_2C/g-C_3N_4$, NiCoAl LDH/g-$C_3N_4$, and ternary $V_2C/NiCoAl$ LDH/g-$C_3N_4$ nanocomposite, in accordance with the present invention.

Raman spectra for the ternary V$_2$C/NiCoAl LDH/g-C$_3$N$_4$ composite are depicted in FIG. 13. The Raman spectrum displays prominent peaks corresponding to g-C$_3$N$_4$, indicating its higher proportion in the composite. Additionally, the analysis of the individual components of g-C$_3$N$_4$, V$_2$C, and NiCoAl LDH, in both binary structures confirm the successful construction of the ternary composite. Furthermore, the Raman spectra clearly indicate that no impurities are formed and no additional phases emerged during the synthesis of the ternary composite V$_2$C/NiCoAl LDH/g-C$_3$N$_4$.

Figure 14A:
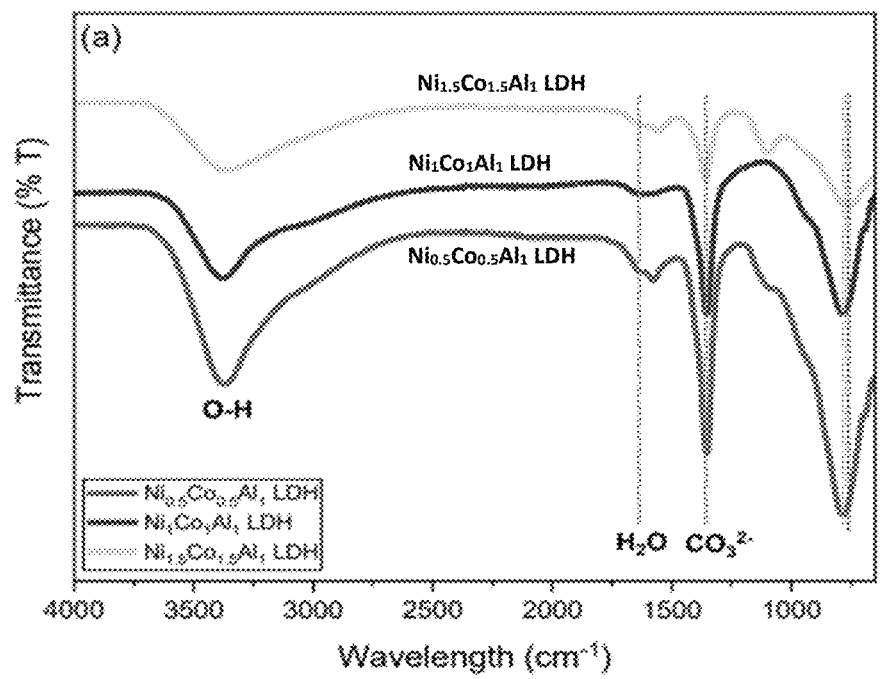
FIG. 14A shows FTIR of $Ni_xCo_yAl_z$ LDH at different cationic compositions, in accordance with the present invention.
Figure 14B:
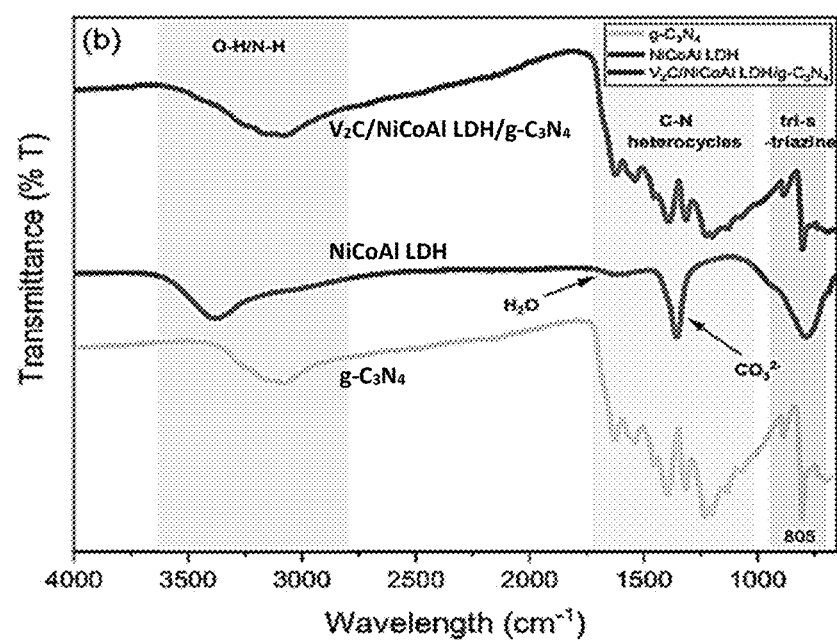
FIG. 14B shows FTIR of pure $g-C_3N_4$, NiCoAl LDH and ternary $V_2C/NiCoAl$ LDH/g-$C_3N_4$, in accordance with the present invention.

In an embodiment of the invention, the Fourier Transform Infrared Spectroscopy (FTIR) spectra are performed to further affirm the chemical phases of NiCoAl LDH at different cationic ratios, as depicted in FIG. 14A. The absorption band at the region of 3300-3600 cm$^{-1}$ is assigned to the bending vibration of the interlayer hydroxyl group, —OH. Increasing the cationic ratio broadens the absorption band, which can be deconvoluted into two overlapping peaks, corroborating the existence of different strengths of hydrogen bonds and the presence of bicarbonate species. Meanwhile, the band appearing at 1640 cm$^{-1}$ is accredited to the angular deformation of water δ (H—O—H). The peak observed at 1357 cm$^{-1}$ is associated with the stretching vibration mode of the intercalating anions of CO$_3^{2-}$. Meanwhile, for the ternary V$_2$C/NiCoAl LDH/g-C$_3$N$_4$ depicted in FIG. 14B, the sharp peak at 805 cm$^{-1}$ is accredited to the vibrational modes of the tri-s-triazine unit of g-C$_3$N$_4$. The presence of peaks in the 1020-1700 cm$^{-1}$ range is attributed to the stretching vibration of CN heterocycles. The broad peak in the 2800-3600 cm$^{-1}$ range corresponds to the stretching vibration of the amino group (N—H) in g-C$_3$N$_4$ and the adsorbed O—H. It can be observed that the nanocomposite exhibits a broader peak at this region compared to pure g-C$_3$N$_4$, which can be due to the overlapping of interlayer hydroxyl group, —OH in NiCoAl LDH and —OH functional group in V$_2$C. Additionally, the FTIR spectra in the ternary V$_2$C/NiCoAl LDH/g-C$_3$N$_4$ exhibit closely similar peaks to those observed in g-C$_3$N$_4$, and it is challenging to distinguish the presence of NiCoAl LDH from the spectra. This resemblance can be attributed to two main factors: (1) a higher proportion of g-C$_3$N$_4$ in the nanocomposite compared to NiCoAl LDH and V$_2$C; (2) the overlapping of NiCoAl LDH and g-C$_3$N$_4$ peaks. Nevertheless, the XRD analysis confirms the successful formation and construction of the nanocomposite.

In an embodiment of the present invention, the morphology and structure of the materials are investigated by using Field Emission Scanning Electron Microscope (FESEM) analysis. The morphological structure of V$_2$AlC and V$_2$C at different etching times is analysed. The morphology of V$_2$AlC exhibits larger bulk particles. Treating V$_2$AlC with HF successfully generates an exfoliated structure of V$_2$C, as reported in the previous literature. The V$_2$C is as-prepared at different etching times and morphology is analysed. Treating V$_2$AlC at 49% of HF concentration for 12 h does not achieve a complete exfoliation and can not etch out the aluminum layers. Nevertheless, a noticeable degree of exfoliation can be observed, although it does not form a multilayered structure. The compact structure of V$_2$C-12 can result in the inefficient transmission of charges on its surfaces, impeding the photocatalytic reaction. Increasing the etching time up to 24 h reveals a perfect structure exfoliation. This results in the formation of a well-defined multilayered structure, indicating the successful removal of aluminum from V$_2$AlC to form V$_2$C. An apparent formation of a broader interval layer facilitates the effective incorporation of multi-structured materials. Meanwhile, extending the HF etching of V$_2$AlC to 48 h induces defects in the V$_2$C structure, as evident from the formation of cheese-like morphology. A long etching period may effectively remove the Al layer from V$_2$AlC but can result in the formation of an ill-defined structure which could negatively impact the photocatalytic activity. The structural defects formed in V$_2$C-48 can act as centers for charge recombination, leading to a decrease in photocatalytic efficiency. Therefore, fine-tuning the etching parameters is crucial to achieve an optimized V$_2$C structure with a well-defined multilayer structure while avoiding the over-etching of V$_2$C.

LDH exhibits the typical 2D hexagonal nanoplates structure. Generally, pure NiCoAl LDH exhibits a considerably smaller nanoscale size than other LDH types. This can be attributed to the incorporation of Al, which have a smaller cationic radius as compared to other metal cations, thereby leading to an increase in the lattice parameter. Notably, distinct differences in the morphological structure of NiCoAl LDH can be discerned in different cationic compositions. The morphological development of LDH at different cationic ratios can significantly impact the photocatalytic properties and performance efficiency. Specifically, lower cationic ratio $Ni_{0.5}Co_{0.5}Al_1$ LDH exhibits highly aggregated and smaller nanoplate sizes that coalesce. The nanoplate structure appears to be ill-defined and is more reminiscent of GD nanoparticles rather than well-defined nanoplates. Higher surface energy in $Ni_{0.5}Co_{0.5}Al_1$ LDH, due to its smaller particle sizes, results in structural clustering, reducing its surface area and limiting the availability of reaction-active sites. This is consistent with the BET surface area (SBET) analysis, where $Ni_{0.5}Co_{0.5}Al_1$ LDH exhibit the lowest $S_{BET}$ of 95 m$^2$/g, followed by $Ni_{1.5}Co_{1.5}Al_1$ LDH and $Ni_1Co_1Al_1$ LDH with $S_{BET}$ of 108.57 and 115.75 m$^2$/g, respectively. Additionally, the non-definite nanoplates shape with the additional formation of smaller particulate structures can be attributed to the potential formation of some oxide/hydroxide phases, leading to the unstable construction of LDH. This is due to higher charges density (x=0.5) causing unwanted formation of other phases, resulting in low purity of LDH material as ascribed by previous studies. Nevertheless, fine-tuning the cationic ratio relative to the layer charge density allows for a well-constructed LDH structure. A prominent nanoplate structure can be observed at the optimal ratio ($Ni_1Co_1Al_1$ LDH) with more definitive edges indicating a profound hydrotalcite formation. The proper formation of LDH facilitates improved contact formation with other materials, thereby aiding in the construction of material interfaces in heterojunction systems. Besides, a higher surface-to-volume ratio exhibited by $Ni_1Co_1Al_1$ LDH permits better light utilization which could expedite the photocatalytic activity. Meanwhile, increasing the cationic ratio degenerates the hydrotalcite structure. The planar nanoplate has become disoriented, and folding within the structure has occurred. The structural disorientation may result in poor reactant diffusion t the active sites, resulting in decreased catalytic efficiency. Controlled morphology through cationic regulation is a significant step towards achieving highly efficient LDH materials, as it can notably influence photocatalytic performances.

Pure g-$C_3N_4$ structure exhibits a typical 2D stacked sheet, which displays an evident asymmetrical folding pattern leading to a reduced surface area exposure. $V_2C$/g-$C_3N_4$ composites display a sheet-on-layer morphology at 24 h of $V_2C$ HF etching. The large interval gap aids the insertion of g-$C_3N_4$ sheets sandwiched between the vanadium-containing layer of $V_2C$. This can significantly be observed from the shifting of XRD peak at (106) $V_2C$ towards a lower angle, indicating layer expansion in the nanocomposite. Besides, the 2D planar orientation of $V_2C$ offers an effective platform for the attachment of g-$C_3N_4$, which indicatively reduce the aggregation in the g-$C_3N_4$ sheets. FESEM analysis of the Ni1Co1Al LDH/g-$C_3N_4$ composite reveals the attachment of smaller-sized LDH nanoplates onto the aggregated sheets of g-$C_3N_4$, forming a 2D/2D morphological nanocomposite. The larger planar structure of g-$C_3N_4$ facilitates the attachment of LDH nanoplates, resulting in an intimate interface contact and abundant surface-active sites. FESEM image analysis depicts the construction of ternary $V_2C$/NiCoAl LDH/g-$C_3N_4$ nanocomposite. An evident layered $V_2C$ with the attachment of g-$C_3N_4$ near its intervals gap can be observed at 1 µm scale image. Larger lateral sizes of $V_2C$ endow them as a perfect supporting platform for NiCoAl LDH/g-$C_3N_4$. It is difficult to visually observe NiCoAl LDH at this scale due to its very small structural sizes. However, the well-distributed presence of NiCoAl LDH can be clearly observed at 500 nm, signifying the successful construction of the ternary composite. It is evident that a higher proportion of g-$C_3N_4$ efficiently stacks onto $V_2C$ surfaces, whereby smaller NiCoAl LDH nanoplates can be observed to be well dispersed on the g-$C_3N_4$ surfaces. The combination of 2D structures with different morphological sizes has been shown to enhance photocatalytic activity. NiCoAl LDH exhibits comparatively smaller sizes and diameters than other ternary LDH structures, influencing its optical properties and photo-absorption capabilities, likely due to the electron confinement-due sizes. Well-dispersed Ni1Co1Al LDH with the synergy of g-$C_3N_4$ and $V_2C$ as a stabilization platform to reduce the aggregation of the nanoplates, improve light absorption activity and hasten the redox performances. In addition, the nanosized Ni1Co1Al LDH creates a short diffusion channel for electron migration to undergo a reduction reaction. The distinct features of ternary $V_2C$/NiCoAl LDH/g-$C_3N_4$, characterized by its 2D/2D/2D morphology at different structural sizes, facilitate excellent contact formation, which aids in constructing a multi-hybrid heterojunction photocatalyst.

EDX mapping and elemental composition analysis of the ternary $V_2C$/NiCoAl LDH/g-$C_3N_4$ confirms that all the elements of C, N, Ni, Co, Al, V, and O are uniformly distributed in $V_2C$/NiCoAl LDH/g-$C_3N_4$. The elemental mapping of V and C discloses the even dispersion of $V_2C$ in the nanocomposite. Additionally, the elemental mapping of N reveals the integration of g-$C_3N_4$ onto the planar $V_2C$ structure. The homogeneous distribution of elemental Ni, Co, and A confirms the successful anchoring of NiCoAl LDH onto the composite. Notably, the sonication process effectively promotes the complete coverage of small NiCoAl LDH particles onto the binary $V_2C$/g-$C_3N_4$ composite in all areas. This confirms the successful integration of morphologically tuned 2D/2D/2D $V_2C$/NiCoAl LDH/g-$C_3N_4$.

The detailed structure of binary $V_2C$/g-$C_3N_4$, NiCoAl LDH/g-$C_3N_4$, and ternary $V_2C$/NiCoAl LDH/g-$C_3N_4$ with their crystallographic interface are investigated by using Transmission Electron Microscopy (TEM) analysis. The TEM image of pure $V_2C$ is analysed with a calculated lattice spacing of 0.22 nm, corresponding to (103) crystal plane. The multilayered structure of $V_2C$ with the distribution of g-$C_3N_4$ sheets verifies their close interface interaction. The d-spacing of g-$C_3N_4$ and $V_2C$ is calculated to be 0.31 nm and 0.22 nm, assigned to the (002) plane of g-$C_3N_4$ and (103) $V_2C$, respectively. The internal structure and the morphology of NiCoAl LDH and NiCoAl LDH/g-$C_3N_4$ with their heterojunction formation shows that pure NiCoAl LDH exhibits a small nanoplate-like structure. A more detailed view of TEM image analysis at higher magnification, reveals the inherent hexagonal nanoplate structure of the material, consistent with observations made through FESEM imaging. Meanwhile, in TEM images of NiCoAl LDH/g-$C_3N_4$, two different structures are observed to coincide, where a smaller, darker sheets-like plate is stacked onto a larger transparent sheet, suggesting the successful stacking of NiCoAl LDH onto g-$C_3N_4$. Larger g-$C_3N_4$ sheets which serve as a supporting platform for the attachment of smaller NiCoAl LDH nanoplates, promote an intimate contact formation between both semiconductors. The lattice fringe calculated at 0.26 nm is accredited to (012) plane of pure NiCoAl LDH. The labeled structure of both NiCoAl LDH and g-$C_3N_4$ further demonstrates that both are well incorporated, forming stable heterogenous nanohybrids. From the TEM images of ternary $V_2C$/NiCoAl LDH/g-$C_3N_4$, it can be noticed that the successful construction of the ternary heterojunction composite with intimate interaction is achieved with a distinct grain boundary region formed between $V_2C$, NiCoAl LDH, and g-$C_3N_4$.

Figure 15A:
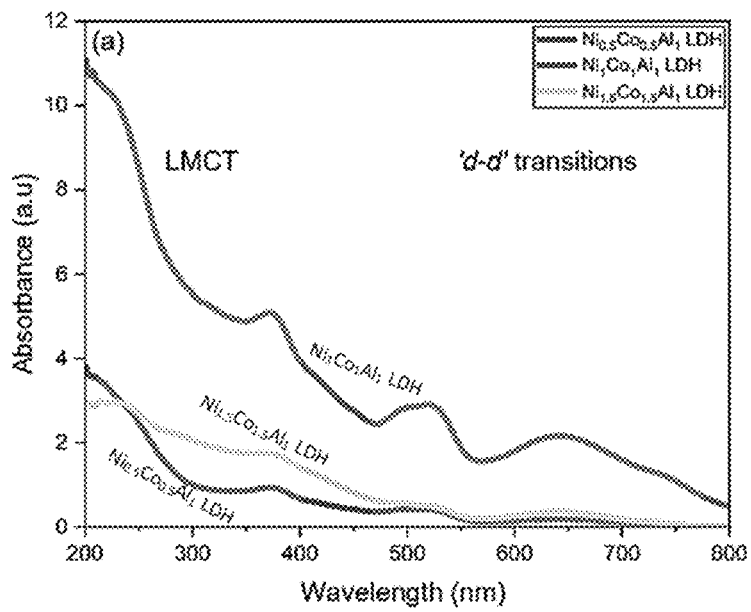
FIG. 15A and FIG. 15B show UV-V is spectra of different cationic composition of $Ni_xCo_yAl_z$ LDH, and UV-V is spectra of pure $g-C_3N_4$, $V_2C$, $Ni_1Co_1Al_1$ LDH, binary $V_2C/g-C_3N_4$, binary NiCoAl LDH/g-$C_3N_4$, and ternary $V_2C/Ni1Co1Al1$ LDH/g-$C_3N_4$ respectively, in accordance with the present invention.

UV-Vis diffuse reflectance spectra (DRS) are performed to attain a clear understanding of the light absorption properties of the as-prepared samples. The optical properties and the electronic charge transfer path of NiCoAl LDH at different cationic ratios are explored through UV-Vis diffuse reflectance at the range of 200-800 nm, as depicted in FIG. 15A. NiCoAl LDH at different ratios shows an absorption peak at the region of 200-400 nm, 470-560 nm, and 570-800 nm signifying their capability in absorbing photons at the visible range. The intense absorption peak at the spectral region of 200-400 nm is exclusively due to ligand-to-metal charge transfer (LMCT) owing to their $MO_6$ octahedra structure with the charge transfer from 2p orbital of oxygen to the 3d orbitals of $Ni^{2+}(Co^{2+})/Al^{3+}$ ions. Besides, the spectral region at 470-800 nm is attributed to the d-d transitions of $Ni^{2+}(d^8)$, $Co^{2+}$ ($d^7$) in the octahedral coordination. The absorption intensity is apparent at the visible region in the optimal compositional ratio of $Ni_1Co_1Al_1$ LDH and is red-shifted compared to $Ni_{0.5}Co_{0.5}Al_1$ LDH and $Ni_{1.5}Co_{1.5}Al_1$ LDH. This is inferred due to the higher crystallinity degree of well-developed LDH structures observed through FESEM images, which might also significantly impact the band gap energy and their absorption performances.

Figure 15B:
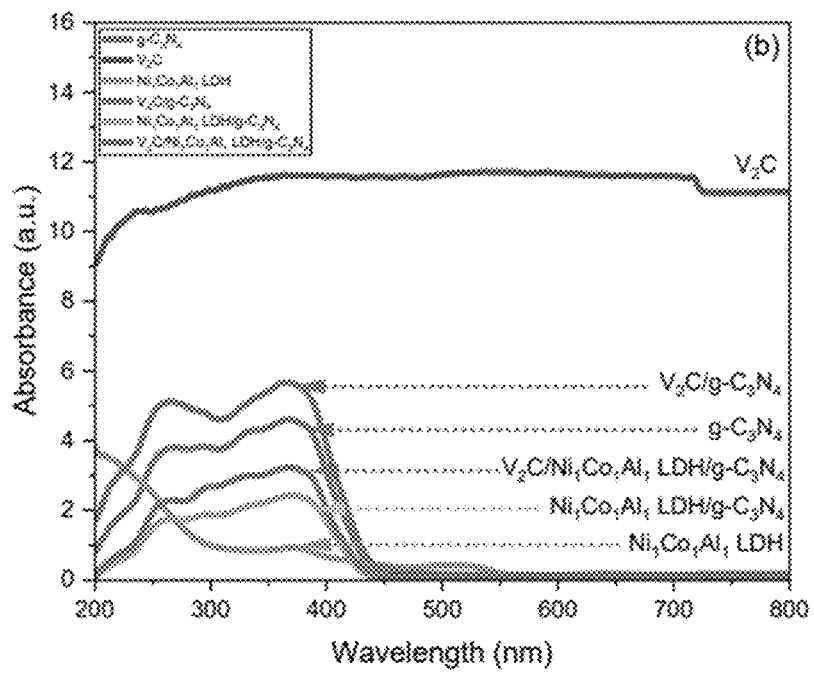
Figure 16A:
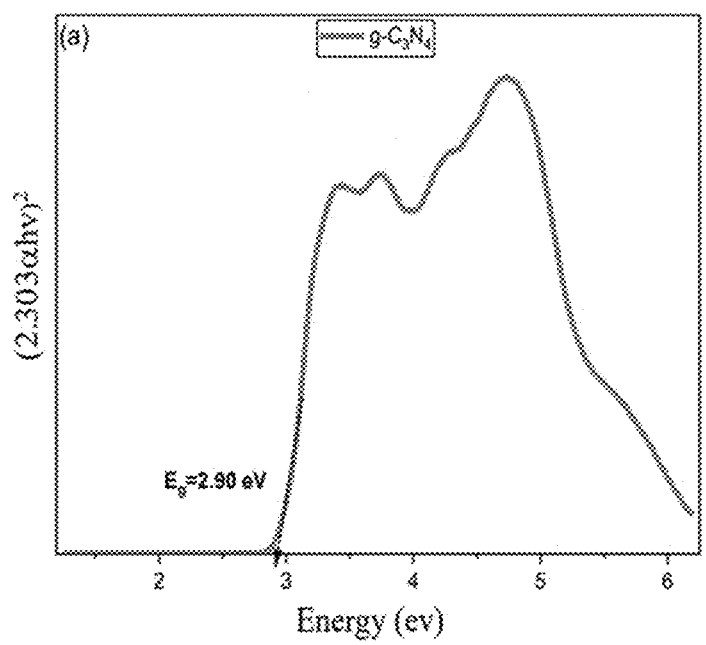
FIG. 16A, FIG. 16B, FIG. 16C and FIG. 16D show Tauc plot of pure $g-C_3N_4$, $Ni_{0.5}Co_{0.5}Al_1$ LDH, $Ni_1Co_1Al_1$ LDH, and $Ni_{1.5}Co_{1.5}Al_1$ LDH respectively, in accordance with the present invention.
Figure 16B:
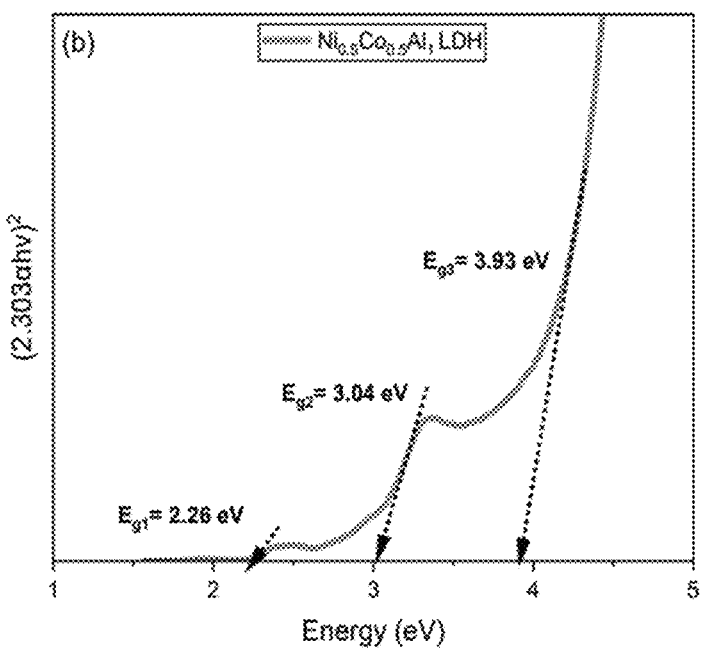
Figure 16C:
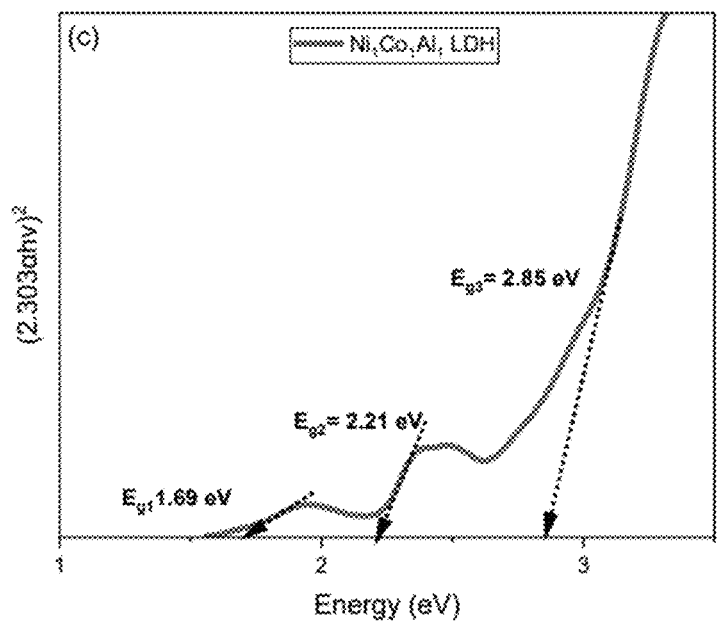
Figure 16D:
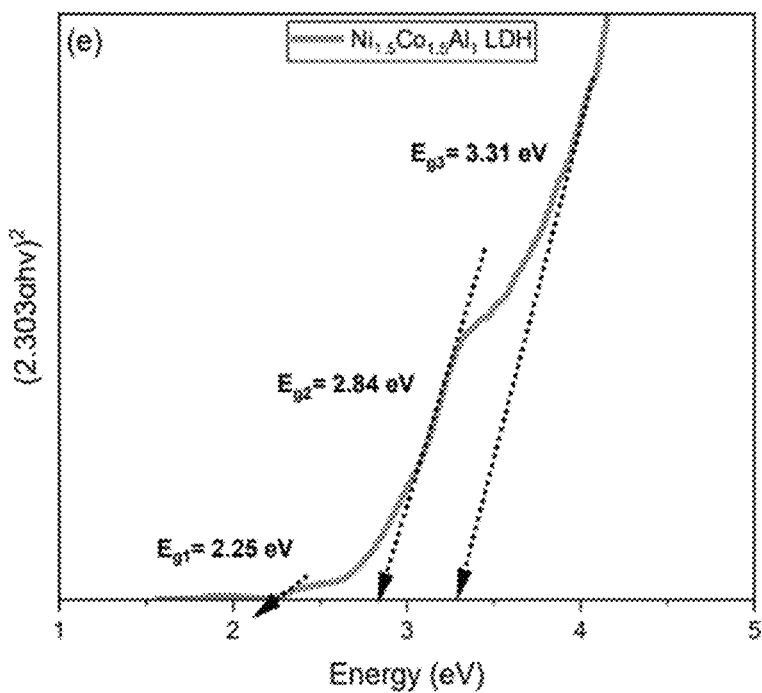

The absorption spectra of pure $V_2C$, g-$C_3N_4$, $Ni_1Co_1Al_1$ LDH, binary $V_2C$/g-$C_3N_4$, binary NiCoAl LDH/g-$C_3N_4$, and ternary $V_2C$/Ni1Co1Al LDH/g-$C_3N_4$ are depicted in FIG. 15B. Significantly, $V_2C$ displays a full-spectrum absorption owing to its metallic nature. On the other hand, pure g-$C_3N_4$ depicts a semiconductor-like absorption in the blue region of the visible spectrum with a spectral edge of around 450 nm. The introduction of MXene material, $V_2C$, does not cause any changes in the absorption spectra, but the light absorption capability in the visible region of binary $V_2C$/g-$C_3N_4$ evidently improves, offering a higher photothermal effect to foster catalytic enhancement. Meanwhile, in the binary Ni1Co1Al LDH/g-$C_3N_4$ and ternary $V_2C$/Ni1Co1Al LDH/g-$C_3N_4$, a blue-shifted in the absorption spectra is observed, which is consistent with the previous study. This results from the robust interfacial interaction between Ni1Co1Al LDH and g-$C_3N_4$, which affects the irregularities in the energy region. Besides, the addition of $V_2C$ and Ni1Co1Al LDH in the ternary composite will not affect the absorption of the nanocomposite, as there is no creation of a doping interface that could shift the absorption spectra. The band gap of the materials is estimated from the Tauc plot displayed in FIG. 16A-16D, which is based on Kubelka-Munk's function through the relationship between $(\alpha h\nu)^{1/n}$ and photon energy depicted in Equation (1). The $E_g$ denotes the energy gap of the material while coefficients $\alpha$ and n termed as material coefficient and type of electronic transition in the material, respectively such that direct (n=½) and indirect band gap (n=2). Both g-$C_3N_4$ and $Ni_xCo_yAl_z$ LDH are found to manifest direct gap transition, thereby allocating n as ½, $(\alpha h\nu)^2$. Meanwhile, the CB and VB value is calculated through Equation (2-3), where the coefficient X and E stands for the semiconductor electronegativity and the energy-free electron, respectively. The band gap energy for pure g-$C_3N_4$ estimated from the Tauc plot is revealed to be 2.90 eV, consistent with its visible-active properties.

Intriguingly, $Ni_{0.5}Co_{0.5}Al_1$ LDH, $Ni_1Co_1Al_1$ LDH, and $Ni_{1.5}Co_{1.5}Al_1$ LDH exhibit different values of band gap energies, as tabulated in Table 2. The compositional ratio and the dominancy of each metal cation in the NiCoAl LDH framework are found to affect the band gap energies. Nevertheless, all NiCoAl LDH exhibit three different band gap values owing to their multifacet band structure, also ascribed to the presence of diversified electronic transitions within the LDH framework. The energy gap of $Ni_{0.5}Co_{0.5}Al_1$ LDH, $Ni_1Co_1Al_1$ LDH, and $Ni_{1.5}Co_{1.5}Al_1$ LDH is measured to be 2.26 ($E_{g1}$), 3.04 ($E_{g2}$), 3.93 ($E_{g3}$), 1.69 ($E_{g1}$), 2.21 ($E_{g2}$), 2.85 ($E_{g3}$), 2.25 ($E_{g1}$), 2.84 ($E_{g2}$), 3.31 ($E_{g3}$), respectively. Apparently, $E_{g1}$ and $E_{g2}$ are attributed to the d-d transition of $Ni^{2+}(d^8)$, and $Co^{2+}$ ($d^7$) in the octahedral coordination, while $E_{g3}$ is accredited to the LMCT in the $MO_6$ octahedra. Based on the photocatalytic consideration with respect to band potential and correlation with the performance efficiency, $E_{g2}$ is selected to befit NiCoAl LDH to propel the photocatalytic process. In this context, a narrower $E_{g1}$ value results in fast recombination of photogenerated charges, while a larger $E_{g3}$ value obstructs the maximal visible-light absorption. Comparative analysis on the $E_g$ value of different $M^{2+}/M^{3+}$ discloses that the band gap value of trimetallic NiCoAl LDH can be modified through fine-control of the cationic compositional ratio. In this finding, under-developed $Ni_{0.5}Co_{0.5}Al_1$ LDH exhibits the largest band gap energy, which impedes their light-harvesting performance, aligning with the lower photocatalytic activity. Besides, the structure is denoted to be smaller in size, which is highly influential to the resulting band gap energy as it is suggested that the widening in the band spaces arising from the increase in the lattice parameters as the diameter gets smaller. The transition towards the visible spectrum with increasing the compositional ratio at optimal $Ni_1Co_1Al_1$ LDH results in the narrowing of the band gap energy, which enhances the light-harvesting and reflects the higher hydrogen yield obtained, in comparison with $Ni_{0.5}Co_{0.5}Al_1$ LDH and $Ni_{1.5}Co_{1.5}Al_1$ LDH.

$$E_g = (\alpha h\nu)^{1/n} \qquad (1)$$

$$E_g = VB - CB \qquad (2)$$

$$CB = X - E - 0.5 E_g \qquad (3)$$

TABLE 2

Band gap energies of $Ni_xCo_yAl_z$ LDH at different compositional ratios

| Samples | Structural formula $[M_{1-x}^{z+}M_x^{3+}(OH)_z]^{x+}$ $(A_{x/n}^{n-}) \cdot yH_2O$ | $M^{II}/M^{III}$ molar ratio | Layer charge density (x) | Band gap energy (eV) | |
|---|---|---|---|---|---|
| $Ni_{0.5}Co_{0.5}Al_1$ LDH | $Ni^{2+}_{0.25}Co^{2+}_{0.25}Al^{3+}_{0.5}$ LDH | 1 | 0.5 | $E_{g1}$ | 2.26 |
| | | | | $E_{g2}$ | 3.04 |
| | | | | $E_{g3}$ | 3.93 |
| $Ni_1Co_1Al_1$ LDH | $Ni^{2+}_{0.33}Co^{2+}_{0.34}Al^{3+}_{0.33}$ LDH | 2 | 0.33 | $E_{g1}$ | 1.69 |
| | | | | $E_{g2}$ | 2.21 |
| | | | | $E_{g3}$ | 2.85 |
| $Ni_{1.5}Co_{1.5}Al_1$ LDH | $Ni^{2+}_{0.38}Co^{2+}_{0.37}Al^{3+}_{0.25}$ LDH | 3 | 0.25 | $E_{g1}$ | 2.25 |
| | | | | $E_{g2}$ | 2.84 |
| | | | | $E_{g3}$ | 3.31 |

Figure 17A:
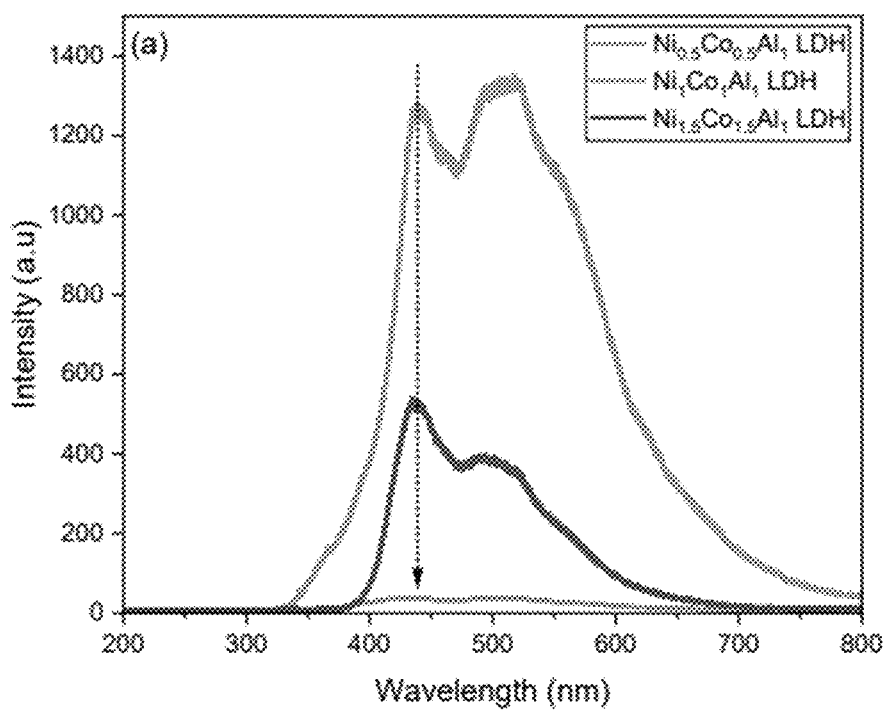
FIG. 17A, FIG. 17B show PL spectra of different cationic compositions of pure NiCoAl LDH, and PL spectra of $g-C_3N_4$, NiCoAl LDH, and $Ni_1Co_1Al_1$ LDH/g-$C_3N_4$ respectively, in accordance with the present invention.
Figure 17B:
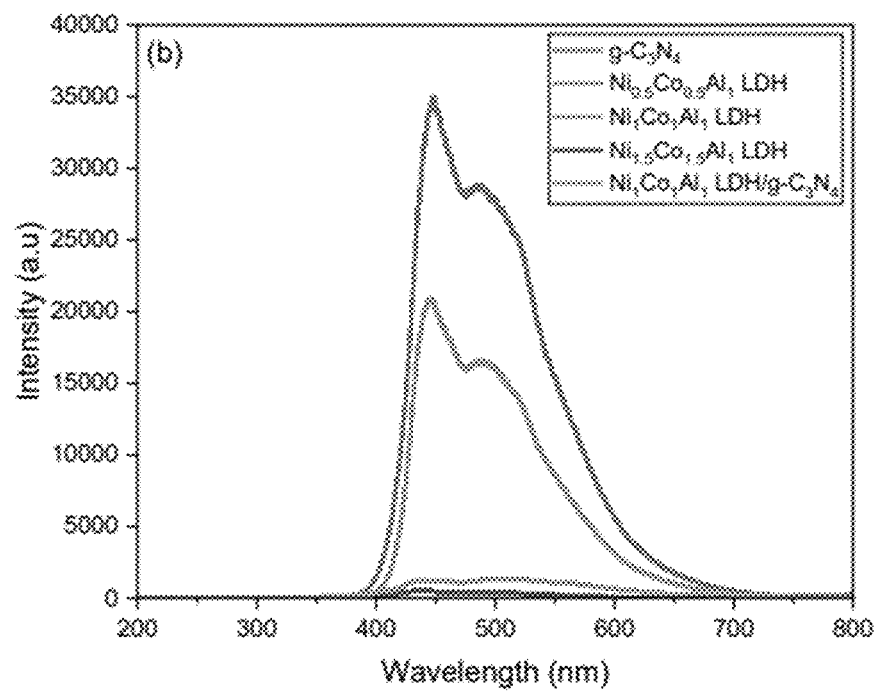

In an embodiment of the invention, Photoluminescence (PL) analysis is conducted to evaluate the carrier separation efficiency and its effect on photocatalytic activity. The emission intensity denotes the degree of separation efficiency of the photoinduced charges pair. The PL spectra are measured based on the energy released in heat and fluores- <cence once the recombination of charges occurs within the material. The intense spectral intensity denotes a higher recombination of charges, indicating a higher energy released. Comparatively, weaker peak spectra signify enhanced carrier separation with regard to lower charge recombination and longer carrier lifetime. From the PL analysis of $V_2C$, $g-C_3N_4$, and $V_2C/g-C_3N_4$, (set) $V_2C$, it can be observed that pure $g-C_3N_4$ exhibits a higher intensity peak which denotes severe carriers' recombination and lower separation efficiency. However, a lower intensity peak noticed in $V_2C$ is due to their metallic properties, which are unable to generate electron-hole pairs, thereby recording no charge recombination. Meanwhile, the addition of $V_2C$ observed a decrease in the intensity peak, explaining an enhancement in the carrier dynamics. Significantly, the formation of an electrostatic potential barrier at the $g-C_3N_4$-$V_2C$ interface owing to the electron sinking effects by $V_2C$ impedes the recombination of photogenerated charges. The redistribution of charges causes e- to be confined at $V_2C$ sites while h+ to be accumulated at the VB of $g-C_3N_4$, leading to efficient separation. PL spectra of NiCoAl LDH/$g-C_3N_4$ is analysed. The spectral of NiCoAl LDH, as displayed in FIG. 17A shows a prominent emission peak approximately at ~440 nm. No spectral peak is observed in pure $Ni_{0.5}Co_{0.5}Al_1$ LDH, which can be due to their inactivity under visible irradiation and the absence of electron-hole generation. This can also be attributed to the higher layer charges density resulting in the potential formation of some oxide/hydroxide phases, which consequently reduce the structural crystallinity and cause the unstable formation of LDH. Furthermore, a higher intensity peak is observed in the pristine $g-C_3N_4$ in FIG. 17B, suggesting poor charge separation efficiency. Nonetheless, the introduction of 10 wt % $Ni_1Co_1Al_1$ LDH results in enhanced excitonic transfer and a lower recombination rate in the nanohybrids. This improvement can be attributed to the formation of an interface contact between $g-C_3N_4$ and $Ni_1Co_1Al_1$ LDH, which creates a built-in electric field. This electric field facilitates the transfer of electrons across the semiconductor in S-scheme routes, promoting spatial separation and reducing the rates of charge recombination.

Figure 18:
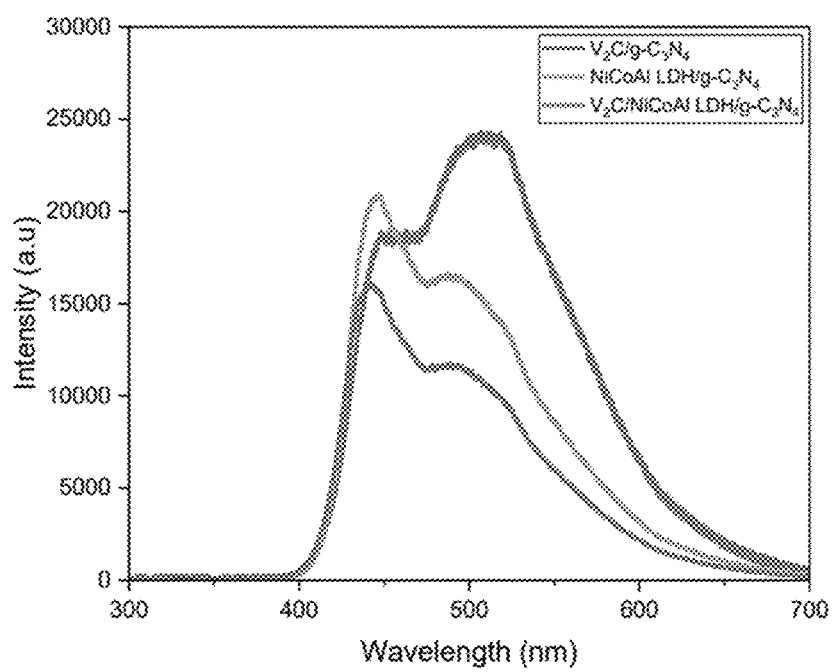
FIG. 18 shows PL analysis of binary $V_2C/g-C_3N_4$, NiCoAl LDH/g-$C_3N_4$, and ternary $V_2C/NiCoAl$ LDH/g-$C_3N_4$, in accordance with the present invention.

FIG. 18 demonstrates the comparison in the PL spectral intensity between the binary composite of $V_2C/g-C_3N_4$ and NiCoAl LDH/$g-C_3N_4$ with ternary $V_2C$/NiCoAl LDH/$g-C_3N_4$. Enhancement in the separation efficiency can be highly noticed in the ternary composite of $V_2C$/NiCoAl LDH/$g-C_3N_4$. The synergy of the Schottky barrier with the S-scheme heterojunction system contributes to a notable improvement in the carrier dynamics, as observed from the lower spectral intensity exhibited by the ternary composite. In comparison to its binary counterpart, integration of $V_2C$ acting as electron sinking successfully hampers the reverse injection of electrons while impeding the recombination of charges. Meanwhile, the S-scheme heterojunction facilitates the efficient transfer of charges across the $g-C_3N_4$ and NiCoAl LDH, thereby promoting the separation of electron-hole pairs. Superior charge transmission in the ternary nanocomposite increases the charge carrier lifetime and expedites the photoredox activity, resulting in enhanced photocatalytic performance.

The determination of flat band potential ($E_{FB}$) of $g-C_3N_4$ and $Ni_1Co_1Al_1$ LDH is estimated from the Mott-Schottky plot. The positive slope observed from the Mott-Schottky plot of $g-C_3N_4$ indicates its classification as an n-type semiconductor, while the negative slope observed in NiCoAl LDH indicates a p-type semiconductor. The $E_{FB}$ of $g-C_3N_4$ and NiCoAl LDH is calculated by the extrapolation of the Mott-Schottky plots at the x-axis, which is found to be −1.26 and +0.42 eV (vs. Ag/AgCl), respectively. By means of the Ag/AgCl to NHE conversion equation ($E_{FB\ (NHE)} = E_{FB\ (Ag/Ag}C_1)+0.197$), the $E_{FB}$ is estimated to be −1.06 and +0.62 eV (vs. NHE). Specifically, the $E_{FB}$ of the n-type semiconductor is more positive at approximately 0.2 eV of the $E_{CB}$, resulting in a calculated $E_{CB}$ of $g-C_3N_4$ to be −1.26 eV (vs. NHE). Meanwhile, the $E_{FB}$ of p-type semiconductors is more negative by 0.2 eV than its $E_{VB}$. Thereby, the calculated $E_{VB}$ of NiCoAl LDH is +0.82 eV (vs NHE).

The influence of $V_2C$ on the interfacial features of well-structured $V_2C/g-C_3N_4$ with the valence information of the surface species is investigated through X-ray Photoelectron spectroscopy (XPS) analysis with a calibration basis of C1 s at a binding energy of 284.6 eV. The detailed high-resolution spectrum of C 1s, N 1s, O 1s, and V 2p are obtained. XPS analysis of the C is region reveals the deconvolution of two peaks spectrum of $V_2C/g-C_3N_4$ at 284.6 and 287.9 eV, respectively. The binding energy peak at 284.6 eV is accredited to the sp² carbon (C—C) bond, while the peak at 287.9 eV is assigned to the N—C═N coordination of $g-C_3N_4$. The N 1s spectrum is deconvoluted into three binding energy peaks. Binding energy peaks presence at 397.8 and 398.4 eV is ascribed from the bond formation of sp² C═N in the s-triazine ring, whereas peak presence at 400.3 eV corresponds to the bonding of the sp²-hybridized aromatic N, C atom with the amino functional group NH forming N—C3 (ternary nitrogen). Significantly, the shifting in the binding energies of C is and N is of $V_2C/g-C_3N_4$ nanocomposite towards lower binding energies than in pure $g-C_3N_4$ indicates a strong electronic interaction between $V_2C$ and $g-C_3N_4$. The apparent changes in the binding peaks further affirms that the introduction of $V_2C$ leads to an increase in the donor density attributing to an improved photocatalytic reaction. The negative shift of the C—N═C signal by 0.7 eV describes the bond formation through the chemical reaction of electron-rich $g-C_3N_4$ with electron-deficient $V_2C$. This drives the electron migration from the electron-rich area towards low concentration, further signifying the electronic transfer between $g-C_3N_4$ and $V_2C$, reflecting the Schottky junction formation. Besides, the electronic transfer leaves the N sites with more positive charges, enabling hole accumulation. The deconvolution of O is spectra of pure $g-C_3N_4$, which appears at 531.9, and 533.1 eV, demonstrates the surface adsorbed oxygen and the presence of oxygen defects in the structure. The binding energy peak at approximately 530.9 eV of $V_2C/g-C_3N_4$ is assigned to the C—V—(OH), based on the previous studies, describing the formation of the OH termination group of the $V_2C$, which is consistent with the Raman results. On the other hand, XPS analysis reveals deconvoluted peaks spectra of V 2p of $V_2C/g-C_3N_4$. Peak spectra at 512.2 and 518.0 eV are ascribed to the $V^{2+}$ $2p^{3/2}$ and $V^{2+}$ $2p^{1/2}$ signifying the presence of $V^{2+}$, ascribing to the synergy of unreacted $V_2AlC$ and the formation of V-C. Meanwhile, the peak positioned at 515.0 and 523.0 eV is assigned to the $V^{4+}$ $2p^{3/2}$ and $V^{4+}$ $2p^{1/2}$, respectively, which can be attributed to the formation of vanadium oxide on the $V_2C$ surface.

Figure 19A:
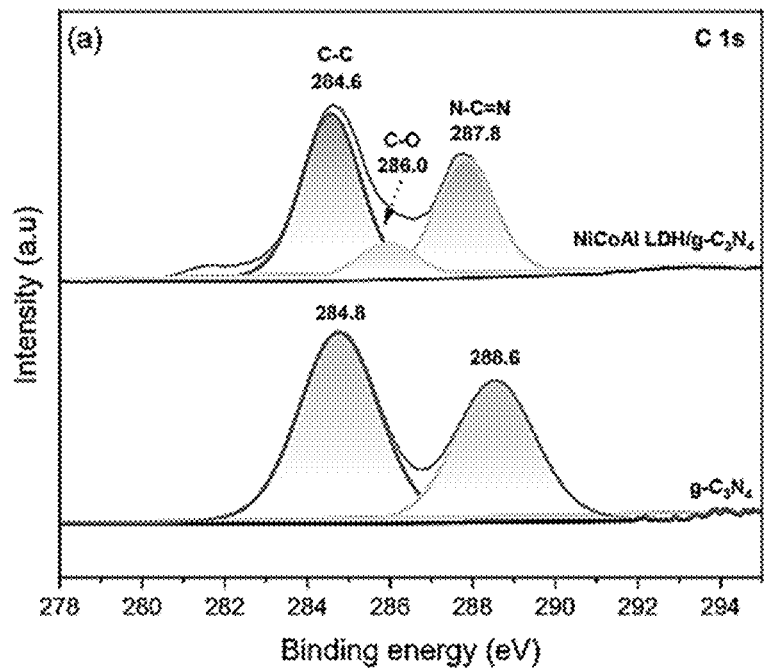
FIG. 19A, FIG. 19B, FIG. 19C, FIG. 19D, and FIG. 19E show XPS spectra for C is, N is, Ni 2p, Co 2p, Al 2prespectively, in accordance with the present invention.
Figure 19B:
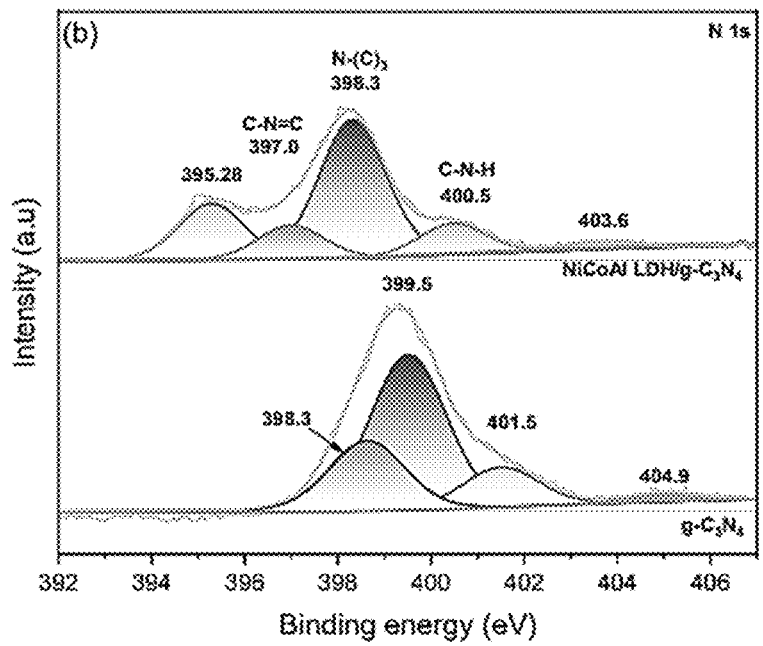
Figure 19C:
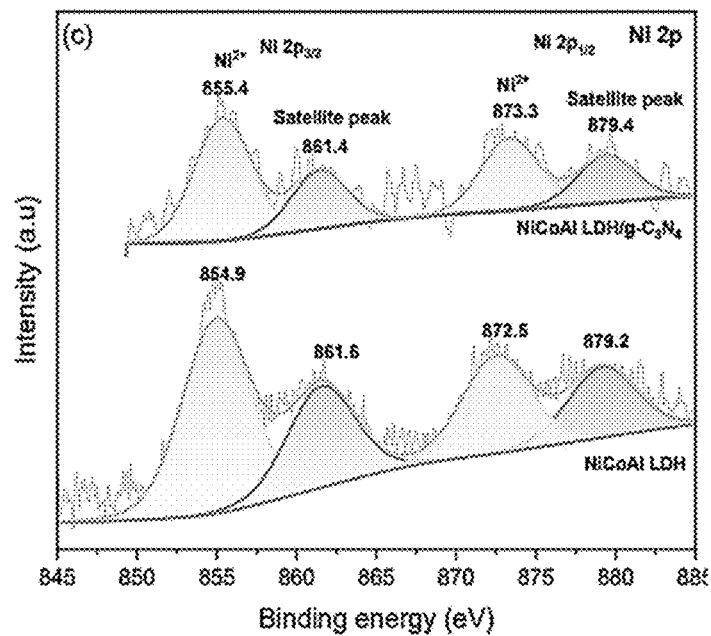
Figure 19D:
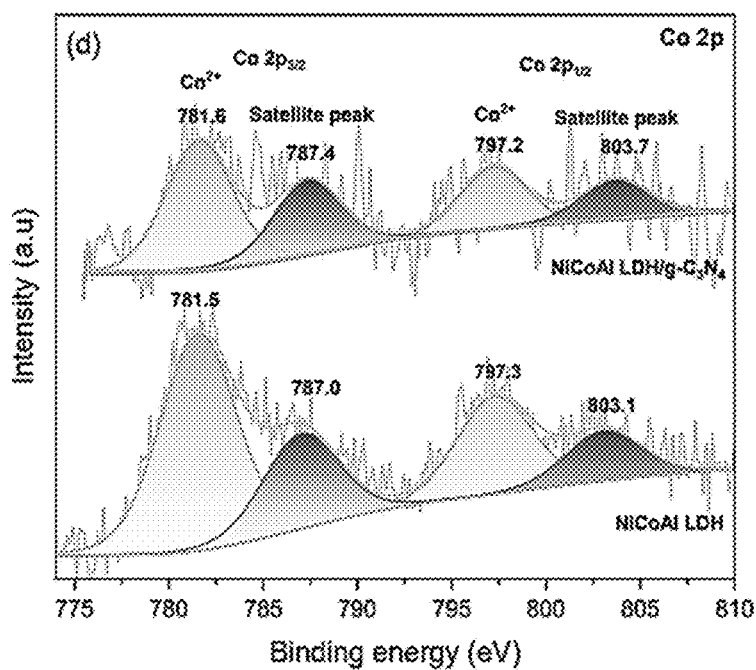
Figure 19E:
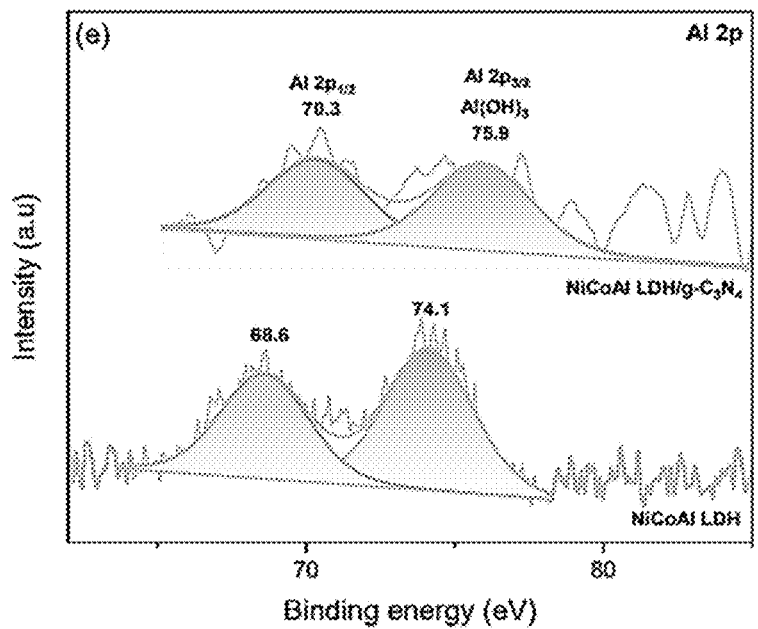

XPS measurements are performed to investigate the surface chemical composition, the elemental states, and binding structures of pure $g-C_3N_4$, $Ni_1Co_1Al_1$ LDH, and $Ni_1Co_1Al_1$ LDH/$g-C_3N_4$, as illustrated in FIG. 19A-19E. C, N, O, Ni, Co, and Al elements can be detected in the $Ni_1Co_1Al_1$ LDH/$g-C_3N_4$ nanohybrids. C, N, and O elements are detected from $g-C_3N_4$, while O, Ni, Co, and Al are from $Ni_1Co_1Al_1$ LDH. The binding energy is calibrated with the C is peak at 284.6 eV. The high-resolution spectra of C is in the $Ni_1Co_1Al_1$ LDH/g-$C_3N_4$ are demonstrated in FIG. 19A, which are deconvoluted into three apparent peaks. The binding at 284.6 and 287. 8 eV is assigned to C-C and N—C=N of g-$C_3N_4$. Meanwhile, the peak at 286.0 eV is attributed to the C—O bond, revealing the existence of intercalated $CO_3^{2-}$ at the interlayer of LDH. Meanwhile, the N is for NiCoAl LDH/g-$C_3N_4$ observed in FIG. 19B are deconvoluted into five peaks fitting to the binding energy of 395.28, 397.0, 398.3, 400.5, and 403.6 eV. The binding energy at 397.0, 398.3, 400.5, and 403.6 eV are assigned to C—N=C, bridged tertiary nitrogen (N—(C)3), C—N—H, and π-π excitation of g-$C_3N_4$, respectively. The negative shifting in the $Ni_1Co_1Al_1$ LDH/g-$C_3N_4$ nanohybrids compared to pure g-$C_3N_4$ explains the electronic charge transfer between the materials, signifying stronger electronic interaction in the heterojunction composite. FIG. 19C reveals the characteristic peaks of Ni 2p spectra, which are fitted into two major peaks at 854.9 and 872.5 eV with two satellite peaks at 861.6 and 879.2 eV, corresponding to the Ni $2p^{3/2}$ and Ni $2p^{1/2}$ orbitals. The apparent peak at 854.9 and 872.5 eV signifies the presence of a high-spin divalent state of $Ni^{2+}$ in the pure LDH matrix, which corroborates with the compositional study. The Co 2p spectra of pure $Ni_1Co_1Al_1$ LDH in FIG. 19D reveal four deconvoluted peaks with one major peak and one satellite peak in Co $2p^{3/2}$ and Co $2p^{1/2}$ doublet. The peak at a binding energy of 781.6 and 787.0 eV in the first doublet and 797.3 and 803.1 eV in the second doublet are attributed to $Co^{2+}$ and their shakeup satellites, respectively. The presence of $Co^{2+}$ can be further affirmed by the difference in the binding energy between Co $2p^{1/2}$ and Co $2p^{3/2}$ at 15.7 eV, which is close to that of $Co^{2+}$ (ΔE=16.0 eV) compared to $Co^{3+}$ (ΔE=15.0 eV). The presence of $Co^{2+}$ can also be observed in the $Ni_1Co_1Al_1$ LDH/g-$C_3N_4$ composite with the spin-orbital splitting (ΔE) of 15.6 eV. Meanwhile, the affirmation of trivalent $Al^{3+}$ in the LDH matrix can be observed from the characteristic peak in $Ni_1Co_1Al_1$ LDH/g-$C_3N_4$ located at 70.3 and 75.9 eV from FIG. 19E, assigning to Al $2p^{1/2}$ and Al $2p^{3/2}$. On the other hand, the scanning spectrum of O 1s with three convoluted peaks in $Ni_1Co_1Al_1$ LDH/g-$C_3N_4$ nanohybrids at a binding energy of 528.6, 531.6, and 533.0, which correspond to the metal-oxygen bonds (M-O-M), metal-hydroxide bonds (M-OH), and adsorbed water of $Ni_1Co_1Al_1$ LDH, respectively.

The presence of distinct oxygen peaks of LDH corroborates the formation of carbonate anion in the interlayer of $Ni_1Co_1Al_1$ LDH. The shifts observed in the binding energy peaks of the nanohybrids, in comparison to pure $Ni_1Co_1Al_1$ LDH and g-$C_3N_4$, indicate changes in the electron density surrounding the materials. Specifically, a positive shift in the binding energies of the Ni 2p, Co 2p, and Al 2p in the $Ni_1Co_1Al_1$ LDH/g-$C_3N_4$ as compared to pure $Ni_1Co_1Al_1$ LDH implying the increase in the electron density within the nanohybrids due to interfacial contact with g-$C_3N_4$, suggesting that $Ni_1Co_1Al_1$ LDH as an electron-deficient counterpart. In contrast, the binding energy observed in C is and N is elements of the nanohybrids demonstrates negative shifts, thereby suggesting an interfacial electron transfer from electron-rich g-$C_3N_4$ to electron-deficient $Ni_1Co_1Al_1$ LDH. This also serves as a strong indicator that $Ni_1Co_1Al_1$ LDH functions as a reducing catalyst, playing a pivotal role in driving the photoreduction reaction.

Figure 20A:
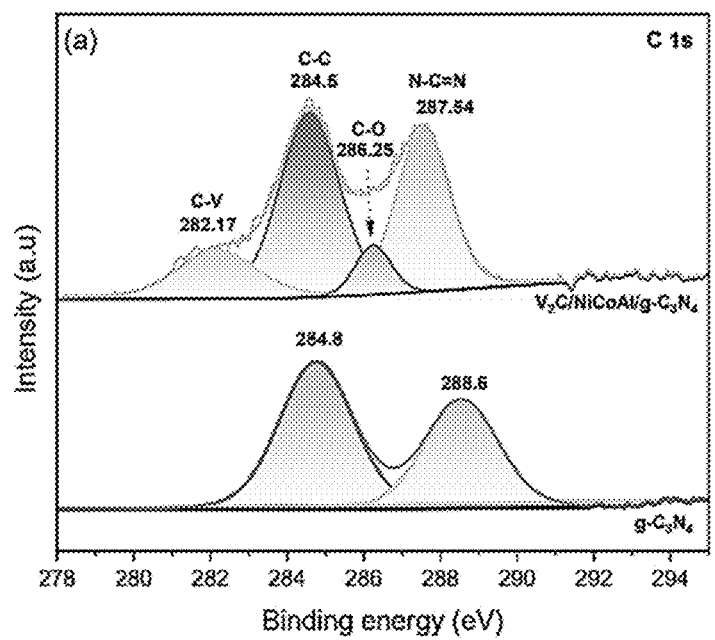
FIG. 20A, FIG. 20B, FIG. 20C, FIG. 20D, FIG. 20E, and FIG. 20F show XPS spectra for C1s, N1s, Ni2p, Co2p, Al2p, and V 2p of the ternary $V_2C/Ni_1Co_1Al_1$ LDH/g-$C_3N_4$, in accordance with the present invention.
Figure 20B:
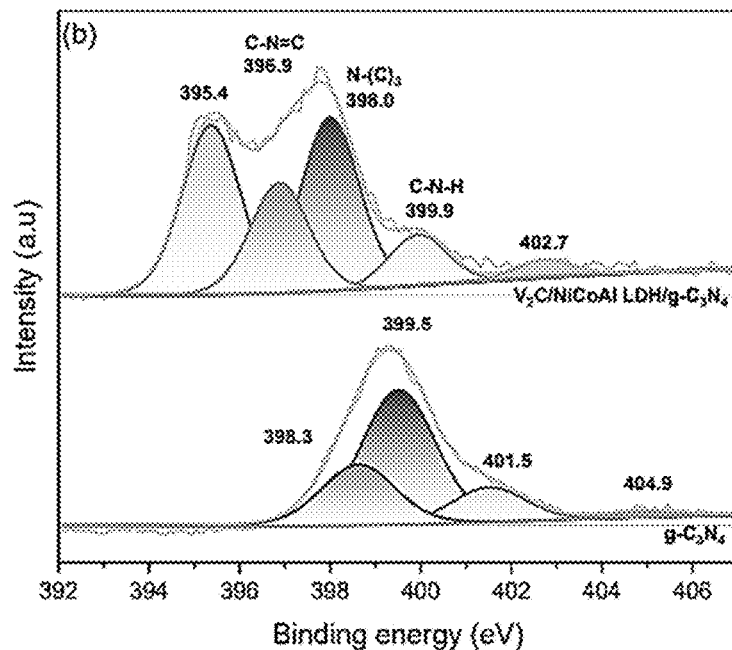

The phase and elemental states analysis of ternary $V_2C$/$Ni_1Co_1Al_1$ LDH/g-$C_3N_4$ with the binding energy of C, N, V, O, Ni, Co, and A1 has been illustrated in FIG. 20A-20F. The C is of ternary $V_2C$/$Ni_1Co_1Al_1$ LDH/g-$C_3N_4$ depicted in FIG. 20A are deconvoluted into four fittings. Specifically, the peak at the binding energy of 284.5 eV and 287.54 is attributed to the sp2 carbon (C-C) and N—C=N coordination of g-$C_3N_4$. The peak at a lower binding energy region, 282.17 eV, is accredited to the C—V bond in $V_2C$, while the peak at a binding energy of 286.25 eV corresponds to the presence of intercalating anions $(CO)_3^{2-}$ in $Ni_1Co_1Al_1$ LDH. The spectral of N is of $V_2C$/$Ni_1Co_1Al_1$ LDH/g-$C_3N_4$ depicted in FIG. 20B reveals four deconvoluted peaks. The main peaks at 396, 398.0, and 399.9 eV are ascribed to pyridine nitrogen (C=N—C), tertiary nitrogen (N—(C)3), and C—N- of g-$C_3N_4$. Meanwhile, the peak at 402.7 is due to the πc-π excitation. The negative shift observed in the spectral peaks of both C 1s and N is in the nanocomposite indicates that the g-$C_3N_4$ region possesses a higher electron density.

Figure 20C:
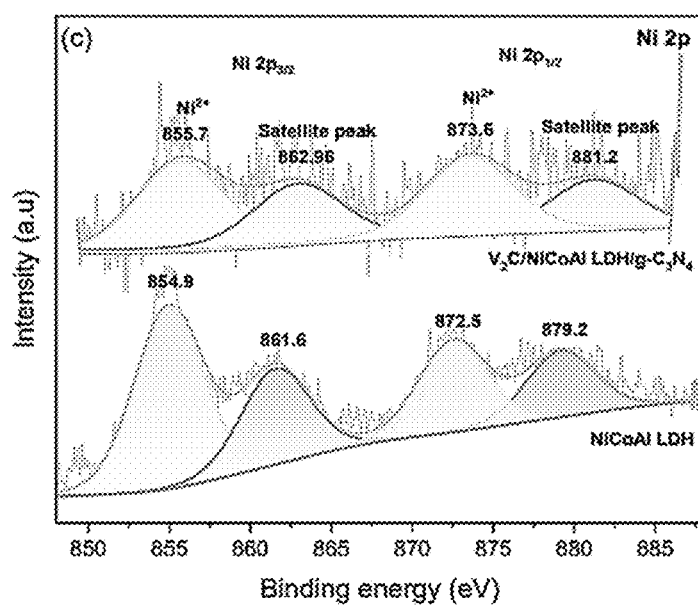
Figure 20D:
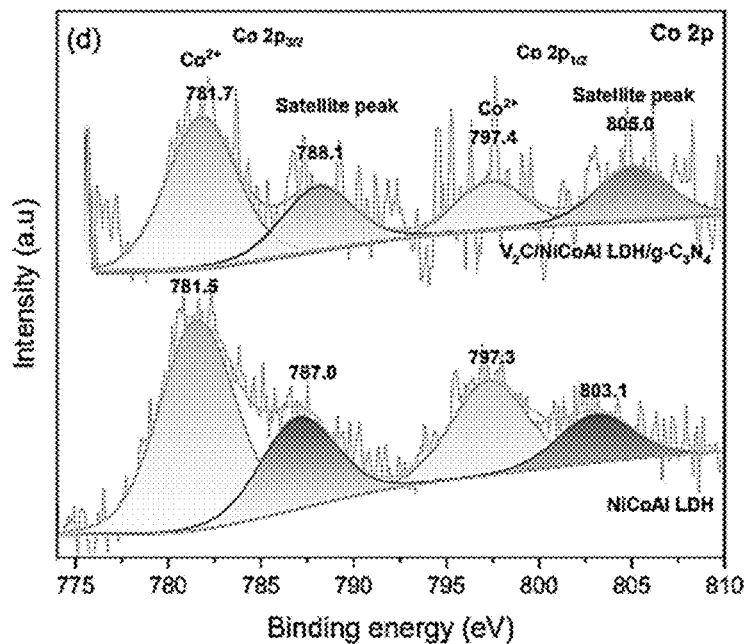
Figure 20E:
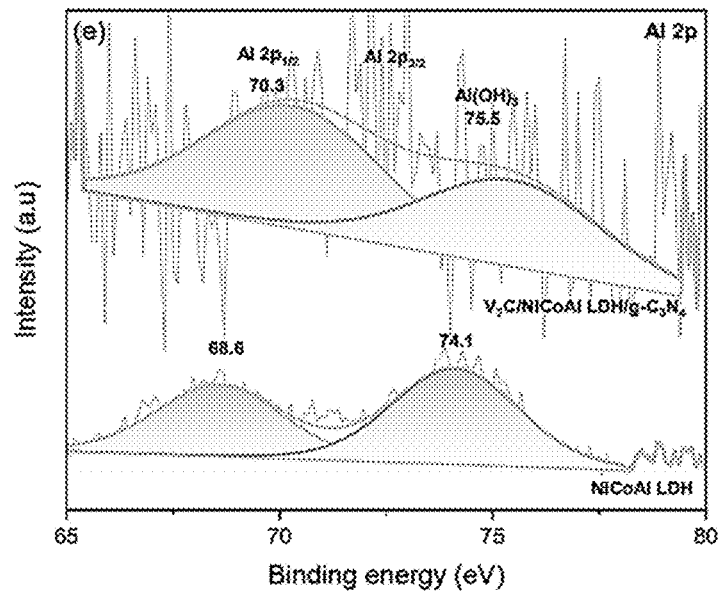
Figure 20F:
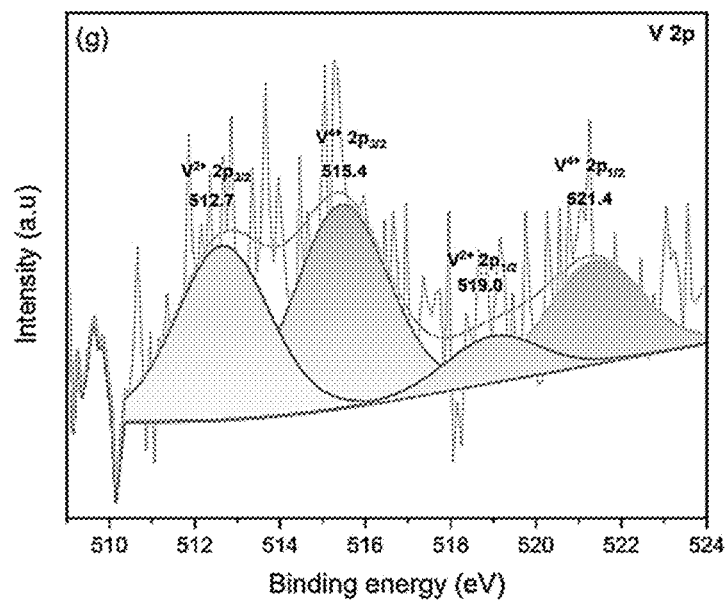

The presence of $Ni^{2+}$ in the nanocomposite can be affirmed from the Ni 2p spectra observed in FIG. 20C through the peak positioned at 855.7 (Ni $2p^{3/2}$), 873.6 eV (Ni $2p^{1/2}$), and their shake-up satellite peaks located at 862.9 and 881.2 eV, respectively. The characteristic peaks of Co 2p in the ternary $V_2C$/$Ni_1Co_1Al_1$ LDH/g-$C_3N_4$ can be observed in FIG. 20D, which are fitted into two major peaks and two satellite peaks. The peak at a binding energy of 781.6 and 787.4 eV in the first doublet is accredited to $Co^{2+}$, and its shakeup satellite peak corresponds to Co $2p^{3/2}$ orbital. Meanwhile, the peaks at the binding energy of 797.4 and 805.0 eV correspond to $Co^{2+}$ and its satellite peak for Co $2p^{1/2}$ orbitals. The presence of $Co^{2+}$ is supported by the difference in the binding energy between Co $2p^{1/2}$ and Co $2p^{3/2}$ at 15.7 eV, which is closer to the spin-orbital splitting of $Co^{2+}$ (ΔE=16.0 eV). This finding highlights the existence of $Co^{2+}$ in the LDH framework compared to $Co^{3+}$. The existence of $Al^{3+}$ can be observed from the peak located at 70.3 and 75.5 eV, depicted in FIG. 20E. The high-resolution spectra of O is peak in $V_2C$/$Ni_1Co_1Al_1$ LDH/g-$C_3N_4$ reveals three peaks deconvolution. The peak positioned at 529.0 and 533.8 eV are assigned to metal-oxygen bonds (M-O) and adsorbed water molecules of NiCoAl LDH. Meanwhile, the peak located at 532.0 eV is attributed to the metal-hydroxide bond (M-OH) in relation to the $V_2C$ and NiCoAl LDH counterparts. The formation of V—OH suggests the existence of —OH termination, which is consistent with the one observed in binary $V_2C$/g-$C_3N_4$. FIG. 20F presents the spectra of V 2p, which are deconvoluted into four primary peaks. The peak spectra at 512.7 and 519.0 eV are assigned to $V^{2+}$ $2p^{3/2}$ and $V^{2+}$ $2p^{1/2}$, signifying the formation of the V-C bond from the interaction with g-$C_3N_4$ and NiCoAl LDH. The formation of $V^{4+}$ $2p^{3/2}$ and $V^{4+}$ $2p^{1/2}$ at the binding energy of 515.4 and 521.4 eV can be due to the oxidation of the surface of $V_2C$ forming vanadium oxide. The shifting in the binding energy compared to its pure counterpart indicates a strong electronic interaction between the materials, ascribing to the formation of a multi-hybrid heterojunction system.

The analysis of the characterization techniques for g-$C_3N_4$, $V_2C$, and $Ni_1Co_1Al_1$ LDH, along with their binary and ternary composites and their findings are as follows: The XRD, Raman, and FTIR analysis confirms the successful preparation of single g-$C_3N_4$, $V_2C$, and NiCoAl LDH, along with their binary and ternary composites. The successful conversion of $V_2AlC$ to $V_2C$ at different etching times is confirmed by XRD analysis. All the peaks observed in the etched $V_2C$ samples correspond to $V_2C$, indicating the completion of the conversion process. Higher layer charge density in $Ni_{0.5}Co_{0.5}Al_1$ LDH results in poor crystallinity in the LDH structure due to the possible formation of impurity phases. Meanwhile, XRD analysis reveals $Ni_1Co_1Al_1$ LDH exhibits a good crystallinity structure with larger crystallite sizes owing to well-formed crystals. Analysis of FESEM reveals that g-$C_3N_4$ exhibited a typical 2D stacked sheet, which displays an evident asymmetrical folding pattern. Meanwhile, $V_2C$ at 24 h of etching time reveals a well-defined 2D multilayer structure with a higher degree of exfoliation. The construction of smaller 2D nanoplates with less aggregated structure is achieved at the optimal composition of $Ni_1Co_1Al_1$ LDH. Successful construction of the ternary $V_2C/Ni_1Co_1Al_1$ LDH/g-$C_3N_4$ composite is observed, with an evident attachment of g-$C_3N_4$ sheets onto $V_2C$ surfaces and well-dispersed NiCoAl LDH nanoplates on the g-$C_3N_4$ surfaces. The EDX analysis further affirms its construction with a uniform distribution of Ni, Co, Al, V, O, C, and N elements observed in the $V_2C/Ni_1Co_1Al_1$ LDH/g-$C_3N_4$ nanocomposite. In addition, the interface construction of $V_2C/Ni_1Co_1Al_1$ LDH/g-$C_3N_4$ is confirmed by TEM through IFFT analysis. The UV-Vis analysis reveals the absorption of spectra of $V_2C$, NiCoAl LDH, and g-$C_3N_4$. Significantly, g-$C_3N_4$ depicts a semiconductor-like absorption in the blue region of the visible spectrum. The absorption intensity is apparent at the visible region in the optimal compositional ratio of $Ni_1Co_1Al_1$ LDH and is red-shifted compared to $Ni_{0.5}Co_{0.5}Al_1$ LDH and $Ni_{1.5}Co_{1.5}Al_1$ LDH. The cationic composition of NiCoAl LDH is found to exert a substantial influence on the electronic properties, as evidenced by the tunable band gap value. Meanwhile, $V_2C$ displays a full-spectrum absorption owing to its metallic properties. PL analysis reveals that ternary $V_2C/Ni_1Co_1Al_1$ LDH/g-$C_3N_4$ exhibits facile charge separation with a low recombination rate of photogenerated charges compared to binary $V_2C$/g-$C_3N_4$ and $Ni_1Co_1Al_1$ LDH/g-$C_3N_4$ owing to the construction of its hybrid-junction. XPS analysis suggests the successful fabrication of the nanocomposite and its chemical composition.

Figure 21A:
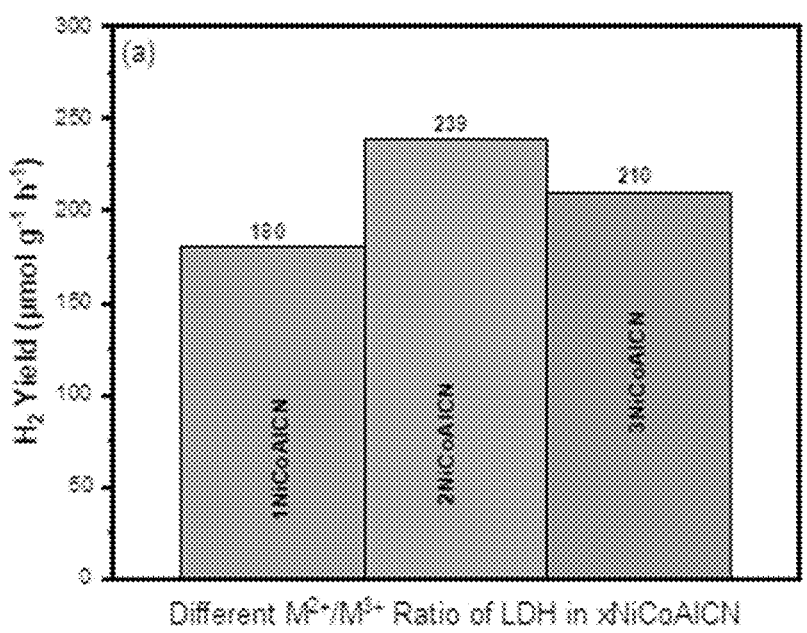
FIG. 21A shows effects of compositional $M^{2+}/M^{3+}$ ratio of LDH in the composite of xNiCoAlCN, in accordance with the present invention.

In another embodiment of the invention, photocatalytic Hydrogen production and photocatalytic performance of xNiCoAlCN is evaluated to gain a clear understanding of the ratio effects of metal cations incorporated into $Ni_xCo_yAl_z$ LDH on photoredox activity. The hydrogen generation rate is found to be the highest with the integration of $Ni_1Co_1Al_1$ LDH, followed by $Ni_{1.5}Co_{1.5}Al_1$ LDH and $Ni_{0.5}Co_{0.5}Al_1$ LDH, as depicted in FIG. 21A. It is noticed that regulating the ratio between the divalent and trivalent cations relative to layer charge density strongly impacts the photocatalytic activity of the LDH-based composite. This can be due to the stable formation of LDH with pure hydrotalcite phase, which can only be theoretically obtained with x in the range of 0.2<x<0.33. Significantly, other factors could also influence the stable phase formation, such as the pH concentration of the alkaline base, total ions concentration, and the chemical identities of ions making up the brucite layers. There are limited studies on the trimetallic LDH to justify the influence of $M^{2+}/M^{3+}$ in the LDH framework with the phase purity. However, in the current analysis, it is evident that the configuration of ratios in relation to the layer charge density significantly influences photocatalytic hydrogen production. Employing trimetallic $Ni_1Co_1Al_1$ LDH yields the highest hydrogen production in comparison to a lower amount of divalent Ni and Co ($Ni_{0.5}Co_{0.5}Al_1$ LDH) and a higher amount of Ni and Co ($Ni_{1.5}Co_{1.5}Al_1$ LDH). The enhanced catalytic activity of $Ni_1Co_1Al_1$ LDH-based composite (2NiCoAlCN) is attributed to its increased surface area resulting from stable structure formation, exceptional light-harvesting capability within the visible spectrum, good phase purity, and suitable band gap energy. Integrating divalent Ni and Co at the optimal ratio in 2NiCoAlCN is responsible for shifting the absorption spectrum towards the visible spectrum, achieving maximal photonic absorption. Meanwhile, the incorporation of trivalent Al promotes structural stabilization.

Notably, a reduction in the amount of divalent Ni and Co cations in $Ni_{0.5}Co_{0.5}Al_1$ LDH constrains solar absorption capability and photon utilization. This finding demonstrates that the transition metal cations of Ni and Co serve a pivotal role in augmenting photonic absorption capacity. Thereby, a reduced amount would result in lower photocatalytic efficiency. Studies reported that the dominance of Co in the LDH framework is responsible for the favorable improvement in optical performance owing to their catalytically active properties and excellent work function. On the other hand, the dominancy of Ni is noticed to shift the absorption spectrum towards the visible range. The difference in the catalytic behavior observed by $Ni_{0.5}Co_{0.5}Al_i$ LDH-based composite is due to their poor solar absorption performance and larger band gap value, which can be discerned from the UV-Vis and tauc plot analysis. Besides, the formation of impurity phases with a reduction in their crystallinity structure will likely obstruct their photocatalytic activity. Additionally, the presence of an excess of divalent cations, as seen in 3NiCoAlCN, may create recombination centers that promote the recombination of photoexcited electron-hole pairs. This recombination process can hinder the overall photocatalytic activity of the material. Therefore, fine-tuning the cationic ratio in regard to their charge density is significant to ensure a stable formation of LDH structure and mitigate the dominance of specific metal cations.

Figure 21B:
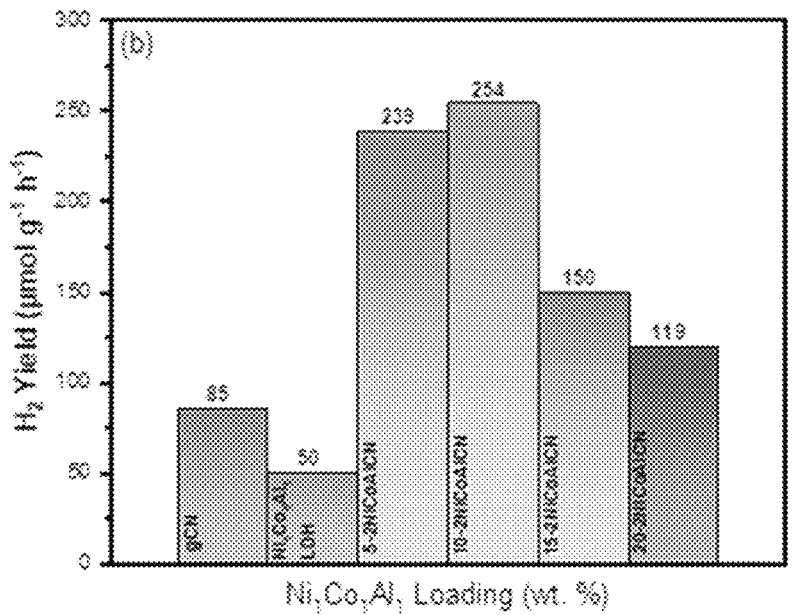
FIG. 21B shows effects of $Ni_1Co_1Al_1$ LDH loading (wt %: 5, 10, 15, 20), in accordance with the present invention.

Photocatalytic hydrogen production over different LDH loading is evaluated and presented in FIG. 21B. Both pure gCN and $Ni_1Co_1Al_1$ LDH showed a relatively lower photocatalytic hydrogen production than hybrid composite 2NiCoAlCN. The integration of $Ni_1Co_1Al_1$ LDH generates a hydrogen yield of up to 254 mol $g^{-1}h^{-1}$ with 5.08- and 2.98-times improvement than pure $Ni_1Co_1Al_1$ LDH and gCN, respectively. A faster recombination rate of the photogenerated charges is one of the critical factors commonly observed in single materials that adversely affect their photoredox performances. Limited time for the electrons and holes to carry out redox activity impedes the production of hydrogen, as observed in pure gCN and $Ni_1Co_1Al_1$ LDH. Upon the addition of $Ni_1Co_1Al_1$ LDH, the increment in hydrogen production is noticed, exemplifying the improvement in the carrier's dynamics, which is also proven by PL analysis. The improvement in the photocatalytic activity of the hybrid 2NiCoAlCN is ascertained by several factors, such as morphological compatibility, photophysical properties, and the chemical nature of $Ni_1Co_1Al_1$ LDH as a co-catalyst. In terms of morphological compatibility, the planar 2D sheets orientation of gCN proffers the best supporting platform to $Ni_1Co_1Al_1$ LDH nanoplates as a reduction co-catalyst. Efficient attachment of the $Ni_1Co_1Al_1$ LDH offers intimate interface contact with gCN, which directly hastens the transmission of electrons to the LDH surface. The structural compatibility of 2D/2D 2NiCoAlCN with a larger absorption cross-section maximizes the photon utilization and stimulates more electron-hole pairs generation, augmenting the photophysical properties of hybrid 2NiCoAlCN. The heterojunction constructed between gCN and $Ni_1Co_1Al_1$ LDH provided spatial separation of photogenerated charges and reduced their recombination time, escalating the photoreduction activity. Besides, the employment of LDH with an excellent chemical nature is imperative for outstanding photocatalytic activity. The nature of metal cations in the LDH matrix could influence their electronic and photophysical properties. The integration of Ni, Co, and Al at an optimal ratio to the LDH matrix conspicuously generates a well-designed visible-active LDH material. Nevertheless, the loading of the co-catalyst should be finely controlled to avoid the blockage of light to the catalyst surface. The reduction in the hydrogen yield is noticed upon increment to 15 wt. % LDH loading, signifying that an excessive amount could lead to light-shielding effects blocking the penetration of light to the gCN surface.

Figure 21C:
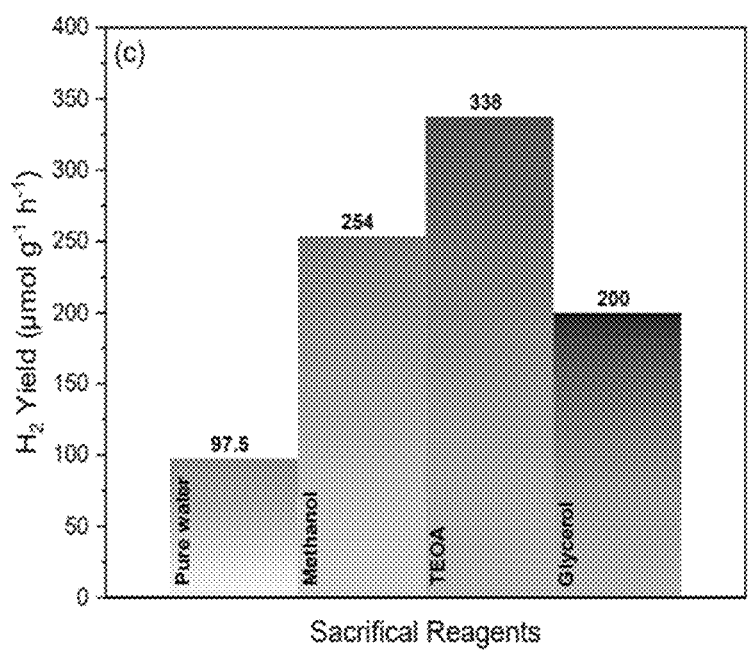
FIG. 21C shows effects of sacrificial reagents on photocatalytic hydrogen production, in accordance with the present invention.
Figure 22:
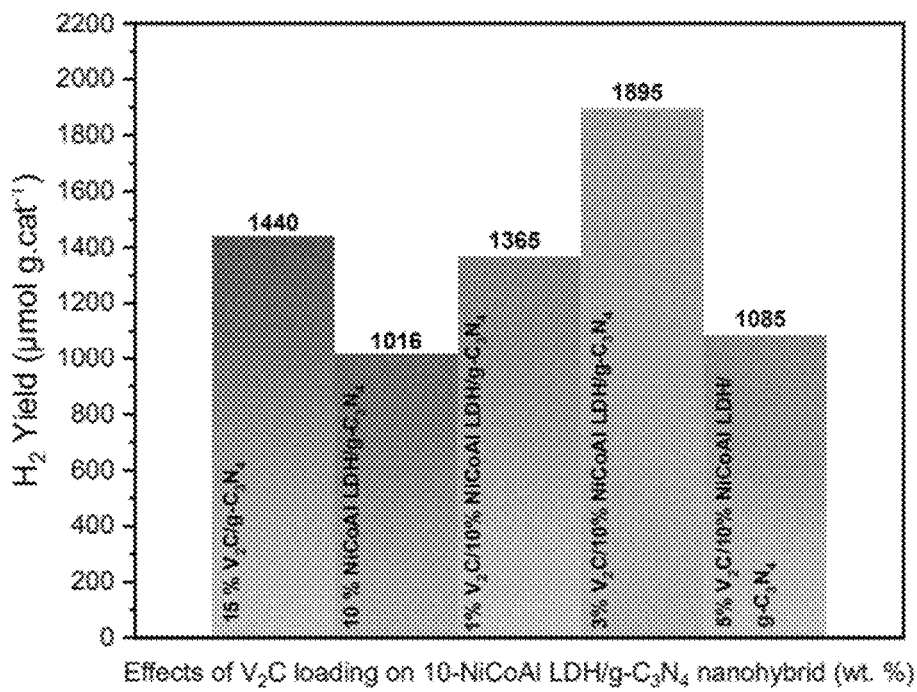
FIG. 22 shows effects of $V_2C$ loading (wt. %: 1, 3, 5) at a constant 10 wt. % $Ni_1Co_1Al_1$ LDH and its effect on photocatalytic hydrogen yield, in accordance with the present invention.

The effects of sacrificial reagents on the photocatalytic activity of 2NiCoAlCN nanocomposite are demonstrated in FIG. 21C. Methanol, triethanolamine (TEOA), and glycerol have been employed to check the compatibility of each sacrificial reagent with 2NiCoAlCN. It is apparent that TEOA as a sacrificial electron donor could optimize the photocatalytic performance up to 338 mol g$^{-1}$ h$^{-1}$, which is 3.47 times higher than without the employment of any sacrificial agents followed up with methanol (254 mol g$^{-1}$ h$^{-1}$) and glycerol (200 mol g$^{-1}$ h$^{-1}$). This finding signifies the importance of sacrificial agents as the source of electron production and in scavenging holes. Hydrogen yield is observed to be dramatically affected by the presence of sacrificial agents, as proceeding with the reaction activity in pure water without the addition of sacrificial reagents could lead to $O_2$—$H_2$ backward reaction yielding a lower to no hydrogen production. On the other hand, employing glycerol might induce lower hydrogen production compared to TEOA and methanol. This finding is corroborated by our previous study, which demonstrated a lower hydrogen yield when utilizing glycerol as a hole scavenger for the g-CN-based photocatalytic reaction. Another factor affecting the hydrogen yield at different sacrificial reagents mixture can be reasoned due to the difference in the oxidation potential and the permittivity of each sacrificial reagent which ascribed their efficiency in trapping holes and providing electrons. However, their final availability as electrons provider depends on the interaction with the surface of the semiconductor materials signifying the compatibility of each sacrificial reagent with different types of semiconductor materials might vary. Nevertheless, in the perspective of oxidation degree, TEOA has a higher oxidation potential (~1.05 eV) compared to methanol (~1.05 eV), reasoning in the higher hydrogen yield reflecting their effectiveness in scavenging holes. This finding also coincides with the previous study ascribing that methanol is a poor hole scavenger to gCN-based catalyst compared to TEOA. A highly effective hole scavenger could reduce the recombination of photogenerated charges and preserve more electrons to undergo the reduction reaction. Besides, the number of hydrogen atoms present in TEOA, and methanol is inferred to be one of the attributing factors affecting hydrogen production. This finding suggests that, despite their lower oxidation potential and their role as excellent hole scavengers, the higher affinity of these compounds with g-CN leads to a strong interaction that preserves more available electrons compared to methanol and glycerol. This interaction significantly influences the rate of hydrogen yield.

In an embodiment of the present invention, the consistency and the photocatalytic stability of 2NiCoAlCN under visible irradiation are further explored, to appraise their photochemical efficiency and recyclability for industrial application. The photostability evaluation is conducted in consecutive cycles with TEOA as a sacrificial electron donor. In specific, the reaction activity is performed in a 5 vol. % TEOA-water mixture with 0.1 g loading of 2NiCoAlCN, and the reaction is carried out under visible irradiation for a total of 4 h per cyclic run. The concentration of hydrogen production per cyclic run is measured every 1 h and is recorded. The system is let to rest and continuously flowed with nitrogen for a minimum of 1 h to cool down and clean out the system from the residual hydrogen and impurities. The second cyclic run proceeded after 1 h with the same TEOA-water mixture and 2NiCoAlCN catalyst, following the same experimental procedures from the first cycle and is continued for the third and fourth cycles. The photocatalytic activity test over consecutive cycles revealed a stable and gradual hydrogen yield for 4 cyclic runs without any glimpse of decline, explicating the robustness of 2NiCoAlCN. Interestingly, an evident increase in the hydrogen yield is observed with apparent improvement in the third cycle, evincing 1.35 times catalytic improvement over the second cycle. The photocatalytic enhancement can be reasoned due to the activation of LDH surface upon continuous light exposure maintaining their robust catalytic activity over a longer duration. Besides, a highly stable structure of 2D/2D 2NiCoAlCN with its efficient charge transfer hampers the photodecomposition of the gCN by hampering hole accumulation. In previous study, we performed the stability test of nickel-incorporated gCN in both methanol and TEOA as a sacrificial reagent. Interestingly, gCN shown to be highly stable in TEOA-water mixture compared to in methanol-water mixture. The stability of the catalyst is observed to decrease over multiple cycles in a methanol-water environment, indicating its poor reusability as a catalyst. This may be attributed to the effectiveness and compatibility of TEOA as a hole scavenger compared to methanol when gCN is used as a catalyst. Furthermore, previous literature suggests that the decomposition of gCN may occur when it is exposed to prolonged light irradiation. This photodecomposition can be induced by the accumulation of holes on the gCN surface, which reduces the bonding energy of C—N in gCN and leads to the breaking of its heptazine units in the presence of reactive oxygen species. Therefore, the employment of $Ni_1Co_1Al_1$ LDH to construct the S-scheme transfer system hinders the accumulation of holes at the gCN counterpart, and the use of TEOA as an effective hole scavenger promotes stable photocatalytic performance over four cycles. In addition, a uniform distribution of $Ni_1Co_1Al_1$ LDH nanoplatelets onto gCN is beneficial for the full coverage of photon energy prolong their reaction activity over the cyclic hours.

In another embodiment of the invention, the spent catalyst is analyzed by using XPS to examine the changes in the elemental states and chemical stability. A comparison in the XPS binding energy for C, N, O, Ni, Co, and Al elements in fresh 2NiCoAlCN and spent-2NiCoAlCN is made. Calibration of the binding energy of C 1s is done at 284.6 eV. The C 1s spectra of the spent-2NiCoAlCN still maintain the same elemental states as in the fresh samples, and no chemical shifting is observed. The observed increase in spectral intensity for the N—C=N bond at 288.1 eV, in comparison to the C-C/C=C bond at 284.3 eV, in the spent-2NiCoAlCN can be reasonably attributed to the interaction with TEOA, which contains an amine-rich group. This interaction can lead to modification in the electronic structure and chemical environment of the nitrogen-containing species. Non-apparent shifting in the binding energy of N 1s is observed for C—N=C, (N—(C)3), and C—N—H of g-$C_3N_4$. However, the increase of the electronegativity in the spent catalyst might be due to its interaction with TEOA. The analysis of the binding energies peak for both C 1s and N 1s in the spent-2NiCoAlCN indicates no phase change or apparent chemical decomposition observed. The finding suggests that g-$C_3N_4$ maintains its intact structure even after undergoing four cycles of continuous photoreaction. This structural stability can be attributed to the stronger interfacial contact between g-$C_3N_4$ and $Ni_1Co_1Al_1$ LDH, which effectively prevents the accumulation of holes that could otherwise trigger the breaking of the g-$C_3N_4$ structure. Besides, no indication of structural alterations is observed in g-$C_3N_4$, explaining the continual hydrogen production.

To analyze the chemical changes in $Ni_1Co_1Al_1$ LDH, the binding energies of Ni 2p, Co 2p, Al 2p, and O 1s are examined. The characteristic peaks in the Ni 2p spectra of spent-2NiCoAlCN, exhibited a weaker peak at a lower energy region ≈850.1 eV, suggesting the formation of Ni0. The formation of metallic nickel likely contributes to the increase in photoactivity observed during the cyclic hour. On the other hand, changes in the binding energies for Co 2p, might suggest oxidation in the Co element in the nanocomposite might occur. Nevertheless, the peak of Al 2p in both spent, and fresh samples shows no significant changes. Apparently, the shifting in the binding energies can be attributed to the ligand effects from triethanolamine (TEOA), which could lead to changes in electron density. The increase in the spectral intensity of the M—O bond at 528.9 eV in O is of spent-2NiCoAlCN with respect to M-OH can be attributed to the formation of CoO. Despite this formation, $Ni_1Co_1Al_1$ LDH demonstrates no structural degeneration and maintains good chemical stability, contributing to excellent photoreaction stability. In addition, FESEM analysis is performed on spent-2NiCoAlCN to assess its structural stability after 4 consecutive cycles. Interestingly, the composite exhibits an intact structure and no structural deformation is observed in the nanocomposite. In a closed-up FESEM image, the LDH nanoplatelet is clearly demonstrated to be evenly distributed on the gCN, with no degeneration of LDH structure which reflects its superior photocatalytic stability. This finding emphasizes the significance of the structural morphology in influencing the photocatalytic stability of semiconductors. Therefore, it is crucial to develop robust semiconductor composites that can withstand continuous solar-driven reactions in a slurry system.

Further analysis using FTIR on both fresh and spent samples provides insights into the structural and chemical changes that occur during the photocatalytic reaction. The FTIR spectra of fresh/spent-2NiCoAlCN is obtained for analysis. Broader peak in the range of 2800-3600 cm$^{-1}$ is corresponding to surface adsorbed water molecules and stretching vibration of the amino group (N—H) of gCN. Meanwhile, the presence of CN heterocycles of gCN can be observed in the presence of peak at the range of 1020-1700 cm$^{-1}$. A sharp peak at around 805 cm$^{-1}$ is attributed to the vibrational modes of the heptazine unit of gCN. Additionally, it is challenging to identify the structural units of $Ni_1Co_1Al_1$ LDH possibly due to the higher proportion of gCN in the nanocomposite and the overlapping of the peaks. Nevertheless, the structural stability of 2NiCoAlCN can still be assessed since there are no new peaks appearing, and the peak structure remains unchanged, indicating the absence of new species. Besides, no obvious reduction in the peak intensity, specifically for the CN heterocycles and the heptazine units og gCN, further confirms the higher stability of the nanocomposite.

The photocatalytic electron-hole transfer process adheres to the S-scheme mechanism. The Tauc plot analysis is employed to determine the band gap values of pure gCN and $Ni_1Co_1Al_1$ LDH, which are measured to be 2.9 eV and 2.21 eV, respectively. Additionally, the Mott-Schottky plot is utilized to calculate the $E_{CB}$ and $E_{VB}$ of pure gCN and $Ni_1Co_1Al_1$ LDH, respectively. For pure gCN, the $E_{CB}$ is determined to be −1.26 eV, and their $E_{VB}$ value is calculated to be 1.64 eV in reference to $E_{VB}=E_{CB}+E_{BG}$. Correspondingly, the $E_{VB}$ value for pure $Ni_1Co_1Al_1$ LDH determined from Mott-Schottky is +0.82 eV, while the $E_{CB}$ value is calculated to be −1.4 eV. The transformations of the electron density on the 2NiCoAlCN are identified based on the shifting of the binding energies in the XPS analysis. The negative shift in the binding energy of the nanohybrid with respect to the gCN suggests the reduction in the electron density, highlighting gCN as a higher electron-density region. Meanwhile, the shifting of 2NiCoAlCN towards a higher-energy region when compared to pure $Ni_1Co_1Al_1$ LDH suggests the electron transfer from gCN to $Ni_1Co_1Al_1$ LDH. The interface contacts between gCN and $Ni_1Co_1Al_1$ LDH lead to the formation of a weaker internal electric field, which promotes electron migration. According to Equation (4) to (5), the absorption of photons with an energy equal to or greater than the bandgap of the semiconductor photocatalysts led to the formation of electron-hole pairs. The diffusion of electrons from $Ni_1Co_1Al_1$ LDH to gCN, once in contact, leads to the creation of electron accumulation and depletion layers near the interface of gCN and $Ni_1Co_1Al_1$ LDH, causing the surface of gCN to be negatively-charged while $Ni_1Co_1Al_1$ LDH to be positively-charged. The formation of an internal electric field directing from $Ni_1Co_1Al_1$ LDH to g-CN hastens the inversed transfer of electrons from g-CN to $Ni_1Co_1Al_1$ LDH, which is consistent with the XPS analysis. The alignment in the Fermi level in the heterojunction system led to the band structure bending, resulting in the downward and upward shifting in the energy level, which facilitate the electron transfer in the S-scheme route. The distinct S-scheme transfer routes offer the eradication of unused electrons and holes at the CB of gCN and VB of $Ni_1Co_1Al_1$ LDH through electron-hole Coulombic attraction. Therefore, the electrons and holes with strong redox capability are reserved, which explains the observed enhancement in the photocatalytic activity of 2NiCoAlCN nanohybrids.

Besides, the S-scheme mechanism proffers excellent charge transfer pathways and effectively restrained the recombination of photogenerated charges, which is confirmed by the observed decrease in the intensity peak through PL analysis of 2NiCoAlCN nanohybrids. From Equation (6), preserved holes with stronger oxidative capability will undergo an oxidation reaction to generate protons (H+) and oxygen (O2). Some of the holes will be trapped and oxidized by TEOA to generate $H_2$, explaining the increase in the hydrogen yield from the stability results (Equation (7)). Meanwhile, from Equation (8), the preserved electrons at the CB of $Ni_1Co_1Al_1$ LDH, which has a stronger reducing capability, will undergo a reduction reaction with protons to generate hydrogen.

$$gCN + h\nu \rightarrow e^- h^+ \quad (4)$$

$$gCN(e^-) + NiCoAl(h^+) \rightarrow e^- + h^+ \quad (5)$$

$$H_2O + 2h^+ \rightarrow \tfrac{1}{2}O_2 + 2H^+ \quad (6)$$

$$C_6H_{15}NO_3 + 12H_2O \rightarrow 6CO_2 + 19H_2 + HNO_3 \quad (7)$$

$$2H^+ + 2e^- \rightarrow H_2 \quad (8)$$

Thus, construction of an S-scheme electron transfer mechanism with the promotion of oxidizability and reducibility creates efficient electron-hole transport, improves charges lifetime, and enhances the catalytic reaction in 2NiCoAlCN nanohybrids. In addition, the cationic effects suggest an enhanced interaction between the metal hydroxides layer and adsorbed molecules in 2NiCoAlCN, which augment its photocatalytic activity.

Figure 23:
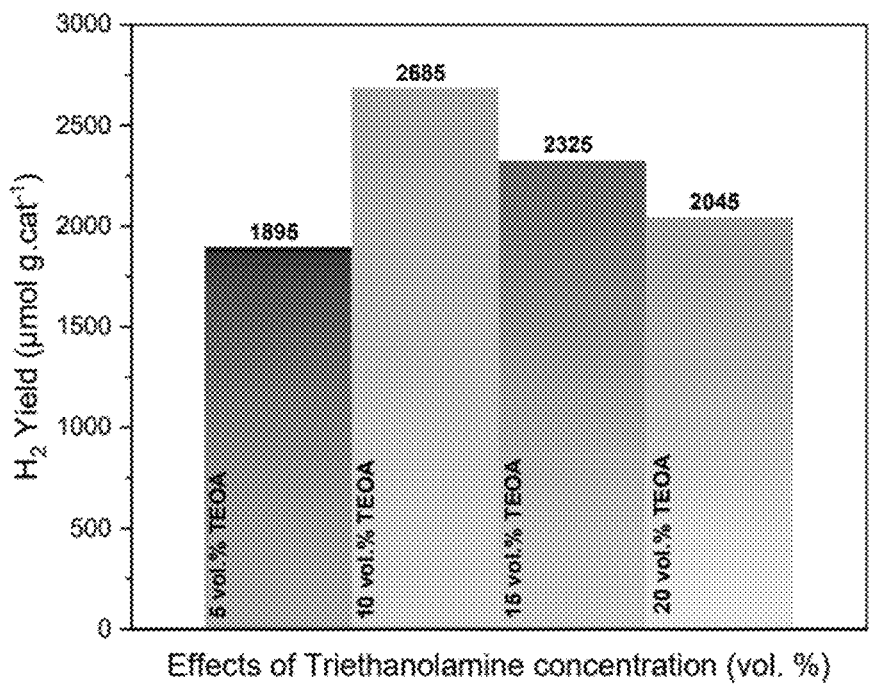
FIG. 23 shows effects of TEOA concentration (vol. %: 5, 10, 15, 20) on photocatalytic hydrogen production, in accordance with the present invention.

In an embodiment of the present invention, the photocatalytic performance of ternary $V_2C/Ni_1Co_1Al_1$ LDH/g-$C_3N_4$ and operating parameters evaluation are conducted. Significantly, the photocatalytic performance is first assessed by investigating the effects of $V_2C$ in the ternary catalyst system. The photocatalytic activity is initially conducted at 0.1 g of catalyst loading with 5 vol. % of TEOA concentration and 4 h of visible irradiation. The photocatalytic evaluation is continued by varying the TEOA at different concentrations. The optimal TEOA concentration determined from this variation is then utilized in the subsequent photocatalytic test to assess the loading of $V_2C/Ni_1Co_1Al_1$ LDH/g-$C_3N_4$. Finally, the photocatalytic stability is evaluated, and the analysis of the spent catalyst is performed. The influence of $V_2C$ in the ternary catalyst system of $V_2C/Ni_1Co_1Al_1$ LDH/g-$C_3N_4$ is investigated, and the rate of hydrogen yield relative to $V_2C$ loading is demonstrated in FIG. 22. The initial screening of the binary $Ni_1Co_1Al_1$ LDH/g-$C_3N_4$ system reveals that a 10 wt. % loading of $Ni_1Co_1Al_1$ LDH exhibits optimal photocatalytic efficiency. Consequently, the loading of $Ni_1Co_1Al_1$ LDH is fixed at this amount due to its essential role as a supporting catalyst for facilitating the generation of electron-hole pairs. In addition, it is crucial to ensure optimal loading of each individual photocatalyst to suit the ternary composite and promotes the construction of a high-efficient hybrid heterojunction system. Therefore, loading variation of conductive $V_2C$ is essential to avoid over-loading of the catalyst, which can result in light-shielding within the ternary system. The photocatalytic results depict a higher performance at an optimal 3 wt. % loading of $V_2C$ with a rate of hydrogen production of 1896 µmol g.cat$^{-1}$. The small addition of $V_2C$ into the ternary system does not result in a significant enhancement in photocatalytic activity. This could potentially be due to the low dispersibility of $V_2C$ within the $V_2C/Ni_1Co_1Al_1$ LDH/g-$C_3N_4$ nanocomposite, restricting its effective interaction with other materials. Nevertheless, efficient distribution and synergistic interaction between $V_2C$ with $Ni_1Co_1Al_1$ LDH/g-$C_3N_4$ results in higher hydrogen yield, which is twice as high as that observed in its binary counterpart. The formation of a hybrid heterojunction system in ternary $V_2C/Ni_1Co_1Al_1$ LDH/g-$C_3N_4$ composite leads to improved carrier dynamics. This enhancement is attributed to the synergistic S-scheme charge transfer in NiCoAl LDH/g-$C_3N_4$ and hole-trapping effects by $V_2C$. However, in the ternary $V_2C/NiCoAl$ LDH/g-$C_3N_4$ composite, a small increment of $V_2C$ loading above its optimal amount significantly results in a declination of photocatalytic performances. Excessive $V_2C$ loading in the nanocomposite can potentially hinder the penetration of light toward the catalyst surfaces. This is particularly significant when the amount of $Ni_1Co_1Al_1$ LDH in the nanocomposite is relatively small. The presence of an excessive amount of $V_2C$ can act as a light-blocking layer, limiting the accessibility of light to the $Ni_1Co_1Al_1$ LDH catalyst surface. Low photonic absorption will result in a decreased electron-hole generation which impacts its photocatalytic activity and causes instability in the ternary hybrid charge transfer system. Therefore, effective integration and synergistic interaction of each photocatalyst in the ternary heterojunction composite is crucial to ensure high-efficient photocatalytic system The impact of Triethanolamine (TEOA) concentration on photocatalytic hydrogen production is investigated by varying the TEOA-water concentration at (vol. %: 5, 10, 15, and 20). The photocatalytic reaction is conducted using 0.1 g of $V_2C/Ni_1Co_1Al_1$ LDH/g-$C_3N_4$ for a 4 h reaction under visible-light irradiation. The resulting photocatalytic hydrogen yield is depicted in FIG. 23, observing the highest rate of hydrogen production at a concentration of 10 vol. % TEOA, reaching 2690 µmol g.cat$^{-1}$. However, a gradual increase in the TEOA concentration results in the dropping of hydrogen yield. A notable increase observed in the photocatalytic performance at a concentration of 10 vol. % can be attributed to the role of TEOA as a sacrificial electron donor and hole scavenger. TEOA effectively suppresses the recombination of photogenerated charges, facilitating prolonged charge separation and providing a surplus of electrons for efficient hydrogen conversion. Nevertheless, excessive amounts of TEOA particles in the solution can lead to competition between TEOA and water molecules for the available active sites on the photocatalyst. The blocking of active sites may happen, impeding the reaction of water molecules, which explains the gradual decrease in the photocatalytic activity observed at 15 and 20 vol. % of TEOA concentration. Hence, it is crucial to carefully adjust the concentration of TEOA to prevent the onset of competition between the reactant molecules, which could restrict its photocatalytic activity.

Figure 24:
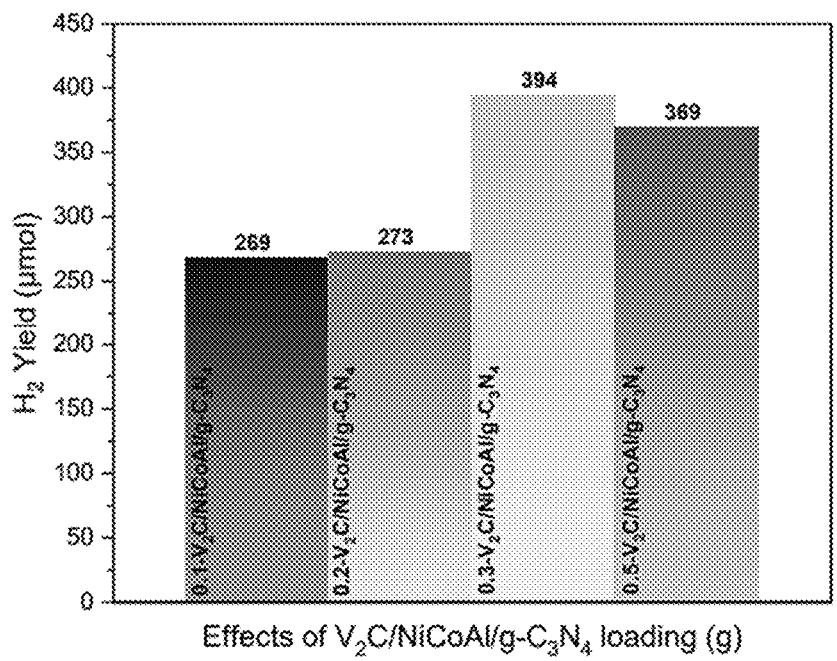
FIG. 24 shows effects of $V_2C/Ni_1Co_1Al_1$ LDH/g-$C_3N_4$ loading in the slurry photocatalytic reaction system, in accordance with the present invention.

The effects of $V_2C/Ni_1Co_1Al_1$ LDH/g-$C_3N_4$ loading and its photocatalytic hydrogen yield is analysed. Optimizing the composite loading is crucial for achieving optimal photocatalytic hydrogen production. The photocatalytic activity is conducted at 10 vol. % TEOA-water concentration for 4 h reaction time. The effects of $V_2C/Ni_1Co_1Al_1$ LDH/g-$C_3N_4$ loading and its photocatalytic hydrogen yield are depicted in FIG. 24. A substantial improvement in photocatalytic performance is observed when $V_2C/Ni_1Co_1Al_1$ LDH/g-$C_3N_4$ loading reaches 0.3 g, resulting in a maximum hydrogen production rate of 394 µmol. Increasing the loading facilitates greater accessibility of water molecules to undergo photoredox reactions, owing to an abundant supply of reaction-active sites. In addition, good composite distribution is achieved in the slurry solution, increasing the utilization of incident light in the photocatalytic system. Therefore, optimal contact between the light and catalyst surface is achieved. However, a decline in catalytic activity is observed as the loading is increased to 0.5 g. This can be attributed to the light-shadowing effects caused by the increased turbidity in the reaction suspension and potential agglomeration of the catalyst. An increase in the particle-particle interaction relative to higher particle concentration can result in composite agglomeration. Consequently, the increase in the light scattering and the blockage of light into the reaction system will disrupt the light-harvesting activity and limit the generation of photogenerated charges, which reduce the photocatalytic performances.

The photocatalytic stability and consistency of the ternary $V_2C/Ni_1Co_1Al_1$ LDH/g-$C_3N_4$ nanocomposite is evaluated in 5 vol. % of TEOA-water sacrificial reagents with 0.1 g of catalyst loading. The photocatalytic reaction is conducted in a slurry photocatalytic reactor, with a total irradiation time of 4 hours for each cycle. The stability and consistency are evaluated over a total of 6 cycles of reaction activity. The experimental procedure for the ternary composite is the same as that of the binary composite. Specifically, the reaction is conducted under continuous visible-light exposure in a cyclic manner. After each cycle, the system is allowed to rest for 1 h while continuously flowing $N_2$ gas to eliminate any residual hydrogen in the system. Subsequently, the next cyclic reaction started, and hydrogen generation is evaluated at hourly intervals. The photocatalytic stability result observes a notable increase in hydrogen production across the cyclic hour. Significantly, ternary $V_2C/Ni_1Co_1Al_1$ LDH/g-$C_3N_4$ nanocomposite exhibits remarkable and robust photocatalytic activity without any drop in performance. An impressive photocatalytic robustness is attributed to the distinct structure of the ternary $V_2C/Ni_1Co_1Al_1$ LDH/g-$C_3N_4$ nanocomposite. Significantly, the effectiveness of TEOA as a sacrificial electron donor and hole scavenger offers a substantial enhancement in the structural stability of $V_2C/Ni_1Co_1Al_1$ LDH/g-$C_3N_4$. As observed in the binary $V_2C$/g-$C_3N_4$, the presence of holes could foster the degradation kinetics resulting in the bond breaking of heptazine units in g-$C_3N_4$. Significantly, maintaining the chemical stability of the nanocomposite is of great importance, specifically in g-$C_3N_4$, as it serves as the primary catalyst, contributing the highest proportion within the nanocomposite. TEOA, which is highly compatible with g-$C_3N_4$, effectively scavenges unused holes and avoids its accumulation on g-$C_3N_4$ surfaces. In addition, the construction of a multi-hybrid heterojunction system with synergistic effects of S-scheme and Schottky junction improves the charge transfer activity in the ternary nanocomposite. This construction effectively eliminates the accumulation of unused electron-hole pairs, thereby preserving the structural stability of the material. The observed improvement in the photocatalytic performance over the 6 cyclic runs is likely to be attributed form the formation of metallic nickel, $Ni^0$, as determined by XPS analysis on the spent-$V_2C/Ni_1Co_1Al_1$ LDH/g-$C_3N_4$. The formation of $Ni^0$ synergistically promotes light utilization owing to its plasmonic properties and facilitates rapid photoredox reaction.

Figure 25:
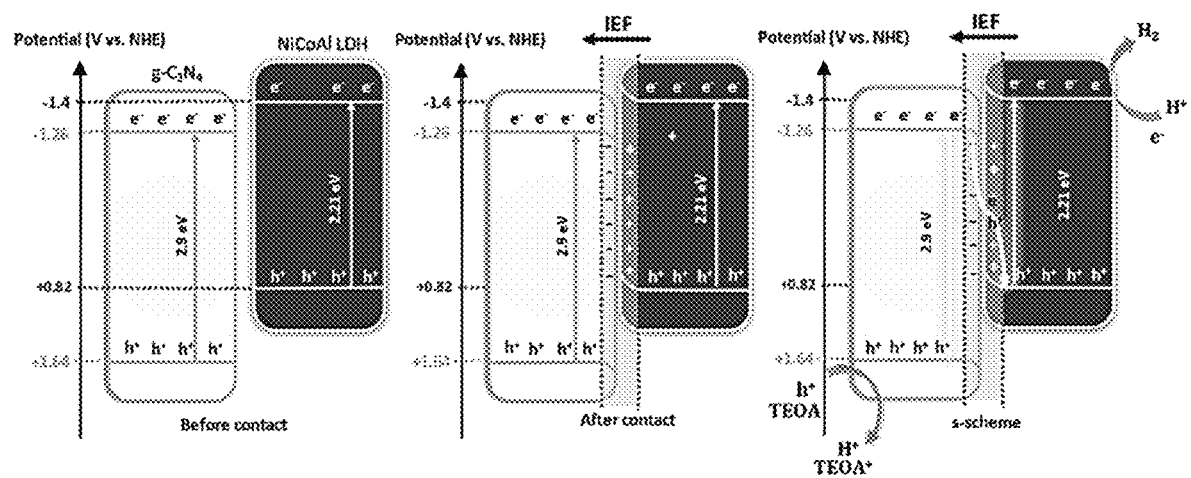
FIG. 25 shows photocatalytic electron transfer mechanism in $Ni_1Co_1Al_1$ LDH/g-$C_3N_4$ for solar hydrogen production, in accordance with the present invention.

For spent catalyst analysis, the comparison is made of FTIR analysis between fresh- and spent catalyst. The FTIR spectra of spent-$V_2C/Ni_1Co_1Al_1$ LDH/g-$C_3N_4$ still exhibit the same functional composition as the fresh sample, signifying excellent structural stability even after 6 reaction cycles under visible-light irradiation. Significantly, a narrow peak at 805 $cm^{-1}$ is attributed to the vibrational modes of the tri-s-triazine unit of g-$C_3N_4$. Interestingly, there is no reduction in the peak intensity, which indicates the preservation of the intact structure of tri-s-triazine of g-$C_3N_4$. In addition, the C—N heterocycles in both fresh and spent samples exhibit no changes in the peak, indicating higher structural stability. The preservation of both tri-s-triazine and C—N heterocycles in g-$C_3N_4$ indicates the absence of structural decomposition. This positively suggests the ability of the ternary composite to retain its functional composition and catalytic performance during cyclic hours. Nevertheless, there is a slight reduction in the absorption band of N—H functional. This can be due to the strong attachment of TEOA molecules on the g-$C_3N_4$ surface, which may partially block the light absorption of certain functional groups. Despite this reduction, the intact structure of tri-s-triazine and C—N heterocycles in g-$C_3N_4$ demonstrates its excellent structural stability signifying its significance in photocatalytic hydrogen production under prolonged cyclic activity. XPS analysis is employed to investigate the chemical stability of the spent-$V_2C/Ni_1Co_1Al_1$ LDH/g-$C_3N_4$ after 6 reaction cycles under visible irradiation, the binding energy of elements C, N, O, Ni, Co, Al, and V is compared with the fresh catalyst. The chemical stability of g-$C_3N_4$ in the nanocomposite can be observed from the states of the XPS peak in C is and N Is. FIG. 25 shows XPS spectra for N is of the spent- and fresh-$V_2C/Ni_1Co_1Al_1$ LDH/g-$C_3N_4$. The shifting in the binding energy can be observed in the spent catalyst, signifying the presence of electron transfer during the photocatalytic reaction. Furthermore, no phase change is observed, and there is no presence of structural degeneration in g-$C_3N_4$, elucidating the well-preserved structure. The binding energy peak of Ni 2p demonstrates the presence of a weaker peak at a lower energy region at ≈850.1 eV. This can be attributed to the formation of $Ni^0$, which is likely to contribute to the increase in the photocatalytic stability in the cyclic hour. The formation of metallic nickel can serve as a good electron mediator to expedite the electronic transfer and improve the reactivity of the catalyst. This can also be the reason for the gradual increase in the photocatalytic hydrogen yield across the cyclic hours, as reflected in the stability test.

On the other hand, no apparent peak shifting is observed for Co 2p and Al 2p, which strongly suggests higher chemical stability exhibited by the $Ni_1Co_1Al_1$ LDH, thus contributing to a highly stable heterojunction system. Besides, the binding peak in O is of spent-$V_2C/Ni_1Co_1Al_1$ LDH/g-$C_3N_4$ shows a significant peak shifting which is likely due to the ligand effects by TEOA which results in the change in the electronegativity. An increase in the ratio intensity of M-OH to M-O in the spent catalyst compared to the fresh sample signifies the attachment of TEOA molecules onto the catalyst surface. Significantly, during the photocatalytic reaction, the hydroxyl groups of TEOA are likely to be adsorbed on the catalyst surface and attached to the metal centers on the surface. Meanwhile, the presence of peak spectra at 512.1 and 517.6 eV in spent-V 2p, is attributed to the formation of the V-C bond, corroborates the presence of $V_2C$ and their good interaction with g-$C_3N_4$ and NiCoAl LDH. The decrease in the intensity peak ratio at 514.7 and 521.5 eV, associated with vanadium oxide formation, denotes a highly stable structure and good oxidation stability of the nanocomposite.

In an embodiment of the invention, a photocatalytic electron transfer mechanism for both the binary and ternary composites is proposed, supported by a series of characterization analyses and experimental evaluations. In addition, the mechanism of hydrogen production in $V_2C$/g-$C_3N_4$, $Ni_1Co_1Al_1$ LDH/g-$C_3N_4$, and $V_2C/Ni_1Co_1Al_1$ LDH/g-$C_3N_4$ is proposed to obtain a further understanding on the photocatalytic redox activity. Schottky junction is constructed in $V_2C$/g-$C_3N_4$ nanocomposite The photocatalysis process is a process that converts light into chemical energy through photon absorption and carrier generation. The basic principles of photocatalysis involve five principal steps: (1) light utilization by primary photocatalyst, (2) the generation of photocarriers, (3) excitation of the photogenerated electrons, (4) photoredox reaction, and (5) carriers recombination. In general, when the incident light with an energy equal to or greater than the bandgap of the semiconductor photocatalyst strikes the surfaces, the photon absorption results in the generation of electron-hole pairs at VB of the semiconductor material. The photogenerated electrons will undergo an excitation process to CB, separating from holes. The photoredox reaction will occur where the reduction reaction takes place at the CB of the semiconductor, while the oxidation reaction for protons generation will happen at the VB of the semiconductor. For a thermodynamically stable chemical reaction, the generic rule is to ensure that the reductive band potentials and conduction band minimum (CBM) to be more negative than the reduction potential of water, $H^+/H_2$ (−0.41 eV vs NHE at pH 7). On the other hand, the oxidative band potential and the valence band minimum (VBM) are designated to be more positive than the oxidation potential of water, $O_2/H_2O$ (+0.82 eV vs NHE at pH 7). Besides, the band gap energy is designed to be higher than 1.23 eV. Disregarding the generic rules of water splitting will retard the overall photocatalytic process. Therefore, the selection of the main semiconductor material that can fully harvest solar irradiation is essential to ensure an efficient photocatalytic reaction. the photocatalytic hydrogen mechanism of $V_2C/g-C_3N_4$, is hypothesized based on the characterizations and experimental results. The chemical reaction for the photocatalytic mechanism is depicted in Equations (9-12), which demonstrates the basic mechanism of water splitting in the generation of hydrogen.

$$g\text{-}C_3N_4 + h\nu \rightarrow e^- + h^+ \quad (9)$$

$$g\text{-}C_3N_4(e^-) + V_2C \rightarrow V_2C(e^-) \quad (10)$$

$$H_2O + 2h^+ \rightarrow \tfrac{1}{2}O_2 + 2H^+ \quad (11)$$

$$2H^+ + 2e^- \rightarrow H_2 \quad (12)$$

Based on the characterization analyses and experimental evaluations, the possible mechanism and behavior of the charge transfer in the Schottky junction system is proposed. The VB of $g$-$C_3N_4$ is measured from the VB-XPS to be +1.64 eV which is consistent with the calculation from the Tauc plot. From the $E_g=E_{VB}-E_{CB}$, the CB of $g$-$C_3N_4$ is estimated to be −1.26 eV. Additionally, UV-Vis and PL analysis characterizations reveals the inability of $V_2C$ to generate electrons and holes as no absorption peak is observed from the UV-Vis, while a lower intensity peak from PL analysis indicates no electron-hole recombination. These findings elucidate the possible formation of a metal-semiconductor charge transfer mechanism where $g$-$C_3N_4$ is the main photocatalyst responsible for the electron-hole pairs generation, while $V_2C$ functions as a metallic conductor to expedite the photoreaction. Specifically, the electrons and holes are generated at the VB of $g$-$C_3N_4$ after exposure to visible light. The photogenerated charges then undergo charge separation where electrons are excited to the CB while holes remain at the VB of $g$-$C_3N_4$ as depicted in Equation (9). The negative shift of C is and N is in $V_2C/g$-$C_3N_4$ observed from XPS analysis further explains the electron transfer from electron-rich $g$-$C_3N_4$ towards electron-deficient $V_2C$. Additionally, the lower work function in $g$-$C_3N_4$ (≈4.3 eV) than in $V_2C$ (≈5.7 eV) aids the transfer of photogenerated electrons to the $V_2C$, such as shown in Equation (10). The difference in the work function and the band alignment at the $g$-$C_3N_4$—$V_2C$ junction generates a built-in internal electric field that functions as an electron trapping center. Therefore, the merit of having a higher metallic electrical conductivity of $V_2C$ as a co-catalyst is to hinder charge recombination. The creation of the Schottky interface junction, causing charges redistribution, prevents the backward flow of the electrons at $V_2C$ from returning to $g$-$C_3N_4$ and recombining with holes. Therefore, more electrons are available at the reduction sites to undergo reaction with protons and generate hydrogen, which is one of the contributing factors for the enhanced hydrogen production after adding $V_2C$, which can be seen from the PL peak depression in the nanocomposite. The facile transfer of electrons upon the introduction of $V_2C$ corroborates an effective formation of the metal-semiconductor interface junction. In Equation (11-12), the holes at VB undergo an oxidation reaction with water to generate protons and oxygen, while electrons undergo a reduction reaction with protons to produce hydrogen. Faster recombination rates of electrons and holes denote reduced efficiency as fewer available electrons and holes can carry out redox reactions. The recombination of charges once occurs when the excited electrons lose energy in the form of unproductive heat.

The S-scheme formation in NiCoAl LDH/$g$-$C_3N_4$ nanocomposite is analysed. The photocatalytic electron-hole transfer process adheres to the S-scheme mechanism, which is postulated based on Mott-Schottky, Tauc Plot, PL, and XPS analysis. The Tauc plot analysis is employed to determine the band gap values of pure $g$-$C_3N_4$ and NiCoAl LDH, which are measured to be 2.95 eV and 2.21 eV, respectively. Additionally, the Mott-Schottky plot is utilized to calculate the $E_{CB}$ and $E_{VB}$ of pure $g$-$C_3N_4$ and NiCoAl LDH, respectively. For pure $g$-$C_3N_4$, the $E_{CB}$ is determined to be −1.26 eV, and their $E_{VB}$ value is calculated to be 1.64 eV in reference to $E_{VB}=E_{CB}+E_{BG}$. Correspondingly, the $E_{VB}$ value for pure NiCoAl LDH determined from Mott-Schottky is +1.10 eV, while the $E_{CB}$ value is calculated to be −1.4 eV. The transformations of the electron density on the NiCoAl LDH/$g$-$C_3N_4$ are identified based on the shifting of the binding energies in the XPS analysis. The negative shift in the binding energy of the nanohybrid with respect to the $g$-$C_3N_4$ suggests the reduction in the electron density, highlighting $g$-$C_3N_4$ as a higher electron-density region. Meanwhile, the shifting of $Ni_1Co_1Al_1$ LDH/$g$-$C_3N_4$ towards a higher-energy region when compared to pure $Ni_1Co_1Al_1$ LDH suggests the electron transfer from $g$-$C_3N_4$ to $Ni_1Co_1Al_1$ LDH. The interface contacts between $g$-$C_3N_4$ and $Ni_1Co_1Al_1$ LDH lead to the formation of a weaker internal electric field, which promotes electron migration.

As depicted in FIG. 25, Equation (13), the absorption of photons with an energy equal to or greater than the bandgap of the semiconductor photocatalysts leads to the formation of electron-hole pairs. The diffusion of electrons from $Ni_1Co_1Al_1$ LDH to $g$-$C_3N_4$, once in contact, leads to the creation of electron accumulation and depletion layers near the interface of $g$-$C_3N_4$ and $Ni_1Co_1Al_1$ LDH, causing the surface of $g$-$C_3N_4$ to be negatively-charged while $Ni_1Co_1Al_1$ LDH to be positively-charged. The formation of an internal electric field directing from $Ni_1Co_1Al_1$ LDH to $g$-$C_3N_4$ hastens the inversed transfer of electrons from $g$-$C_3N_4$ to $Ni_1Co_1Al_1$ LDH, which is consistent with the XPS analysis. The alignment in the Fermi level in the heterojunction system leads to the band structure bending, resulting in the downward and upward shifting in the energy level, which facilitate the electron transfer in the S-scheme route. The distinct S-scheme transfer routes offer the eradication of unused electrons and holes at the CB of $g$-$C_3N_4$ and VB of $Ni_1Co_1Al_1$ LDH through electron-hole Coulombic attraction. Therefore, the electrons and holes with strong redox capability are reserved, which explains the observed enhancement in the photocatalytic activity of $Ni_1Co_1Al_1$ LDH/$g$-$C_3N_4$ nanohybrids. Besides, the S-scheme mechanism proffers excellent charge transfer pathways and effectively restrained the recombination of photogenerated charges, which is confirmed by the observed decrease in the intensity peak through PL analysis of $Ni_1Co_1Al_1$ LDH/$g$-$C_3N_4$ nanohybrids. From Equation (15), preserved holes with stronger oxidative capability will undergo an oxidation reaction to generate protons (H+) and oxygen (O2). Some of the holes will be trapped and oxidized by TEOA to generate $H_2$, explaining the increase in the hydrogen yield from the stability results (Equation (16)). Meanwhile, from Equation (17), the preserved electrons at the CB of $Ni_1Co_1Al_1$ LDH, which has a stronger reducing capability, will undergo a reduction reaction with protons to generate hydrogen. The construction of a direct S-scheme electron transfer mechanism with the promotion of oxidizability and reducibility creates efficient electron-hole transport, improves charge lifetime, and enhances the catalytic reaction in $Ni_1Co_1Al_1$ LDH/$g$-$C_3N_4$ nanohybrids.

$$g\text{-}C_3N_4 + h\nu \rightarrow e^- + h^+ \tag{13}$$

$$g\text{-}C_3N_4(e^-) + \text{NiCoAl LDH}(h^+) \rightarrow e^- + h^+ \tag{14}$$

$$H_2O + 2h^+ \rightarrow \tfrac{1}{2}O_2 + 2H^+ \tag{15}$$

$$C_6H_{15}NO_3 + 12H_2O \rightarrow 6CO_2 + 19H_2 + HNO_3 \tag{16}$$

$$2H^+ + 2e^- \rightarrow H_2 \tag{17}$$

Figure 26:
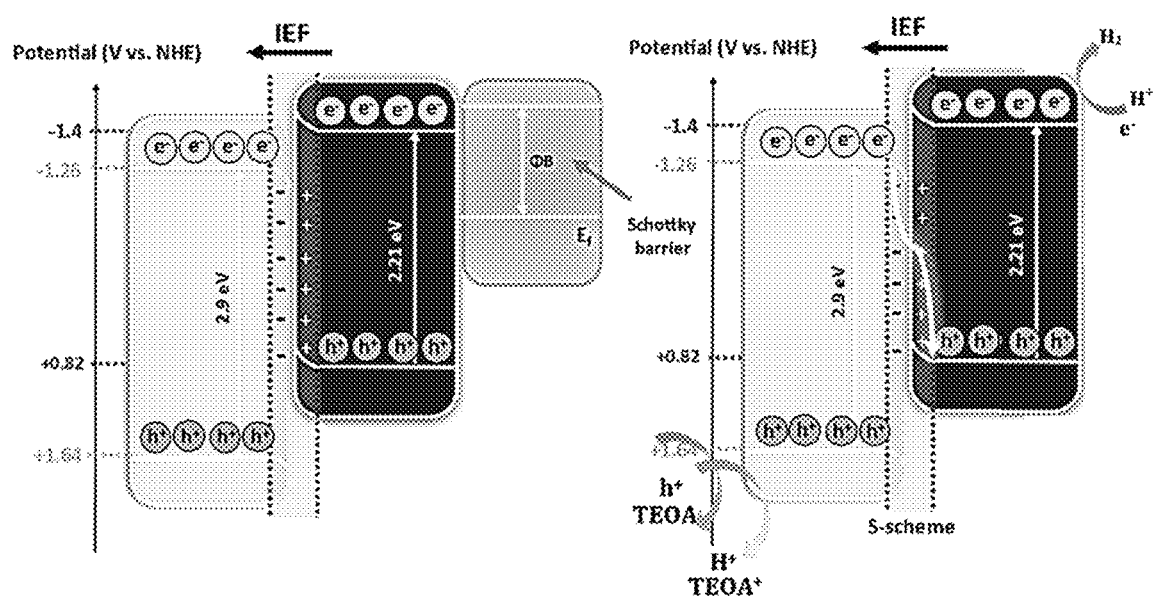
FIG. 26 shows photocatalytic electron transfer in hybrid-junction of $V_2C/Ni_1Co_1Al_1$ LDH/g-$C_3N_4$, in accordance with the present invention.

In another embodiment of the invention, hybrid-junction formation in ternary $V_2C/\text{NiCoAl LDH}/g\text{-}C_3N_4$ nanocomposite is analysed. The photocatalytic electron transfer in the ternary $V_2C/Ni_1Co_1Al_1\text{ LDH}/g\text{-}C_3N_4$ nanocomposite is proposed and postulated based on various experimental analyses, primarily Mott-Schottky and tauc plot analyses, which is to determine the electronic band structure and energy level of the materials. The behavior of electronic transfer in the binary heterojunction is investigated through XPS analysis, which also helps ascertain the transfer pathway in the ternary $V_2C/Ni_1Co_1Al_1\text{ LDH}/g\text{-}C_3N_4$ nanocomposite. Analysis such as PL is employed to examine the recombination and carrier dynamics in the binary and ternary heterojunction. Therefore, a hybrid junction consisting of a combination of S-scheme heterojunction and Schottky-junction system is proposed, as depicted in FIG. 26. In this regard, the electron transfer across $g\text{-}C_3N_4$ and $Ni_1Co_1Al_1$ LDH adhering to the S-scheme system while the introduction of $V_2C$ promotes the construction of potential barrier impeding the reversed injection of electrons to the $Ni_1Co_1Al_1$ LDH $g\text{-}C_3N_4$. The band gap of pure $g\text{-}C_3N_4$ and $Ni_1Co_1Al_1$ LDH, which are measured from the Tauc plot, is found to be 2.95 eV and 2.21 eV. The Mott-Schottky analysis is employed to calculate the $E_{CB}$ and $E_{VB}$ of the materials. The $E_{CB}$ value is determined to be $-1.26$ eV and $-1.4$ eV, while the $E_{VB}$ value is calculated to be 1.64 eV and $+1.10$ eV for pure $g\text{-}C_3N_4$ and $Ni_1Co_1Al_1$ LDH, respectively.

The shifting in the binding energy of the XPS spectrum affirmed the transfer pathway across the system. The transfer mechanism is evaluated based on the binary nanocomposite counterpart to investigate the electron transfer behavior between the co-catalyst and metal co-catalyst. The negative shifting in the binding energy of C is and N is peak of binary $Ni_1Co_1Al_1\text{ LDH}/g\text{-}C_3N_4$ in comparison to pristine $g\text{-}C_3N_4$ suggests a reduction in the electron density of the binary composite. This results in the flow of electrons from the higher density region of $g\text{-}C_3N_4$ to a lower density region of $Ni_1Co_1Al_1$ LDH, explaining the behavior of charge transfer in the binary heterojunction. The interfacial contact between the materials generates the inversed electric field pointing from $Ni_1Co_1Al_1$ LDH to $g\text{-}C_3N_4$, along with Coulombic force interaction, to accelerate the electron transmission across the semiconductor. The interface contact between $Ni_1Co_1Al_1$ LDH and $g\text{-}C_3N_4$ leads to the alignment in the Fermi level, resulting in the band edge bending and creation of electron-rich ($g\text{-}C_3N_4$) and deficient ($Ni_1Co_1Al_1$ LDH) with a built-in electric field, which promotes the interfacial recombination of unused electron-hole pairs. Therefore, the S-scheme offers a reservation of electrons with stronger reducing capability at $Ni_1Co_1Al_1$ LDH counterpart, hastening the photoredox reaction.

The construction of a ternary composite with the addition of $V_2C$ as a metal co-catalyst enhances the electronic transfer and hampers charge recombination. Particularly, $V_2C$ serves as electron sinking through the creation of the Schottky barrier. The interfacial contact between metallic $V_2C$ and $Ni_1Co_1Al_1$ LDH results in rapid migration of electrons from semiconducting $Ni_1Co_1Al_1$ LDH to metallic $V_2C$, owing to the difference in the Fermi level energy of both materials. The formation of a potential barrier traps the electrons in the $V_2C$ region, which prevents the reversed injection of electrons back to semiconducting $Ni_1Co_1Al_1$ LDH. This preserves more electrons with a stronger reduction capability to undergo photoredox reaction, thereby improving photocatalytic activity. The merit of the hybrid-junction system in the ternary $V_2C/Ni_1Co_1Al_1\text{ LDH}/g\text{-}C_3N_4$ can be reflected from the depression of PL spectra, corroborating the notable enhancement in the carrier separation compared to the binary structures. Improvement in the charge transport system with lower transfer resistance further explicates the contribution of a hybrid-junction system for photocatalytic enhancement.

Charge Transfer Mechanism Across the Semiconductor $$g\text{-}C_3N_4 + h\nu \rightarrow e^- + h+ \tag{18}$$

$$\text{NiCoAl LDH} + h\nu \rightarrow e^- + h^+ \tag{19}$$

$$g\text{-}C_3N_4(e^- + h^+) \rightarrow g\text{-}C_3N_4(h^+) \tag{20}$$

$$\text{NiCoAl LDH}(e^- + h^+) \rightarrow \text{NiCoAl LDH}(e^-) \tag{21}$$

$$\text{NiCoAl LDH}(e^-) + V_2C \rightarrow V_2C(e^-) \tag{22}$$

Oxidation Reaction of $H_2O$ $$H_2O + 2h^+ \rightarrow \tfrac{1}{2}O_2 + 2H+ \tag{23}$$

Reduction Reaction for Hydrogen Conversion $$2H^+ + 2e^- \rightarrow H_2 \tag{24}$$

Oxidation Reaction of TEOA $$C_6H_{15}NO_3 + 12H_2O \rightarrow 6CO_2 + 19H_2 + HNO_3 \tag{25}$$

The basic mechanism of photocatalytic hydrogen conversion in ternary $V_2C/Ni_1Co_1Al_1\text{ LDH}/g\text{-}C_3N_4$ is presented in Equations (18-25) ascertained from the experimental evaluation and characterization analyses. The photocatalytic electron transfer mechanism starts with photonic absorption by $Ni_1Co_1Al_1$ LDH and $g\text{-}C_3N_4$, resulting in carrier generation and separation as demonstrated in Equations (18-19). The electronic redistribution affirmed by binding energy shift led to the accumulation of holes at the $g\text{-}C_3N_4$ and electrons at $Ni_1Co_1Al_1$ LDH, as presented in Equations (20-21). The formation of the potential barrier by $V_2C$ results in the trapping of electrons, as depicted in Equation (22). Equations (23-24) explains the photoredox reaction by holes at the VB of $g\text{-}C_3N_4$ and accumulated electrons at the $V_2C$ surface, explicating the hydrogen conversion. The introduction of TEOA serves as a hole scavenger to hamper the photodecomposition of $g\text{-}C_3N_4$ while contributing to more production of hydrogen through TEOA oxidation, as depicted in Equation (25).

According to the invention, S-scheme heterojunction of 2D/2D 2NiCoAlCN is designed by finely adjusting the cationic composition of $M^{2+}/M^{3+}$ in $Ni_xCo_yAl_z$ LDH relative to its layer charge density. The cationic ratio of $Ni_xCo_yAl_z$ LDH is varied at different layer charge densities (x: 0.25, 0.33, 0.5) and its photocatalytic effects is analysed. The optimal cationic ratio of $Ni_1Co_1Al_1$ LDH in 10-2NiCoAlCN nanohybrid, with a layer charge density (x) of 0.33, exhibits the highest hydrogen production rate of 254 $\mu$mol g$^{-1}$ h$^{-1}$ which is two- and four-times enhancement than pure gCN and $Ni_1Co_1Al_1$ LDH. S-scheme electron transfer mechanism plays a pivotal role in facilitating an efficient electron-hole transport within the 2NiCoAlCN, which promote the oxidizability and reducibility in the nanohybrids for enhancing the overall redox activity. In an embodiment of the invention, the cationic effects suggest an enhanced interaction between the metal hydroxides layer and adsorbed molecules in 2NiCoAlCN, which augment its photocatalytic activity. The adjustment of the cationic ratio and charge density has a notable influence on the electronic properties of the LDH, as evidenced by variations in the band gap value. In an embodiment, $Ni_1Co_1Al_1$ LDH ($E_BG$: 2.21 eV) and $Ni_{1.5}Co_{1.5}Al_1$ LDH (EBG: 2.84 eV) exhibit narrower band gaps, enabling them to be active under visible irradiation. In contrast, $Ni_{0.5}Co_{0.5}Al_1$ LDH displays a larger band gap value of 3.04 eV. The narrower band gaps of $Ni_1Co_1Al_1$ LDH and $Ni_{1.5}Co_{1.5}Al_1$ LDH contribute to their enhanced performance, allowing for better utilization of visible light for photocatalytic processes. In the morphological perspective, $Ni_1Co_1Al_1$ LDH sample exhibited a prominent nanoplate structure with well-defined edges, indicating the formation of a stable hydrotalcite structure with higher crystallinity. In another embodiment of the invention, larger crystallite size obtained in $Ni_1Co_1Al_1$ LDH (9.07 nm) with enhanced $S_{BET}$ of 115.75 m²/g increase the surface-active sites and improve its photonic absorption. In contrast, the $Ni_{0.5}Co_{0.5}Al_1$ LDH sample with a lower cationic ratio displayed aggregated, coalesced, and smaller nanoplates attributing to a lower specific surface area ($S_{BET}$) of 95 m²/g for $Ni_{0.5}Co_{0.5}Al_1$ LDH. A higher layer charge density of $Ni_{0.5}Co_{0.5}Al_1$ LDH (x: 0.5) may lead to the formation of non-pure LDH phases, as evidenced by its poor crystallinity and visible inactivation. The present invention serves for purpose of developing S-scheme LDH-based materials and improving the photocatalytic effects of trimetallic LDH structures.

Benefits of the proposed hybrid-junction composite system in accordance with the present invention include the proposed system optimizing solar energy usage, allowing for an increased semiconductor sensitivity and helping to optimize solar hydrogen generation. This new sensitizer may be used in conjunction with a variety of semiconductors, layered structure LADHs and graphitic carbon nitrides, to maximize the use of solar energy and increase hydrogen generation.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A method of constructing a hybrid-junction photocatalyst, wherein the hybrid-junction photocatalyst comprises a composite of a layered double hydroxide (LDH) material comprising selected metal ions, and vanadium carbide MXene ($V_2C$) for promoting conductive properties of the LDH material, wherein the layered LDH material is a trimetallic LDH material comprising nickel-cobalt aluminum layered double hydroxide, wherein the method comprises coupling the trimetallic nickel-cobalt-aluminium layered double hydroxide ($Ni_xCo_yAl_z$ LDH) and vanadium carbide MXene ($V_2C$)-based composite with a graphitic carbon nitride (g-$C_3N_4$) nanosheet, to form the hybrid-junction photocatalyst.

2. The method of claim 1, wherein the layered LDH material exhibits a hexagonal nanoplates structure.

3. The method of claim 1, wherein the trimetallic LDH material comprises selected $Ni^{2+}$, $Co^{2+}$, and $Al^{3+}$ metal ions with its cationic configuration for improving photocatalytic properties of the LDH material.

4. The method of claim 1, wherein the formed hybrid-junction photocatalyst is a $Ni_xCo_yAl_z$ LDH/g-$C_3N_4$ hybrid-junction photocatalyst.

5. The method of claim 1, wherein the g-$C_3N_4$ nanosheet is synthesized via thermal polymerization of melamine.

6. The method of claim 1, wherein the vanadium carbide MXene ($V_2C$) is is synthesized through selective etching with hydrogen fluoride acid.

7. The method of claim 1, wherein the trimetallic LDH material is prepared through co-precipitation-assisted hydrothermal treatment, incorporating highly active transition metals.

8. The method of claim 7, the highly active transition metals being Ni, Co, and Al, with the regulation of the cationic composition at a controlled layer charge density.

9. The method of claim 1, wherein construction of the trimetallic LDH material in S-scheme heterojunction is further done, leading to a hybrid junction comprising a combination of S-scheme heterojunction and a Schottky-junction system.

10. The method of claim 9 wherein enhanced photocatalytic hydrogen production is conducted through the construction of the S-scheme heterojunction system for electron transfer.

11. The method of claim 1, wherein the hybrid-junction photocatalyst is used for converting water into solar hydrogen.

* * * * *